United States Patent
Philyaw

(10) Patent No.: US 7,392,285 B2
(45) Date of Patent: *Jun. 24, 2008

(54) METHOD FOR CONDUCTING A CONTEST USING A NETWORK

(75) Inventor: Jeffry Jovan Philyaw, Dallas, TX (US)

(73) Assignee: LV Partners, L.P., Dallas, TX (US)

( * ) Notice: Subject to any disclaimer, the term of this patent is extended or adjusted under 35 U.S.C. 154(b) by 660 days.

This patent is subject to a terminal disclaimer.

(21) Appl. No.: 10/690,223

(22) Filed: Oct. 21, 2003

(65) Prior Publication Data

US 2005/0004981 A1 Jan. 6, 2005

Related U.S. Application Data

(63) Continuation of application No. 09/594,292, filed on Jun. 15, 2000, now Pat. No. 6,636,892, which is a continuation-in-part of application No. 09/568,754, filed on May 11, 2000, now Pat. No. 6,631,404, which is a continuation-in-part of application No. 09/378,221, filed on Aug. 19, 1999, now Pat. No. 6,745,234, which is a continuation-in-part of application No. 09/151,471, filed on Sep. 11, 1998, now abandoned, and a continuation-in-part of application No. 09/151,530, filed on Sep. 11, 1998, now Pat. No. 6,098,106.

(51) Int. Cl.
*G06F 15/16* (2006.01)

(52) U.S. Cl. .......................... 709/204; 463/17
(58) Field of Classification Search .......... 709/204; 434/17

See application file for complete search history.

(56) References Cited

U.S. PATENT DOCUMENTS

| | | | |
|---|---|---|---|
| 3,668,312 A | 6/1972 | Yamamoto et al. ............ 348/17 |
| 4,002,886 A | 1/1977 | Sundelin ................. 235/61.7 R |
| 4,042,792 A | 8/1977 | Pakenham et al. ............ 179/90 |
| 4,365,148 A | 12/1982 | Whitney ..................... 235/383 |
| 4,621,259 A | 11/1986 | Schepers et al. ............ 345/180 |
| 4,654,482 A | 3/1987 | DeAngelis ..................... 379/95 |

(Continued)

FOREIGN PATENT DOCUMENTS

EP 0 961 250 A2 12/1999

(Continued)

OTHER PUBLICATIONS

"Group Decision Support System: Development and Application", Energy Systems, Westinghouse, Pittsburgh, PA.

(Continued)

*Primary Examiner*—Salad Abdullahi
(74) *Attorney, Agent, or Firm*—Howison & Arnott, L.L.P.

(57) ABSTRACT

A method for conducting a contest using a network is provided. A plurality of pick spaces and a rolling counter are displayed on a screen of a computer operably connected to the network at a user site. The rolling counter constitutes successive ones of a plurality of available characters, each character being displayed for a preselected duration. Each time the user performs a predefined selection action, the then-displayed character of the rolling counter is assigned to a successive one of the plurality of pick spaces, and thereafter the assigned character is displayed in the corresponding pick space. When each pick space displays an assigned character, an entry data packet is assembled including data indicative of the assigned character in each of the plurality of pick spaces. The entry data packet is transmitted from the user computer across the network to a remote site. The entry data packet is received at the remote site. It is then determined if the assigned characters in each of the plurality of pick spaces represented by the received entry data packet match a preselected winning combination of characters. If so, the received entry data packet is concluded to be a winning entry, otherwise, the received entry data packet is concluded not to be a winning entry.

20 Claims, 20 Drawing Sheets

U.S. PATENT DOCUMENTS

| | | | |
|---|---|---|---|
| 4,780,599 A | 10/1988 | Baus | 235/383 |
| 4,785,296 A | 11/1988 | Tabata et al. | 340/731 |
| 4,816,904 A | 3/1989 | McKenna et al. | 348/13 |
| 4,817,136 A | 3/1989 | Rhoads | 379/375 |
| 4,833,308 A | 5/1989 | Humble | 235/383 |
| 4,841,132 A | 6/1989 | Kajitani et al. | 235/462.46 |
| 4,845,634 A | 7/1989 | Vitek et al. | 364/468 |
| 4,894,789 A | 1/1990 | Yee | 348/552 |
| 4,899,370 A | 2/1990 | Kameo et al. | 379/104 |
| 4,901,073 A | 2/1990 | Kibrick | 341/13 |
| 4,905,094 A | 2/1990 | Pocock et al. | 386/106 |
| 4,907,264 A | 3/1990 | Seiler et al. | 379/216 |
| 4,916,293 A | 4/1990 | Cartlidge et al. | 235/375 |
| 4,922,522 A * | 5/1990 | Scanlon | 463/17 |
| 4,937,853 A | 6/1990 | Brule et al. | 379/91 |
| 4,947,028 A | 8/1990 | Gorog | 235/380 |
| 4,959,530 A | 9/1990 | O'Connor | 235/383 |
| 4,975,948 A | 12/1990 | Andresen et al. | 379/355 |
| 4,984,155 A | 1/1991 | Geier et al. | 364/401 |
| 5,038,023 A | 8/1991 | Saliga | 235/385 |
| 5,054,096 A | 10/1991 | Beizer | 382/41 |
| 5,088,045 A | 2/1992 | Shimanaka et al. | 364/468 |
| 5,111,391 A | 5/1992 | Fields et al. | 364/401 |
| 5,115,326 A | 5/1992 | Burgess et al. | 358/440 |
| 5,128,752 A | 7/1992 | Von Kohorn | 358/84 |
| 5,144,654 A | 9/1992 | Kelley et al. | 379/356 |
| 5,161,037 A | 11/1992 | Saito | 358/468 |
| 5,161,214 A | 11/1992 | Addink et al. | 395/145 |
| 5,182,705 A | 1/1993 | Barr et al. | 364/401 |
| 5,189,630 A | 2/1993 | Barstow et al. | 364/514 |
| 5,191,525 A | 3/1993 | LeBrun et al. | 364/419 |
| 5,198,644 A | 3/1993 | Pfeiffer et al. | 235/383 |
| 5,235,654 A | 8/1993 | Anderson et al. | 382/61 |
| 5,241,402 A | 8/1993 | Aboujaoude et al. | 358/406 |
| 5,243,531 A | 9/1993 | DiPippo et al. | 364/468 |
| 5,247,347 A | 9/1993 | Litteral et al. | 348/7 |
| 5,262,860 A | 11/1993 | Fitzpatrick et al. | 348/461 |
| 5,285,278 A | 2/1994 | Holman | 348/10 |
| 5,287,181 A | 2/1994 | Holman | 348/473 |
| 5,288,976 A | 2/1994 | Citron et al. | 235/375 |
| 5,296,688 A | 3/1994 | Hamilton et al. | 235/375 |
| 5,304,786 A | 4/1994 | Pavlidis et al. | 235/462 |
| 5,305,195 A | 4/1994 | Murphy | 705/1 |
| 5,319,454 A | 6/1994 | Schutte | 348/5.5 |
| 5,324,922 A | 6/1994 | Roberts | 235/375 |
| 5,331,547 A | 7/1994 | Laszlo | 364/413.01 |
| 5,340,966 A | 8/1994 | Morimoto | 235/376 |
| 5,357,276 A | 10/1994 | Banker et al. | 348/7 |
| 5,362,948 A | 11/1994 | Morimoto | 235/376 |
| 5,382,779 A | 1/1995 | Gupta | 235/383 |
| 5,386,298 A | 1/1995 | Bronnenberg et al. | 358/403 |
| 5,398,336 A | 3/1995 | Tantry et al. | 395/600 |
| 5,403,999 A * | 4/1995 | Entenmann et al. | 235/379 |
| 5,405,232 A | 4/1995 | Lloyd et al. | 414/280 |
| 5,418,713 A | 5/1995 | Allen | 364/403 |
| 5,420,403 A | 5/1995 | Allum et al. | 235/375 |
| 5,420,943 A | 5/1995 | Mak | 382/313 |
| 5,424,524 A | 6/1995 | Ruppert et al. | 235/462 |
| 5,438,355 A | 8/1995 | Palmer | 348/1 |
| 5,446,490 A | 8/1995 | Blahut et al. | 348/7 |
| 5,446,919 A | 8/1995 | Wilkins | 455/6.2 |
| 5,491,508 A | 2/1996 | Friedell et al. | 348/16 |
| 5,493,107 A | 2/1996 | Gupta et al. | 235/383 |
| 5,519,878 A | 5/1996 | Dolin, Jr. | 395/800 |
| 5,530,852 A | 6/1996 | Meske, Jr. et al. | 396/600 |
| 5,570,295 A | 10/1996 | Isenberg et al. | 379/90.01 |
| 5,572,643 A | 11/1996 | Judson | 395/793 |
| 5,592,551 A | 1/1997 | Lett et al. | 380/20 |
| 5,594,226 A | 1/1997 | Steger | 235/379 |
| 5,602,377 A | 2/1997 | Beller et al. | 235/462 |
| 5,604,542 A | 2/1997 | Dedrick | 348/552 |
| 5,640,193 A | 6/1997 | Wellner | 348/7 |
| 5,649,186 A | 7/1997 | Ferguson | 395/610 |
| 5,664,110 A | 9/1997 | Green et al. | 705/26 |
| 5,671,282 A | 9/1997 | Wolff et al. | 380/25 |
| 5,675,721 A | 10/1997 | Freedman et al. | 395/129 |
| 5,682,540 A | 10/1997 | Klotz, Jr. et al. | 395/766 |
| 5,694,163 A | 12/1997 | Harrison | 348/13 |
| 5,708,780 A | 1/1998 | Levergood et al. | 709/229 |
| 5,710,887 A | 1/1998 | Chelliah et al. | 395/226 |
| 5,715,314 A | 2/1998 | Payne et al. | 705/78 |
| 5,724,424 A | 3/1998 | Gifford | 705/79 |
| 5,745,681 A | 4/1998 | Levine et al. | 395/200.3 |
| 5,754,906 A | 5/1998 | Yoshida | 396/448 |
| 5,757,917 A | 5/1998 | Rose et al. | 380/25 |
| 5,761,606 A | 6/1998 | Wolzien | 455/6.2 |
| 5,764,906 A | 6/1998 | Edelstein et al. | 395/200.49 |
| 5,765,176 A | 6/1998 | Bloomberg | 707/514 |
| 5,768,528 A | 6/1998 | Stumm | 709/231 |
| 5,774,664 A | 6/1998 | Hidary et al. | 395/200 |
| 5,774,870 A | 6/1998 | Storey | 705/14 |
| 5,778,367 A | 7/1998 | Wesinger, Jr. et al. | 707/10 |
| 5,790,793 A | 8/1998 | Higley | 709/218 |
| 5,791,991 A | 8/1998 | Small | 463/41 |
| 5,794,210 A | 8/1998 | Goldhaber et al. | 705/14 |
| 5,796,952 A | 8/1998 | Davis et al. | 305/200.54 |
| 5,804,803 A | 9/1998 | Cragun et al. | 235/375 |
| 5,815,776 A | 9/1998 | Nukada | 399/174 |
| 5,832,223 A | 11/1998 | Hara et al. | 395/200.47 |
| 5,833,468 A | 11/1998 | Guy et al. | 434/350 |
| 5,848,202 A | 12/1998 | D'Eri et al. | 382/306 |
| 5,848,413 A | 12/1998 | Wolff | 707/10 |
| 5,854,897 A | 12/1998 | Radziewicz et al. | 709/224 |
| 5,864,823 A | 1/1999 | Levitan | 105/14 |
| 5,869,819 A | 2/1999 | Knowles et al. | 235/375 |
| 5,905,248 A | 5/1999 | Russell et al. | 235/462 |
| 5,905,251 A | 5/1999 | Knowles | 235/472.01 |
| 5,905,665 A | 5/1999 | Rim | 364/746 |
| 5,905,865 A | 5/1999 | Palmer et al. | 395/200.47 |
| 5,907,793 A | 5/1999 | Reams | 455/3.1 |
| 5,913,210 A | 6/1999 | Call | 707/4 |
| 5,915,090 A | 6/1999 | Joseph et al. | 709/202 |
| 5,918,214 A | 6/1999 | Perkowski | 705/27 |
| 5,925,865 A | 7/1999 | Steger | 235/379 |
| 5,929,850 A | 7/1999 | Broadwin et al. | 345/327 |
| 5,932,863 A | 8/1999 | Rathus et al. | 235/462.15 |
| 5,933,829 A | 8/1999 | Durst et al. | 707/10 |
| 5,948,061 A | 9/1999 | Merriman et al. | 709/219 |
| 5,957,695 A | 9/1999 | Redford et al. | 434/307 R |
| 5,960,411 A | 9/1999 | Hartman et al. | 705/26 |
| 5,961,603 A | 10/1999 | Kunkel et al. | 709/229 |
| 5,970,471 A | 10/1999 | Hill | 705/26 |
| 5,970,472 A | 10/1999 | Allsop et al. | 705/26 |
| 5,971,277 A | 10/1999 | Cragun et al. | 235/462.01 |
| 5,974,443 A | 10/1999 | Jeske | 709/202 |
| 5,974,451 A | 10/1999 | Simmons | 709/218 |
| 5,976,833 A | 11/1999 | Furukawa et al. | 435/69.1 |
| 5,978,773 A | 11/1999 | Hudetz et al. | 709/219 |
| 5,991,739 A | 11/1999 | Cupps et al. | 705/26 |
| 5,992,752 A | 11/1999 | Wilz, Sr. et al. | 235/472.01 |
| 5,995,105 A | 11/1999 | Reber et al. | 345/356 |
| 6,002,394 A | 12/1999 | Schein et al. | 345/327 |
| 6,003,073 A | 12/1999 | Solvason | 709/219 |
| 6,006,257 A | 12/1999 | Slezak | 709/219 |
| 6,009,410 A | 12/1999 | LeMole et al. | 709/219 |
| 6,009,465 A | 12/1999 | Decker et al. | 709/219 |
| 6,012,090 A * | 1/2000 | Chung et al. | 709/219 |
| 6,012,102 A | 1/2000 | Shachar | 710/5 |
| 6,018,764 A | 1/2000 | Field et al. | 709/217 |
| 6,064,979 A | 5/2000 | Perkowski | 705/26 |
| 6,108,656 A | 8/2000 | Durst et al. | 707/10 |
| 6,251,016 B1 * | 6/2001 | Tsuda et al. | 463/42 |
| 6,532,448 B1 * | 3/2003 | Higginson et al. | 705/14 |
| 6,540,608 B2 * | 4/2003 | Howson | 463/17 |

| | | | |
|---|---|---|---|
| 6,636,892 B1 | 10/2003 | Philyaw | |
| 2001/0036853 A1* | 11/2001 | Thomas | 463/17 |

FOREIGN PATENT DOCUMENTS

| | | |
|---|---|---|
| JP | 10188140 A | 12/1996 |
| WO | WO 95/10813 | 10/1994 |
| WO | WO 96/07146 | 9/1995 |
| WO | WO 97/37319 | 2/1997 |
| WO | WO 98/09243 | 8/1997 |
| WO | WO 98/03923 | 1/1998 |
| WO | WO 98/06055 | 2/1998 |
| WO | WO 98/19259 | 5/1998 |
| WO | WO 98/40823 | 9/1998 |
| WO | WO 99/63457 | 6/1999 |

OTHER PUBLICATIONS

"New Technologies in Credit Card Authentication", Pieter de Bryne, Institute for Communications Technology, Zurich, Switzerland.

"AVITAL, a Private Teaching System by Fax Communication", Atsusji Iizawa, Noriro Sugiki, Yukari Shitora and Hideko Kunii, Software Research Center, Tokyo, Japan.

"Document on Computer" USPS Technical Support Center, Norman, OK.

"Development of a Commercially Successful Wearble Data Collection System", Symbol Technologies, Inc.

What do forward looking companies consider in their plans and developments?, A.G. Johnston, Nestle.

"The Automation Synergy", Neves and Noivo, Portugal.

"Integration of Hand-Written Address Interpretation Technology into the United States Postal Service Remote Computer Reader System", Srihari (Cedar, Suny at Buffalo) and Kueberg (U.S. Postal Service, VA).

"Paper Based Document Security—A Review", van Renesse, TNO Institute of Applied Physics, The Netherlands.

"IEEE Standard for Bar Coding for Distribution Transformers" Transformers Committee of the IEEE Power Engineering Society, The Institute of Electrical and Electronics Engineers, Inc. NY.

"The Stylus™—Shopping from Home", STYLUS Innovation, MA.

"Distributing Uniform Resource Locators as Bar Code Images", IBM Technical Disclosure Bulleting, Jan. 1996.

"Bar Code Method for Automating Catalog Orders", IBM Technical Disclosure Bulletin, Sep. 1998.

"Bar-Code Recognition System Using Image Processing", Kuroki, Yoneoka et al., Hitachi Research Laborator.

* cited by examiner

PATH A: SOURCE TO ARS

PATH B: ARS TO SOURCE

PATH C: SOURCE TO ADVERTISER

PATH D: ADVERTISER TO SOURCE

PATH E: ARS TO ADVERTISER (OPTIONAL)

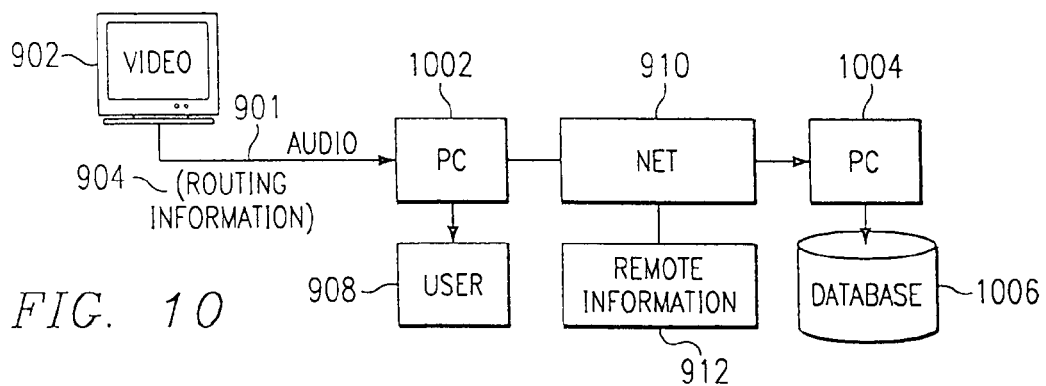
FIG. 10
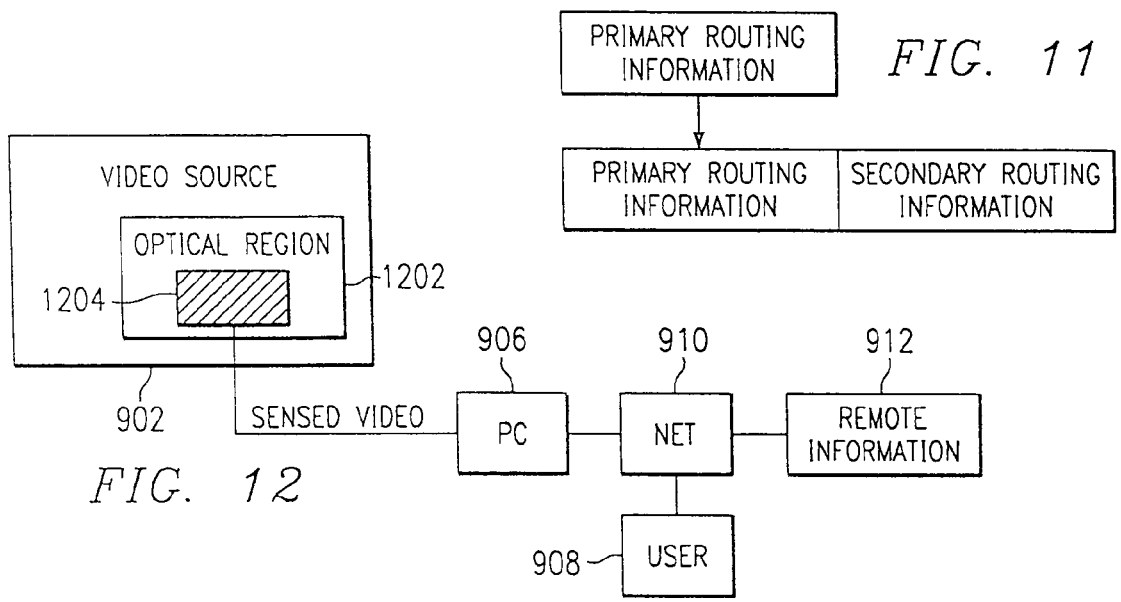
FIG. 11
FIG. 12
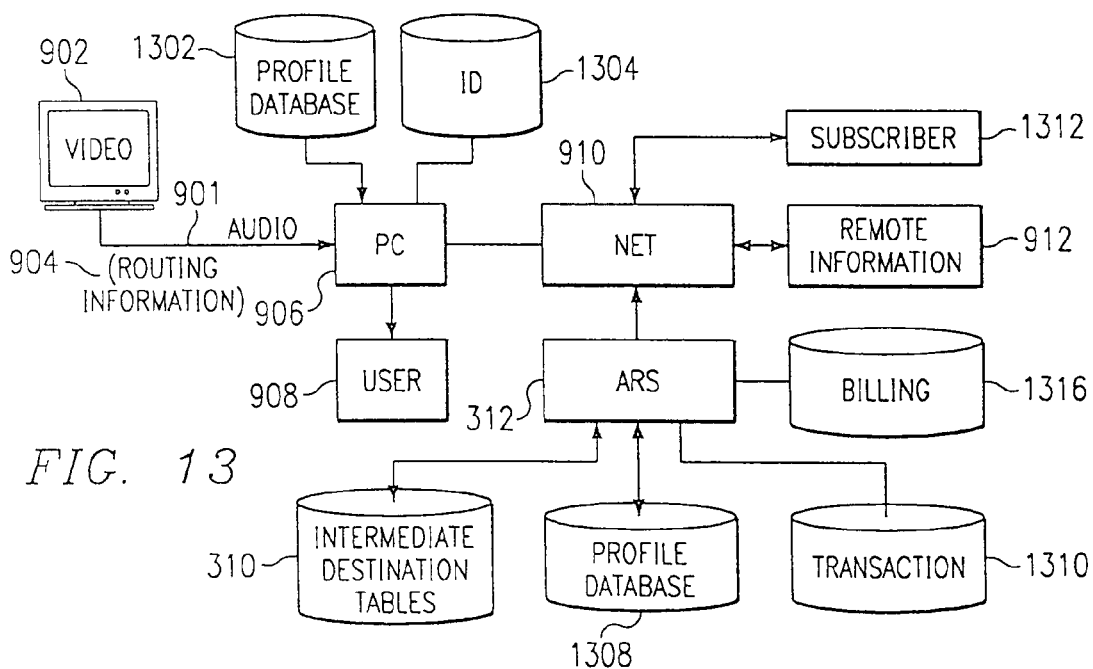
FIG. 13

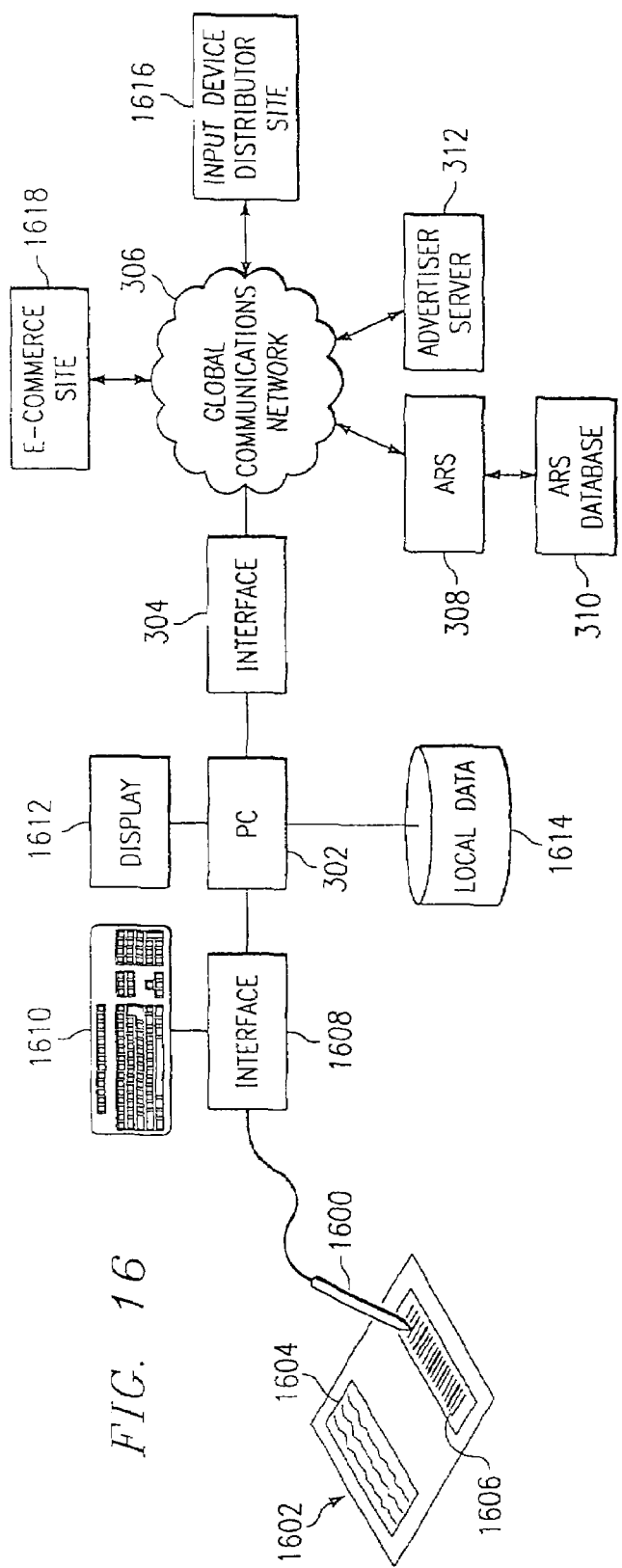
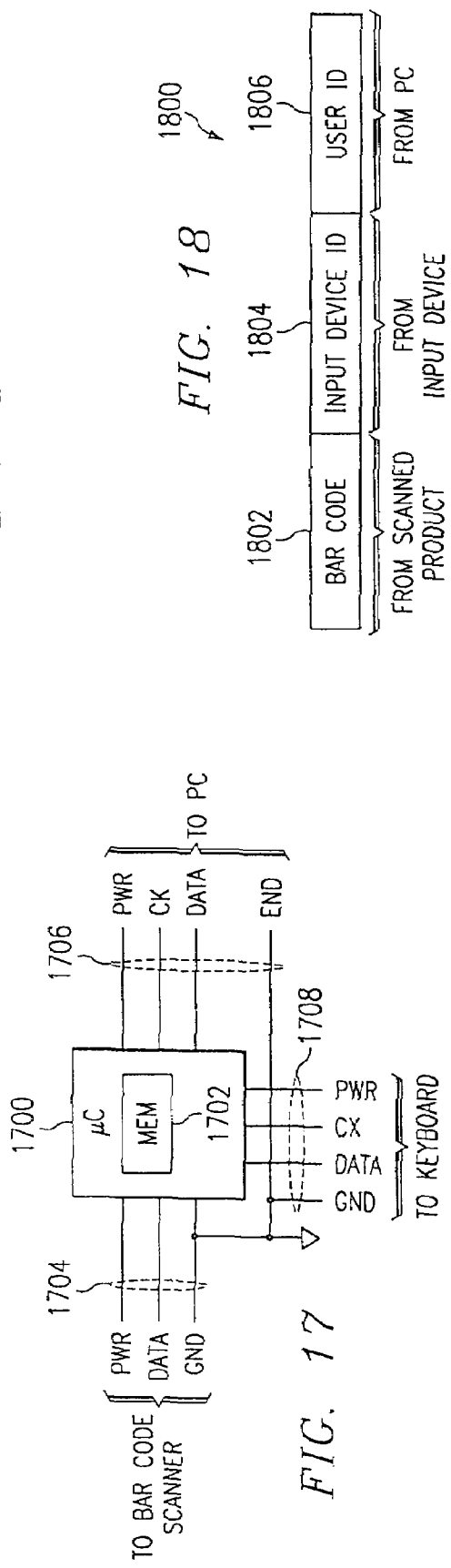

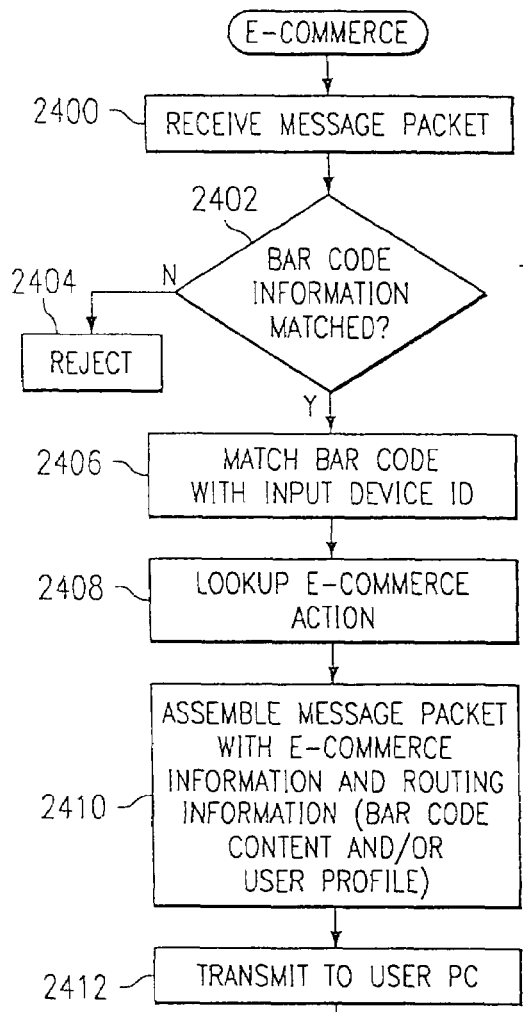
FIG. 24
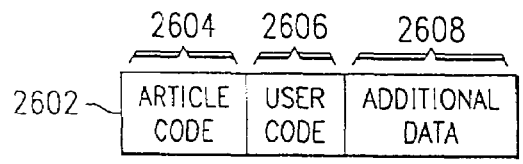
FIG. 26
| ARTICLE CODE | ROUTING INFORMATION | TARGET SITE |
|---|---|---|
| 3800043400 | www.domain.com\contesta\target1 | TARGET 1 |
| 3800043410 | www.domain.com\contesta\target2 | TARGET 2 |
| 7800001234 | 205.xxx.xxx.123 | TARGET 3 |
| 5490003019 | 205.xxx.xxx.456 | TARGET 4 |
FIG. 27

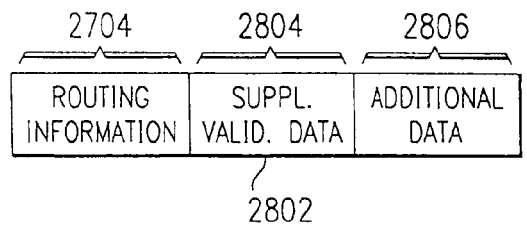
FIG. 28
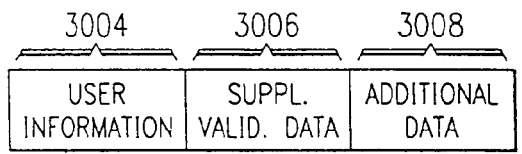
FIG. 30
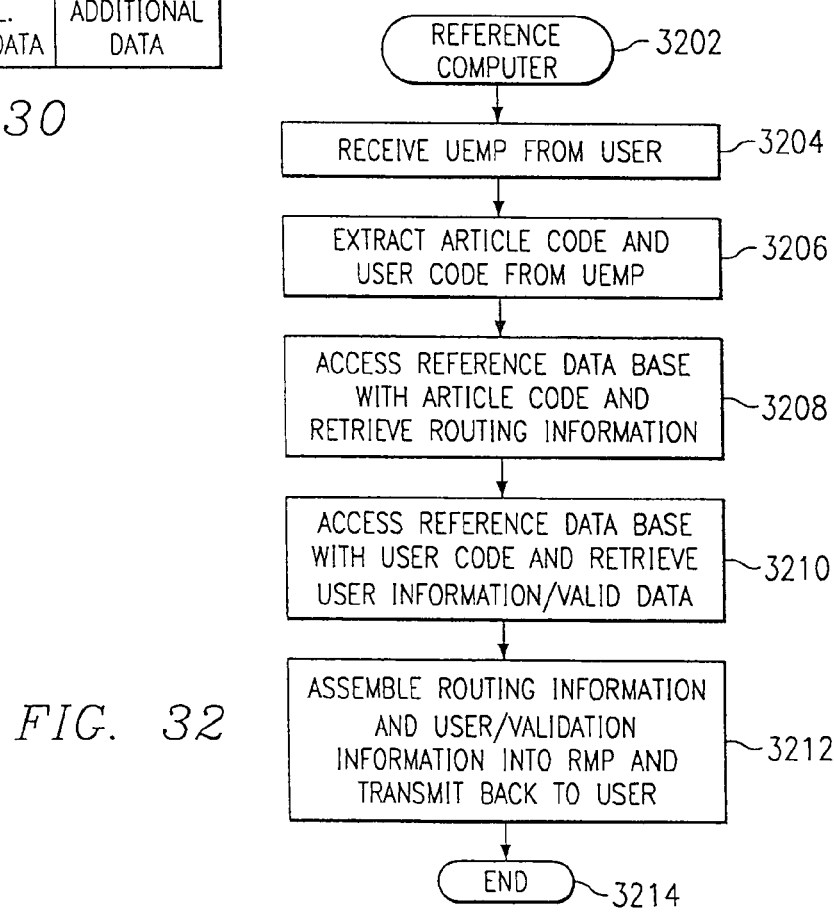
FIG. 29
FIG. 32

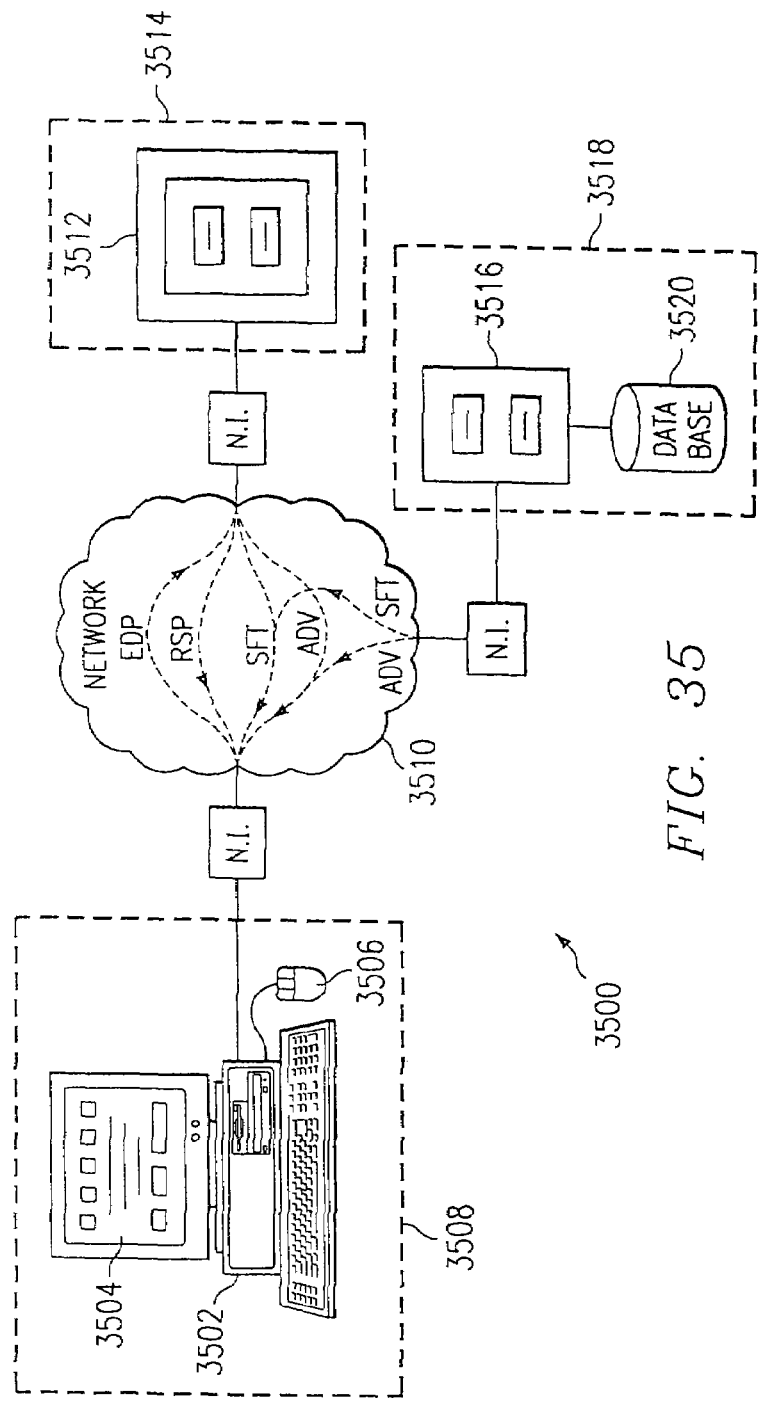
FIG. 35
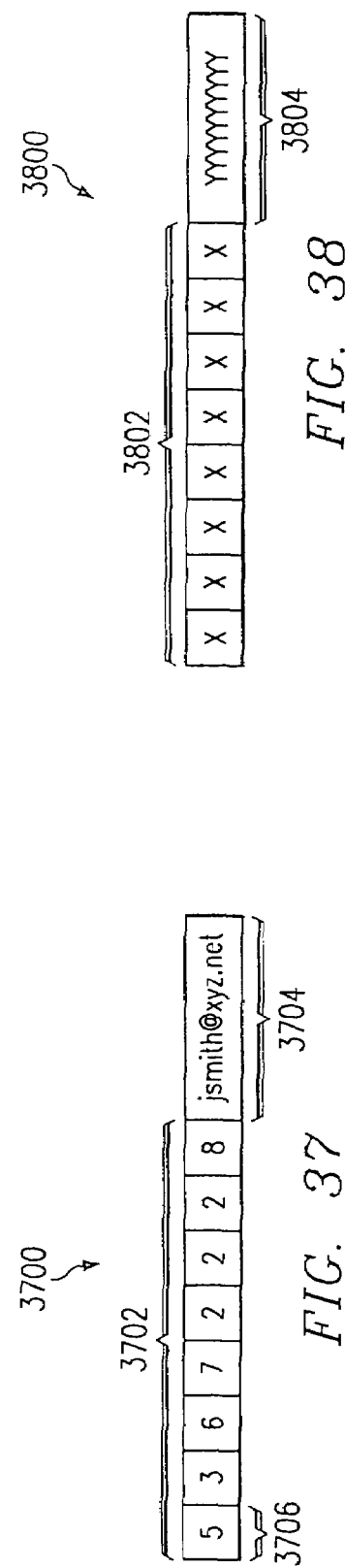
FIG. 38
FIG. 37

METHOD FOR CONDUCTING A CONTEST USING A NETWORK

CROSS REFERENCE TO RELATED APPLICATION

This application is a Continuation of U.S. Pat. No. 6,636,892, issued Oct. 21, 2003, entitled "METHOD FOR CONDUCTING A CONTEST USING A NETWORK", which is a Continuation-In-Part of U.S. Pat. No. 6,631,404, issued Oct. 7, 2003, entitled "METHOD AND SYSTEM FOR CONDUCTING A CONTEST USING A NETWORK," which is a Continuation-In-Part of U.S. Pat. No. 6,745,234, issued Jun. 1, 2004, entitled "METHOD AND APPARATUS FOR ACCESSING A REMOTE LOCATION BY SCANNING AN OPTICAL CODE" which is a Continuation-In-Part of Ser. No. 09/151,471 entitled "METHOD FOR INTERFACING SCANNED PRODUCT INFORMATION WITH A SOURCE FOR THE PRODUCT OVER A GLOBAL NETWORK" filed Sep. 11, 1998 now abandoned, and Ser. No. 09/151,530 entitled "METHOD FOR CONTROLLING A COMPUTER WITH AN AUDIO SIGNAL" filed Sep. 11, 1998, and issued on Aug. 1, 2000 as U.S. Pat. No. 6,098,106.

TECHNICAL FIELD OF THE INVENTION

This invention is related to an architecture for conducting a contest. In one aspect, it relates to a method for conducting a contest using a network.

BACKGROUND OF THE INVENTION

With the growing numbers of computer users connecting to the "Internet," many companies are seeking the substantial commercial opportunities presented by such a large user base. For example, one technology which exists allows a television ("TV") signal to trigger a computer response in which the consumer will be guided to a personalized web page. The source of the triggering signal may be a TV, video tape recorder, or radio. For example, if a viewer is watching a TV program in which an advertiser offers viewer voting, the advertiser may transmit a unique signal within the television signal which controls a program known as a "browser" on the viewer's computer to automatically display the advertiser's web page. The viewer then simply makes a selection which is then transmitted back to the advertiser.

In order to provide the viewer with the capability of responding to a wide variety of companies using this technology, a database of company information and Uniform Resource Locator ("URL") codes is necessarily maintained in the viewer's computer, requiring continuous updates. URLs are short strings of data that identify resources on the Internet: documents, images, downloadable files, services, electronic mailboxes, and other resources. URLs make resources available under a variety of naming schemes and access methods such as HTTP, FTP, and Internet mail, addressable in the same simple way. URLs reduce the tedium of "login to this server, then issue this magic command . . . " down to a single click. The Internet uses URLs to specify the location of files on other servers. A URL includes the type of resource being accessed (e.g., Web, gopher, FTP), the address of the server, and the location of the file. The URL can point to any file on any networked computer. Current technology requires the viewer to perform periodic updates to obtain the most current URL database. This aspect of the current technology is cumbersome since the update process requires downloading information to the viewer's computer. Moreover, the likelihood for error in performing the update, and the necessity of redoing the update in the event of a later computer crash, further complicates the process. Additionally, current technologies are limited in the number of companies which may be stored in the database. This is a significant limitation since world-wide access presented by the Internet and the increasing number of companies connecting to perform on-line E-commerce necessitates a large database.

Contests, promotions, and games are among the methods traditionally used by businesses for purposes of attracting potential customers. In some cases, especially those involving new technology, games or other activities may be used to teach or educate potential customers about a business or its products. The rapid development of Internet businesses has generated a need for new methods of conducting contests, promotions and educational games using a network.

SUMMARY OF THE INVENTION

The present invention disclosed and claimed herein comprises, in one aspect thereof, a method for conducting a contest using a network. A plurality of pick spaces and a rolling counter are displayed on a screen of a computer operably connected to the network at a user site. The rolling counter constitutes successive ones of a plurality of available characters, each character being displayed for a preselected duration. Each time the user performs a predefined selection action, the then-displayed character of the rolling counter is assigned to a successive one of the plurality of pick spaces, and thereafter the assigned character is displayed in the corresponding pick space. When each pick space displays an assigned character, an entry data packet is assembled including data indicative of the assigned character in each of the plurality of pick spaces. The entry data packet is transmitted from the user computer across the network to a remote site. The entry data packet is received at the remote site. It is then determined if the assigned characters in each of the plurality of pick spaces represented by the received entry data packet match a preselected winning combination of characters. If so, the received entry data packet is concluded to be a winning entry, otherwise, the received entry data packet is concluded not to be a winning entry.

BRIEF DESCRIPTION OF THE DRAWINGS

For a more complete understanding of the present invention and the advantages thereof, reference is now made to the following description taken in conjunction with the accompanying Drawings in which:

FIG. 10 illustrates a more detailed, simplified block diagram of the embodiment of FIG. 9;

FIG. 11 illustrates a diagrammatic view of a method for performing the routing operation;

FIG. 12 illustrates a block diagram of an alternate embodiment utilizing an optical region in the video image for generating the routing information;

FIG. 13 illustrates a block diagram illustrating the generation of a profile with the disclosed embodiment;

FIG. 16 illustrates a general block diagram of a disclosed embodiment;

FIG. 17 illustrates the conversion circuit of the wedge interface;

FIG. 18 illustrates a sample message packet transmitted from the user PC to the ARS;

FIG. 24 illustrates a flowchart of the process performed at the E-commerce node;

FIG. 26 illustrates an unvalidated entry message packet employed in this embodiment;

FIG. 27 illustrates a diagrammatic view of information contained in the reference computer database;

FIG. 28 illustrates a reply message packet employed in this embodiment;

FIG. 29 illustrates a diagrammatic view of information contained in the user information database;

FIG. 30 illustrates a validated entry message packet employed in this embodiment;

FIG. 32 illustrates a flowchart of the process performed at the reference location;

FIG. 35 illustrates a diagrammatic view of a system for conducting a contest using a network in accordance with another aspect of the current invention;

FIG. 37 illustrates a sample entry data packet according to one embodiment;

FIG. 38 illustrates a sample entry data packet which has been encrypted;

DETAILED DESCRIPTION OF THE INVENTION

Figure 1:
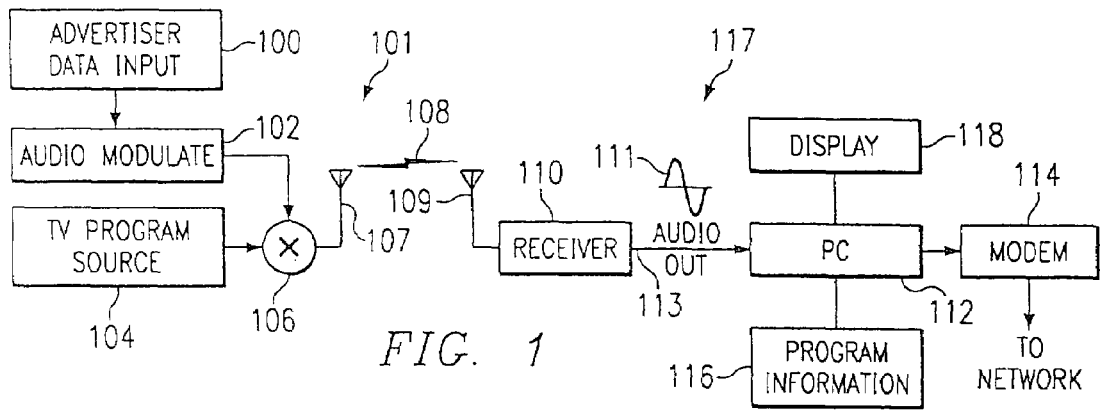
FIG. 1 illustrates a block diagram of the preferred embodiment.

Referring now to FIG. 1, there is illustrated a block diagram of a system for controlling a personal computer ("PC") 112 via an audio tone transmitted over a wireless system utilizing a TV. In the embodiment illustrated in FIG. 1, there is provided a transmission station 101 and a receive station 117 that are connected via a communication link 108. The transmission station 101 is comprised of a television program source 104, which is operable to generate a program in the form of a broadcast signal comprised of video and audio. This is transmitted via conventional techniques along channels in the appropriate frequencies. The program source is input to a mixing device 106, which mixing device is operable to mix in an audio signal. This audio signal is derived from an audio source 100 which comprises a coded audio signal which is then modulated onto a carrier which is combined with the television program source 104. This signal combining can be done at the audio level, or it can even be done at the RF level in the form of a different carrier. However, the preferred method is to merely sum the audio signal from the modulator 102 into the audio channel of the program that is generated by the television program source 104. The output thereof is provided from the mixing device 106 in the form of broadcast signal to an antenna 107, which transmits the information over the communication link 108 antenna 109 on the receive side.

On the receive side of the system, a conventional receiver 110, such as a television is provided. This television provides a speaker output which provides the user with an audible signal. This is typically associated with the program. However, the receiver 110 in the disclosed embodiment, also provides an audio output jack, this being the type RCA jack. This jack is utilized to provide an audio output signal on a line 113 which is represented by an audio signal 111. This line 113 provides all of the audio that is received over the communication link 108 to the PC 112 in the audio input port on the PC 112. However, it should be understood that, although a direct connection is illustrated from the receiver 110 to the PC 112, there actually could be a microphone pickup at the PC 112 which could pick the audio signal up. In the disclosed embodiment, the audio signal generated by the advertiser data input device 100 is audible to the human ear and, therefore, can be heard by the user. Therefore, no special filters are needed to provide this audio to the PC 112.

The PC 112 is operable to run programs thereon which typically are stored in a program file area 116. These programs can be any type of programs such as word processing programs, application programs, etc. In the disclosed embodiment, the program that is utilized in the system is what is referred to as a "browser." The PC 112 runs a browser program to facilitate the access of information on the network, for example, a global communication network known as the "Internet" or the World-Wide-Web ("Web"). The browser is a hypertext-linked application used for accessing information. Hypertext is a term used to describe a particular organization of information within a data processing system, and its presentation to a user. It exploits the computer's ability to link together information from a wide variety of sources to provide the user with the ability to explore a particular topic. The traditional style of presentation used in books employs an organization of the information which is imposed upon it by limitations of the medium, namely fixed sized, sequential paper pages. Hypertext systems, however, use a large number of units of text or other types of data such as image information, graphical information, video information, or sound information, which can vary in size. A collection of such units of information is termed a hypertext document, or where the hypertext documents employ information other than text, hypermedia documents. Multimedia communications may use the Hypertext Transfer Protocol ("HTTP"), and files or formatted data may use the Hypertext Markup Language ("HTML"). This formatting language provides for a mingling of text, graphics, sound, video, and hypertext links by "tagging" a text document using HTML. Data encoded using HTML is often referred to as an "HTML document," an "HTML page," or a "home page." These documents and other Internet resources may be accessed across the network by means of a network addressing scheme which uses a locator referred to as a Uniform Resource Locator ("URL"), for example, "http://www.digital.com."

The Internet is one of the most utilized networks for interconnecting distributed computer systems and allows users of these computer systems to exchange data all over the world. Connected to the Internet are many private networks, for example, corporate or commercial networks. Standard protocols, such as the Transport Control Protocol ("TCP") and the Internet Protocol ("IP") provide a convenient method for communicating across these diverse networks. These protocols dictate how data are formatted and communicated. As a characteristic of the Internet, the protocols are layered in an IP stack. At higher levels of the IP stack, such as the application layer (where HTTP is employed), the user information is more readily visible, while at lower levels, such as the network level (where TCP/IP are used), the data can merely be observed as packets or a stream of rapidly moving digital signals. Superimposed on the Internet is a standard protocol interface for accessing Web resources, such as servers, files, Web pages, mail messages, and the like. One way that Web resources can be accessed is by browsers made by Netscape® and Microsoft Internet Explorer®.

Referring again now to FIG. 1, the user can load this program with the appropriate keystrokes such that a browser window will be displayed on a display 118. In one embodiment, the user can run the browser program on the PC 112 such that the browser window is displayed on the display 118. While watching a preferred program, the user can also view display 118. When an audio signal is received by the receiver 110 and the encoded information is contained therein that was input thereto by the advertiser, the PC 112 will then perform a number of operations. The first operation, according to the disclosed embodiment, is to extract the audio information within the received audio signal in the form of digital data, and then transmit this digital data to a defined location on the global communication network via a modem connection 114. This connection will be described hereinbelow. This information will be relayed to a proprietary location and the instructions sent back to the PC 112 as to the location of the advertiser associated with the code, and the PC 112 will then effect a communication link to that location such that the user can view on the display 118 information that the advertiser, by the fact of putting the tone onto the broadcast channel, desires the viewer to view. This information can be in the form of interactive programs, data files, etc. In one example, when an advertisement appears on the television, the tone can be generated and then additional data displayed on the display 118. Additionally, a streaming video program could be played on the PC received over the network, which streaming video program is actually longer than the advertising segment on the broadcast. Another example would be a sports game that would broadcast the tone in order to allow a user access to information that is not available over the broadcast network, such as additional statistics associated with the sports program, etc.

By utilizing the system described herein with respect to the disclosed embodiment of FIG. 1, an advertiser is allowed the ability to control a user's PC 112 through the use of tones embedded within a program audio signal. As will described hereinbelow, the disclosed embodiment utilizes particular routing information stored in the PC 112 which allows the encoded information in the received audio signal to route this information to a desired location on the network, and then allow other routing information to be returned to the PC 112 for control thereof to route the PC 112 to the appropriate location associated with that code.

Figure 2:
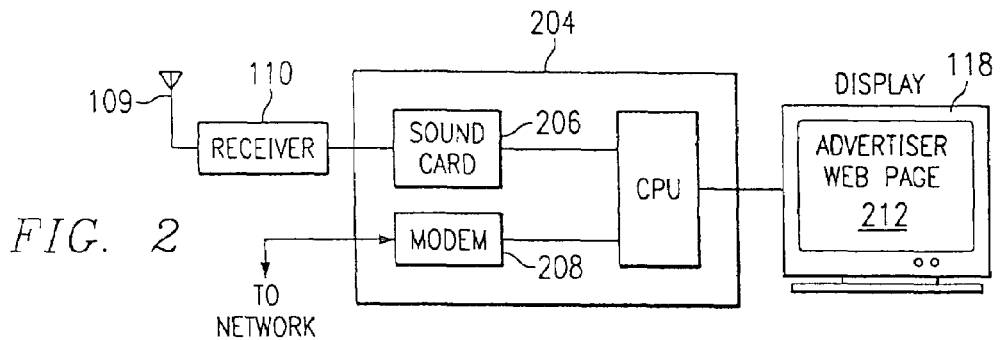
FIG. 2 illustrates the computer components employed in this embodiment.

Referring now to FIG. 2, there is illustrated a computer 204, similar to computer 112, connected to display information on display 118. The computer 204 comprises an internal audio or "sound" card 206 for receiving the transmitted audio signal through receive antenna 109 and receiver 110. The sound card 206 typically contains analog-to-digital circuitry for converting the analog audio signal into a digital signal. The digital signal may then be more easily manipulated by software programs. The receiver 110 separates the audio signal from the video signal. A special trigger signal located within the transmitted advertiser audio signal triggers proprietary software running on the computer 204 which launches a communication application, in this particular embodiment, the web browser application located on the PC 204. Coded advertiser information contained within the audio signal is then extracted and appended with the address of a proprietary server located on the communication network.

The remote server address is in the form of a URL. This appended data, in addition to other control codes, is inserted directly into the web browser application for automatic routing to the communication network. The web browser running on PC 204, and communicating to the network with an internal modem 208, in this embodiment, transmits the advertiser information to the remote server. The remote server cross-references the advertiser product information to the address of the advertiser server located on the network. The address of the advertiser server is routed back through the PC 204 web browser to the advertiser server. The advertiser product information is returned to PC 204 to be presented to the viewer on display 118. In this particular embodiment, the particular advertiser product information displayed is contained within the advertiser's web page 212. As mentioned above, the audio signal is audible to the human ear. Therefore the audio signal, as emitted from the TV speakers, may be input to the sound card 206 via a microphone. Furthermore, the audio signal need not be a real-time broadcast, but may be on video tapes, CDS, DVD, or other media which may be displayed at a later date. With the imminent implementation of high definition digital television, the audio signal output from the TV may also be digital. Therefore, direct input into a sound card for A/D purposes may not be necessary, but alternative interfacing techniques to accommodate digital-to-digital signal formats would apply.

Figure 3:
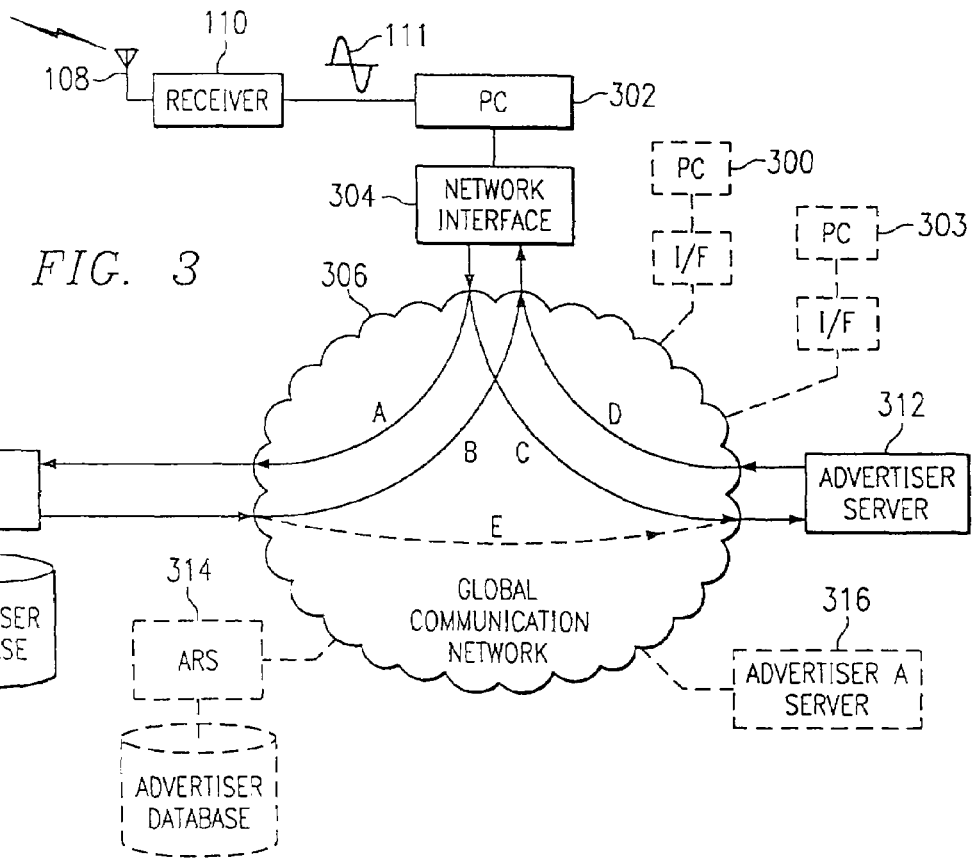
FIG. 3 illustrates system interactions over a global network.

Referring now to FIG. 3, there is illustrated a source PC 302, similar to PCS 204 and 112, connected to a global communication network ("GCN") 306 through an interface 304. In this embodiment, the audio signal 111 is received by PC 302 through its sound card 206. The audio signal 111 comprises a trigger signal which triggers proprietary software into launching a web browser application residing on the PC 302. The audio signal 111 also comprises advertiser product information which is extracted and appended with URL information of an Advertiser Reference Server ("ARS") 308. The ARS 308 is a system disposed on the GCN 306 that is defined as the location to which data in the audio signal 111 is to be routed. As such, data in the audio signal 111 will always be routed to the ARS 308, since a URL is unique on the GCN 306. Connected to the ARS 308 is a database 310 of product codes and associated manufacturer URLs. The database 310 undergoes a continual update process which is transparent to the user. As companies sign-on, i.e., subscribe, to this technology, manufacturer and product information is added to the database 310 without interrupting operation of the source PC 302 with frequent updates. When the advertiser server address URL is obtained from the ARS database 310, it and the request for the particular advertiser product information are automatically routed back through the web browser on PC 302, over to the respective advertiser server for retrieval of the advertiser product information to the PC 302. Additionally, although the disclosed invention discusses a global communication network, the system is also applicable to LANs, WANs, and peer-to-peer network configurations. It should be noted that the disclosed architecture is not limited to a single source PC 302, but may comprise a plurality of source PCS, e.g., PC 300 and PC 303. Moreover, a plurality of ARS 308 systems and advertiser servers 312 may be implemented, e.g., ARS 314, and advertiser server A 316, respectively.

The information transactions, in general, which occur between the networked systems of this embodiment, over the communication network, are the following. The web browser running on source PC 302 transmits a message packet to the ARS 308 over Path "A." The ARS 308 decodes the message packet and performs a cross-reference function with product information extracted from the received message packet to obtain the address of an advertiser server 312. A new message packet is assembled comprising the advertiser server 312 address, and sent back to the source PC 302 over Path "B." A "handoff" operation is performed whereby the source PC 302 browser simply reroutes the information on to the advertiser server 312 over Path "C," with the appropriate source and destination address appended. The advertiser server 312 receives and decodes the message packet. The request-for-advertiser-product-information is extracted and the advertiser 312 retrieves the requested information from its database for transmission back to the source PC 302 over Path "D." The source PC 302 then processes the information, i.e., for display to the viewer. The optional Path "E" is discussed hereinbelow. It should be noted that the disclosed methods are not limited to only browser communication applications, but may accommodate, with sufficient modifications by one skilled in the art, other communication applications used to transmit information over the Internet or communication network.

Figure 4A:
FIGS. 4a-4e illustrate the various message packets transmitted between the source PC and network servers used in the preferred embodiment.

Referring now to FIG. 4*a*, the message packet 400 sent from the source PC 302 to ARS 308 via path "A" comprises several fields. One field comprises the URL of the ARS 308 which indicates where the message packet is to be sent. Another field comprises the advertiser product code or other information derived from the audio signal 111, and any additional overhead information required for a given transaction. The product code provides a link to the address of the advertiser server 312, located in the database 310. Yet another field comprises the network address of the source PC 302. In general, network transmissions are effected in packets of information, each packet providing a destination address, a source address, and data. These packets vary depending upon the network transmission protocol utilized for communication. Although the protocols utilized in the disclosed embodiment are of a conventional protocol suite commonly known as TCP/IP, it should be understood that any protocols providing the similar basic functions can be used, with the primary requirement that a browser can forward the routing information to the desired URL in response to keystrokes being input to a PC. Within the context of this disclosure, "message packet" shall refer to and comprise the destination URL, product information, and source address, even though more than a single packet must be transmitted to effect such a transmission.

Figure 4B:
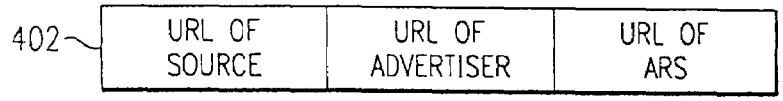

Upon receipt of the message packet 400 from source PC 302, ARS 308 processes the information in accordance with instructions embedded in the overhead information. The ARS 308 specifically will extract the product code information from the received packet 400 and, once extracted, will then decode this product code information. Once decoded, this information is then compared with data contained within the ARS advertiser database 310 to determine if there is a "hit." If there is no "hit" indicating a match, then information is returned to the browser indicating such. If there is a "hit," a packet 402 is assembled which comprises the address of the source PC 302, and information instructing the source PC 302 as to how to access, directly in a "handoff" operation, another location on the network, that of an advertiser server 312. This type of construction is relatively conventional with browsers such as Netscape® and Microsoft Internet Explorer® and, rather than displaying information from the ARS 308, the source PC 302 can then access the advertiser server 312. The ARS 308 transmits the packet 402 back to source PC 302 over Path "B." Referring now to FIG. 4*b*, the message packet 402 comprises the address of the source PC 302, the URL of the advertiser server 312 embedded within instructional code, and the URL of the ARS 308.

Figure 4C:

Upon receipt of the message packet 402 by the source PC 302, the message packet 402 is disassembled to obtain pertinent routing information for assembly of a new message packet 404. The web browser running on source PC 302 is now directed to obtain, over Path "C," the product information relevant to the particular advertiser server 312 location information embedded in message packet 404. Referring now to FIG. 4*c*, the message packet 404 for this transaction comprises the URL of the advertiser server 312, the request-for-product-information data, and the address of the source PC 302.

Figure 4D:
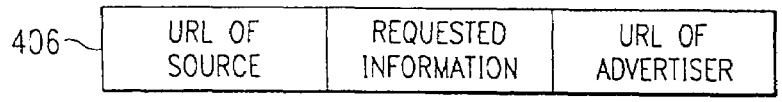

Upon receipt of the message packet 404 from source PC 302, advertiser server 312 disassembles the message packet 404 to obtain the request-for-product-information data. The advertiser server 312 then retrieves the particular product information from its database, and transmits it over Path "D" back to the source PC 302. Referring now to FIG. 4*d*, the message packet 406 for this particular transaction comprises the address of the source PC 302, the requested information, and the URL of the advertiser server 312.

Figure 4E:
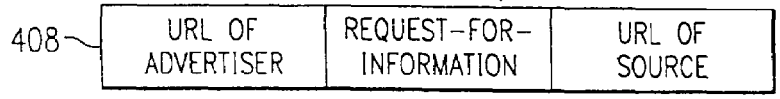

Optionally, the ARS 308 may make a direct request for product information over Path "E" to advertiser server 312. In this mode, the ARS 308 sends information to the advertiser server 312 instructing it to contact the source PC 302. This, however, is unconventional and requires more complex software control. The message packet 408 for this transaction is illustrated in FIG. 4*e*, which comprises the URL of the advertiser server 312, the request-for-product-information data, and the address of the source PC 302. Since product information is not being returned to the ARS 308, but directly to the source PC 302, the message packet 408 requires the return address to be that of the source PC 302. The product information is then passed directly to PC 302 over Path "D."

Figure 5:
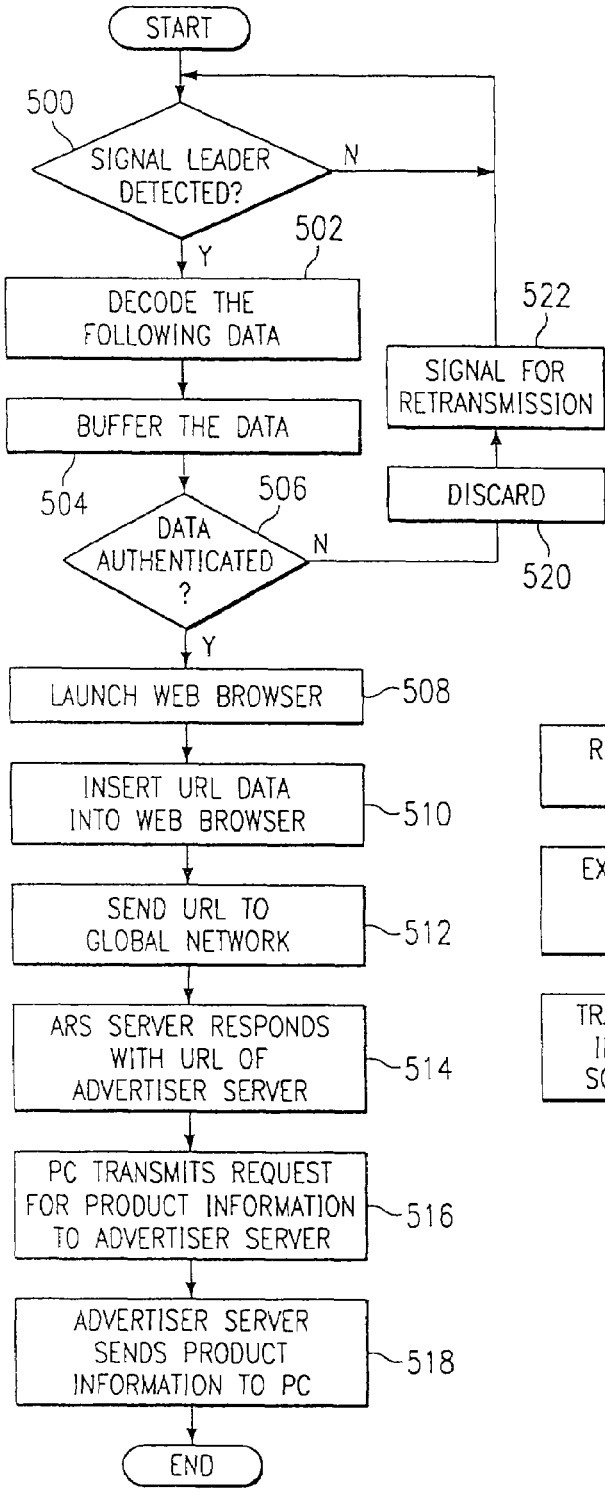
FIG. 5 is a flowchart depicting operation of the system according to the preferred embodiment.

Referring now to FIG. 5, the method for detecting and obtaining product information is as follows. In decision block 500, a proprietary application running resident on a source computer PC 302 (similar to PC 204) monitors the audio input for a special trigger signal. Upon detection of the trigger signal, data following the trigger signal is decoded for further processing, in function block 502. In function block 504, the data is buffered for further manipulation. In decision block 506, a determination is made as to whether the data can be properly authenticated. If not, program flow continues through the "N" signal to function block 520 where the data is discarded. In function block 522, the program then signals for a retransmission of the data. The system then waits for the next trigger signal, in decision block 500. If properly authenticated in decision block 506, program flow continues through the "Y" signal path where the data is then used to launch the web browser application, as indicated in function block 508. In function block 510, the web browser receives the URL data, which is then automatically routed through the computer modem 208 to the network interface 304 and ultimately to the network 306. In function block 514, the ARS 308 responds by returning the URL of advertiser server 312 to the PC 302. In function block 516, the web browser running on the source PC 302, receives the advertiser URL information from the ARS 308, and transmits the URL for the product file to the advertiser server 312. In block 518, the advertiser server 312 responds by sending the product information to the source PC 302 for processing.

The user may obtain the benefits of this architecture by simply downloading the proprietary software over the network. Other methods for obtaining the software are well-known; for example, by CD, diskette, or pre-loaded hard drives.

Figure 6:
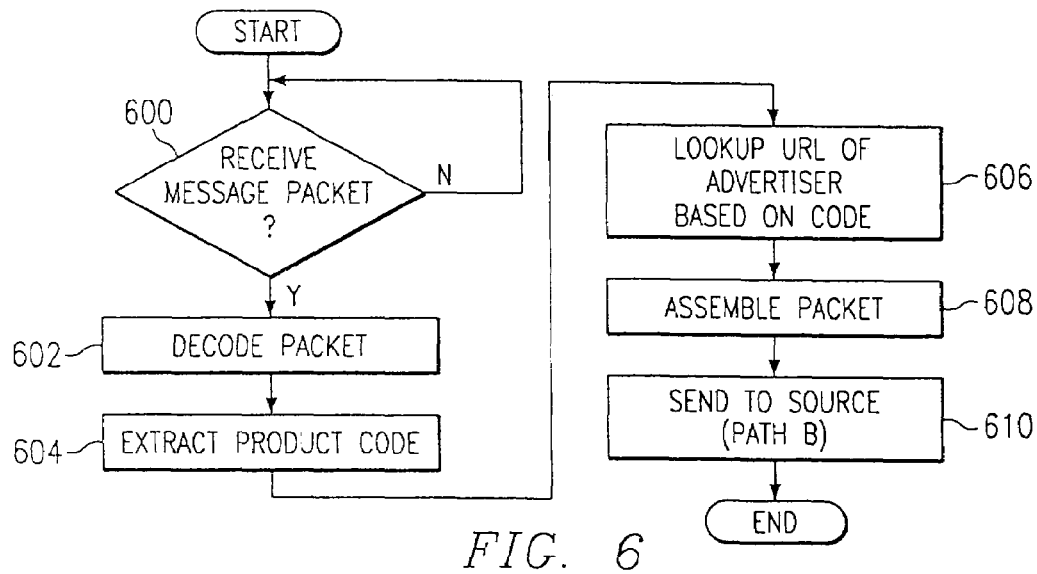
FIG. 6 illustrates a flowchart of actions taken by the Advertiser Reference Server ("ARS") server.

Referring now to FIG. 6, there is illustrated a flowchart of the process the ARS 308 may undergo when receiving the message packet 400 from the source PC 302. In decision block 600, the ARS 308 checks for the receipt of the message packet 400. If a message packet 400 is not received, program flow moves along the "N" path to continue waiting for the message. If the message packet 400 is received, program flow continues along path "Y" for message processing. Upon receipt of the message packet 400, in function block 602, the ARS 308 decodes the message packet 400. The product code is then extracted independently in function block 604 in preparation for matching the product code with the appropriate advertiser server address located in the database 310. In function block 606, the product code is then used with a lookup table to retrieve the advertiser server 312 URL of the respective product information contained in the audio signal data. In function block 608, the ARS 308 then assembles message packet 402 for transmission back to the source PC 302. Function block 610 indicates the process of sending the message packet 402 back to the source PC 302 over Path "B."

Figure 7:
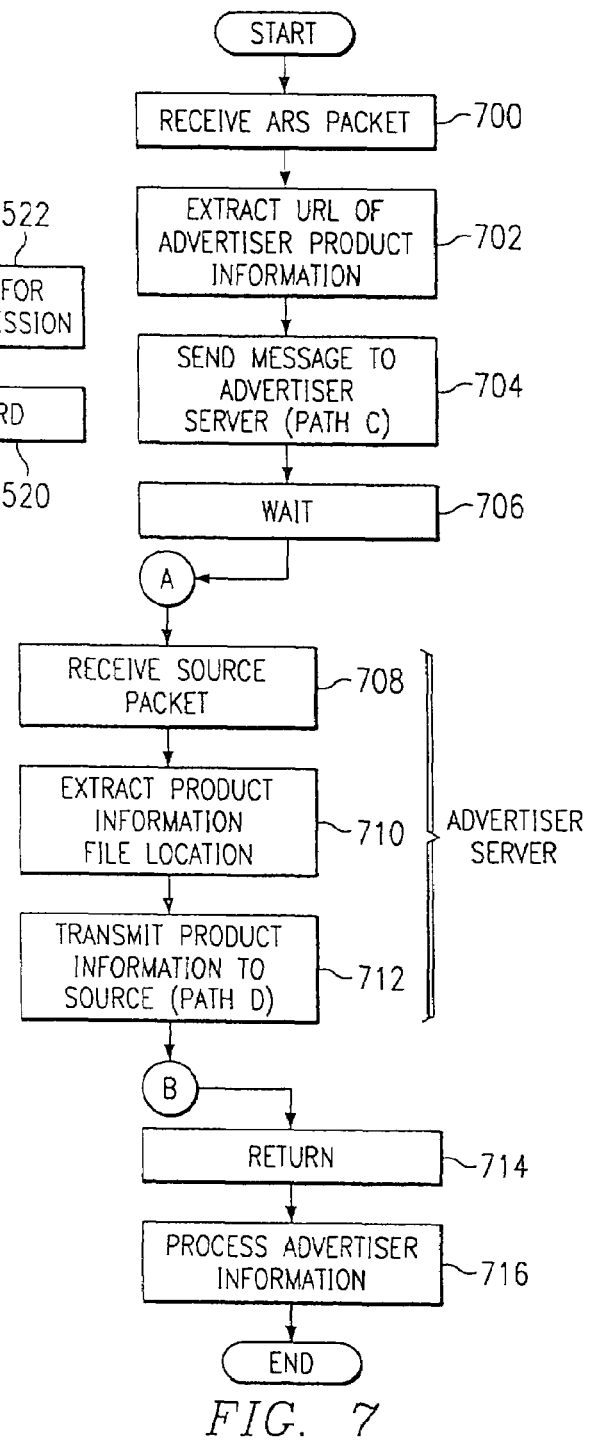
FIG. 7 illustrates a flowchart of the interactive process between the source computer and ARS.

Referring now to FIG. 7, there is illustrated a flowchart of the interactive processes between the source PC 302 and the advertiser server 312. In function block 700, the source PC 302 receives the message packet 402 back from the ARS 308 and begins to decode the packet 402. In function block 702, the URL of the advertiser product information is extracted from the message packet 402 and saved for insertion into the message packet 404 to the advertiser server 312. The message packet 404 is then assembled and sent by the source PC 302 over Path "C" to the advertiser server 312, in function block 704. While the source PC 302 waits, in function block 706, the advertiser server 312 receives the message packet 404 from the source PC 302, in function block 708, and disassembles it. The product information location is then extracted from the message packet 404 in function block 710. The particular product information is retrieved from the advertiser server 312 database for transmission back to the source PC 302. In function block 712, the product information is assembled into message packet 406 and then transmitted back to the source PC 302 over Path "D." Returning to the source PC 302 in function block 714, the advertiser product information contained in the message packet 406 received from the advertiser server 312, is then extracted and processed in function block 716.

Figure 8:
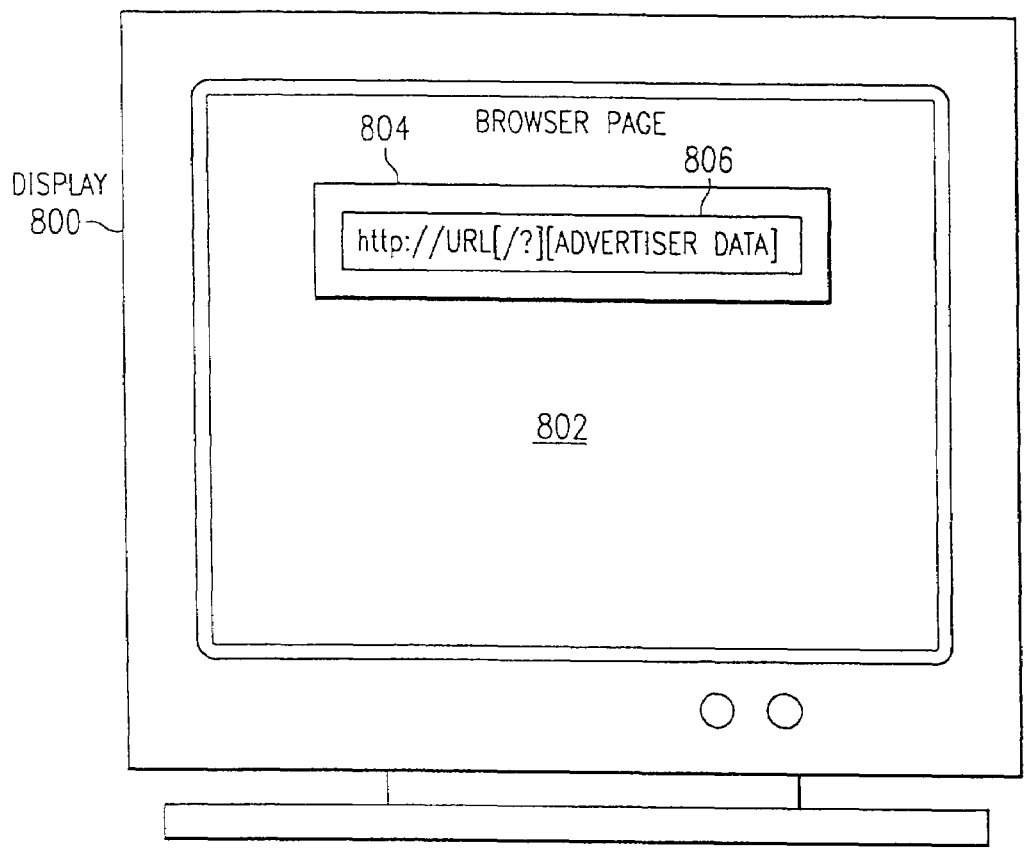
FIG. 8 illustrates a web browser page receiving the modified URL/advertiser product data according to the preferred embodiment.

Referring now to FIG. 8, after receipt of a trigger signal, a web browser application on a source PC 302 is automatically launched and computer display 800 presents a browser page 802. Proprietary software running on the source PC 302 processes the audio signal data after being digitized through the sound card 206. The software appropriately prepares the data for insertion directly into the web browser by extracting the product information code and appending keystroke data to this information. First, a URL page 804 is opened in response to a Ctrl-O command added by the proprietary software as the first character string. Opening URL page 804 automatically positions the cursor in a field 806 where additional keystroke data following the Ctrl-O command will be inserted. After URL page 804 is opened, the hypertext protocol preamble http:// is inserted into the field 806. Next, URL information associated with the location of the ARS 308 is inserted into field 806. Following the ARS 308 URL data are the characters /? to allow entry of variables immediately following the /? characters. In this embodiment, the variable following is the product information code received in the audio signal. The product code information also provides the cross-reference information for obtaining the advertiser URL from the ARS database 310. Next, a carriage return is added to send the URL/product data and close the window 804. After the message packet 400 is transmitted to the ARS 308 from the source PC 302, transactions from the ARS 308, to the source PC 302, to the advertiser server 312, and back to the source PC 302, occur quickly and are transparent to the viewer. At this point, the next information the viewer sees is the product information which was received from the advertiser server 312.

Figure 9:
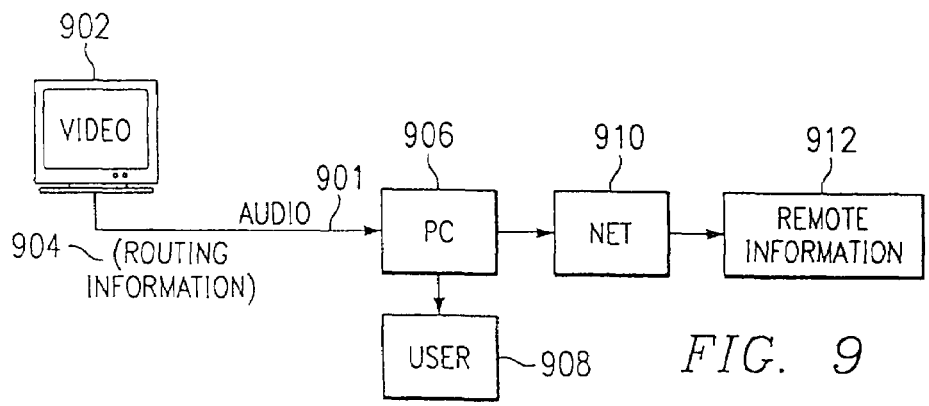
FIG. 9 illustrates a simplified block diagram of the disclosed embodiment.

Referring now to FIG. 9, there is illustrated a block diagram of a more simplified embodiment. In this embodiment, a video source 902 is provided which is operable to provide an audio output on an audio cable 901 which provides routing information referred to by reference numeral 904. The routing information 904 is basically information contained within the audio signal. This is an encoded or embedded signal. The important aspect of the routing information 904 is that it is automatically output in realtime as a function of the broadcast of the video program received over the video source 902. Therefore, whenever the program is being broadcast in realtime to the user 908, the routing information 904 will be output whenever the producer of the video desires it to be produced. It should be understood that the box 902 representing the video source could be any type of media that will result in the routing information being output. This could be a cassette player, a DVD player, an audio cassette, a CD ROM or any such media. It is only important that this is a program that the producer develops which the user 908 watches in a continuous or a streaming manner. Embedded within that program, at a desired point selected by the producer, the routing information 904 is output.

The audio information is then routed to a PC 906, which is similar to the PC 112 in FIG. 1. A user 908 is interfaced with the PC to receive information thereof, the PC 906 having associated therewith a display (not shown). The PC 906 is interfaced with a network 910, similar to the network 306 in FIG. 3. This network 910 has multiple nodes thereon, one of which is the PC 906, and another of which is represented by a network node 912 which represents remote information. The object of the present embodiment is to access remote information for display to the user 908 by the act of transmitting from the video program in block 902 the routing information 904. This routing information 904 is utilized to allow the PC 906 which has a network "browser" running thereon to "fetch" the remote information at the node 912 over the network 910 for display to the user 908. This routing information 904 is in the form of an embedded code within the audio signal, as was described hereinabove.

Referring now to FIG. 10, there is illustrated a more detailed block diagram of the embodiment of FIG. 9. In this embodiment, the PC 906 is split up into a couple of nodes, a first PC 1002 and a second PC 1004. The PC 1002 resides at the node associated with the user 908, and the PC 1004 resides at another node. The PC 1004 represents the ARS 308 of FIG. 3. The PC 1004 has a database 1006 associated therewith, which is basically the advertiser database 310. Therefore, there are three nodes on the network 910 necessary to implement the disclosed embodiment, the PC 1002, the PC 1004 and the remote information node 912. The routing information 904 is utilized by the PC 1002 for routing to the PC 1004 to determine the location of the remote information node 912 on the network 910. This is returned to the PC 1002 and a connection made directly with the remote information node 912 and the information retrieved therefrom to the user 908. The routing information 904 basically constitutes primary routing information. watches in a continuous or a streaming manner. Embedded within that program, at a desired point selected by the producer, the routing information 904 is output.

The audio information is then routed to a PC 906, which is similar to the PC 112 in FIG. 1. A user 908 is interfaced with the PC to receive information thereof, the PC 906 having associated therewith a display (not shown). The PC 906 is interfaced with a network 910, similar to the network 306 in FIG. 3. This network 910 has multiple nodes thereon, one of which is the PC 906, and another of which is represented by a network node 912 which represents remote information. The object of the present embodiment is to access remote information for display to the user 908 by the act of transmitting from the video program in block 902 the routing information 904. This routing information 904 is utilized to allow the PC 906 which has a network "browser" running thereon to "fetch" the remote information at the node 912 over the network 910 for display to the user 908. This routing information 904 is in the form of an embedded code within the audio signal, as was described hereinabove.

Referring now to FIG. 10, there is illustrated a more detailed block diagram of the embodiment of FIG. 9. In this embodiment, the PC 906 is split up into a couple of nodes, a first PC 1002 and a second PC 1004. The PC 1002 resides at the node associated with the user 908, and the PC 1004 resides at another node. The PC 1004 represents the ARS 308 of FIG. 3. The PC 1004 has a database 1006 associated therewith, which is basically the advertiser database 310. Therefore, there are three nodes on the network 910 necessary to implement the disclosed embodiment, the PC 1002, the PC 1004 and the remote information node 912. The routing information 904 is utilized by the PC 1002 for routing to the PC 1004 to determine the location of the remote information node 912 on the network 910. This is returned to the PC 1002 and a connection made directly with the remote information node 912 and the information retrieved therefrom to the user 908. The routing information 904 basically constitutes primary routing information.

Referring now to FIG. 11, there is illustrated a diagrammatic view of how the network packet is formed for sending the primary routing information to the PC 1004. In general, the primary routing information occupies a single field which primary routing information is then assembled into a data packet with the secondary routing information for transfer to the network 910. This is described hereinabove in detail.

Referring now to FIG. 12, there is illustrated an alternate embodiment to that of FIG. 9. In this embodiment, the video source 902 has associated therewith an optical region 1202, which optical region 1202 has disposed therein an embedded video code. This embedded video code could be relatively complex or as simple as a grid of dark and white regions, each region in the grid able to have a dark color for a logic "1" or a white region for a logic "0." This will allow a digital value to be disposed within the optical region 1202. A sensor 1204 can then be provided for sensing this video code. In the example above, this would merely require an array of optical detectors, one for each region in the grid to determine whether this is a logic "1" or a logic "0" state. One of the sensed video is then output to the PC 906 for processing thereof to determine the information contained therein, which information contained therein constitutes the primary routing information 904. Thereafter, it is processed as described hereinabove with reference to FIG. 9.

Referring now to FIG. 13, there is illustrated a block diagram for an embodiment wherein a user's profile can be forwarded to the original subscriber or manufacturer. The PC 906 has associated therewith a profile database 1302, which profile database 1302 is operable to store a profile of the user 908. This profile is created when the program, after initial installation, requests profile information to be input in order to activate the program. In addition to the profile, there is also a unique ID that is provided to the user 908 in association with the browser program that runs on the PC 906. This is stored in a storage location represented by a block 1304. This ID 1304 is accessible by a remote location as a "cookie" which is information that is stored in the PC 906 in an accessible location, which accessible location is actually accessible by the remote program running on a remote node.

The ARS 308, which basically constitutes the PC 1004 of FIG. 10, is operable to have associated therewith a profile database 1308, which profile database 1308 is operable to store profiles for all of the users. The profile database 1308 is a combination of the information stored in profile database 1302 for all of the PCS 906 that are attachable to the system. This is to be distinguished from information stored in the database 310 of the ARS 308, the advertiser's database, which contains intermediate destination tables. When the routing information in the primary routing information 904 is forwarded to the ARS 308 and extracted from the original data packet, the lookup procedure described hereinabove can then be performed to determine where this information is to be routed. The profile database 1302 is then utilized for each transaction, wherein each transaction in the form of the routing information received from the primary routing information 904 is compared to the destination tables of database 310 to determine what manufacturer is associated therewith.

The associated ID 1304 that is transmitted along with the routing information in primary routing information 904 is then compared with the profile database 1308 to determine if a profile associated therewith is available. This information is stored in a transaction database 1310 such that, at a later time, for each routing code received in the form of the information in primary routing information 904, there will associated therewith the IDs 1304 of each of the PCS 906. The associated profiles in database 1308, which are stored in association with IDs 1304, can then be assembled and transmitted to a subscriber as referenced by a subscriber node 1312 on the network 910. The ARS 308 can do this in two modes, a realtime mode or a non-realtime mode. In a realtime mode, each time a PC 906 accesses the advertiser database 310, that user's profile information is uploaded to the subscriber node 1312. At the same time, billing information is generated for that subscriber 1312 which is stored in a billing database 1316. Therefore, the ARS 308 has the ability to inform the subscriber 1312 of each transaction, bill for those transactions, and also provide to the subscriber 1312 profile information regarding who is accessing the particular product advertisement having associated therewith the routing information field 904 for a particular routing code as described hereinabove. This information, once assembled, can then be transmitted to the subscriber 1312 and also be reflected in billing information and stored in the billing information database 1316.

Figure 14:
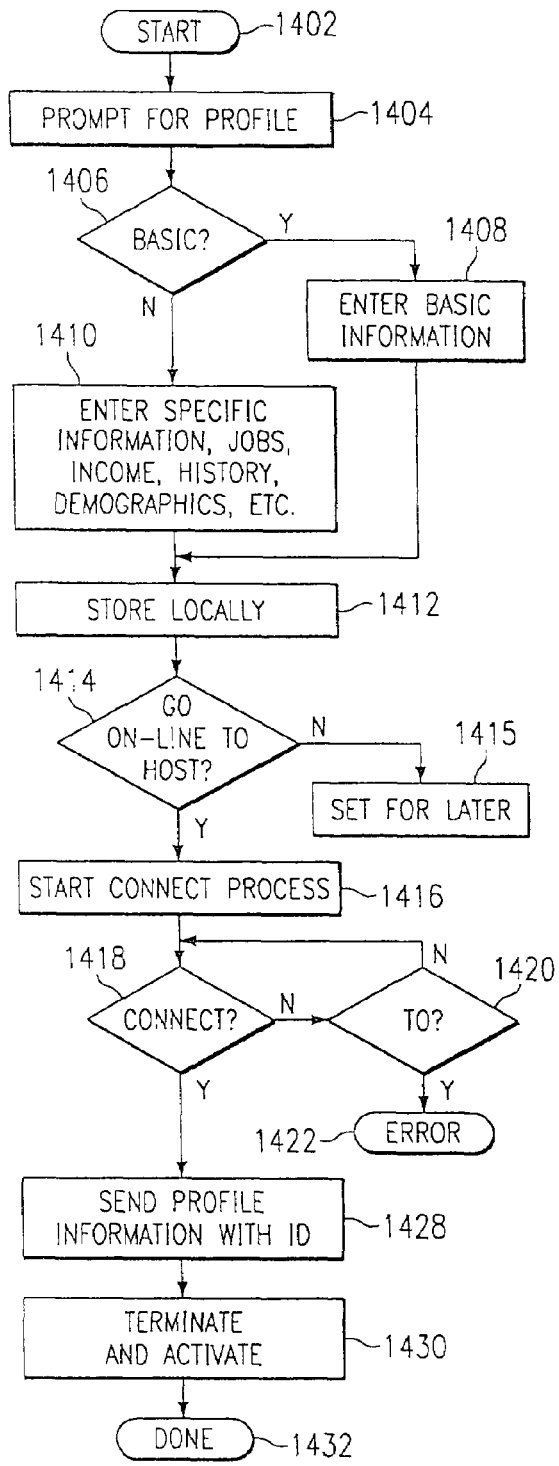
FIG. 14 illustrates a flowchart for generating the profile and storing at the ARS.

Referring now to FIG. 14, there is illustrated a flowchart depicting the operation for storing the profile for the user. The program is initiated in a block 1402 and then proceeds to a function block 1404, wherein the system will prompt for the profile upon initiation of the system. This initiation is a function that is set to activate whenever the user initially loads the software that he or she is provided. The purpose for this is to create, in addition to the setup information, a user profile. Once the user is prompted for this, then the program will flow to a decision block 1406 to determine whether the user provides basic or detailed information. This is selectable by the user. If selecting basic, the program will flow to a function block 1408 wherein the user will enter basic information such as name and serial number and possibly an address. However, to provide some incentive to the user to enter more information, the original prompt in function block 1404 would have offers for such things as coupons, discounts, etc., if the user will enter additional information. If the user selects this option, the program flows from the decision block 1406 to a function block 1410. In the function block 1410, the user is prompted to enter specific information such as job, income level, general family history, demographic information and more. There can be any amount of information collected in this particular function block.

Once all of the information is collected, in either the basic mode or the more specific mode, the program will then flow to a function block 1412 where this information is stored locally. The program then flows to a decision block 1414 to then go on-line to the host or the ARS 308. In general, the user is prompted to determine whether he or she wants to send this information to the host at the present time or to send it later. If he or she selects the "later" option, the program will flow to a function block 1415 to prompt the user at a later time to send the information. In the disclosed embodiment, the user will not be able to utilize the software until the profile information is sent to the host. Therefore, the user may have to activate this at a later time in order to connect with the host.

If the user has selected the option to upload the profile information to the host, the program will flow to the function block 1416 to initiate the connect process and then to a decision block 1418 to determine if the connection has been made. If not, the program will flow along a "N" path to a time to decision block 1420 which will timeout to an error block 1422 or back to the input of the connect decision block 1418. The program, once connected, will then flow along a "Y" path from decision block 1418 to a function block 1428 to send the profile information with the ID of the computer or user to the host. The ID is basically, as described hereinabove, a "cookie" in the computer which is accessed by the program when transmitting to the host. The program will then flow to a function block 1430 to activate the program such that it, at later time, can operate without requiring all of the setup information. In general, all of the operation of this flowchart is performed with a "wizard" which steps the user through the setup process. Once complete, the program will flow to a Done block 1432.

Figure 15:
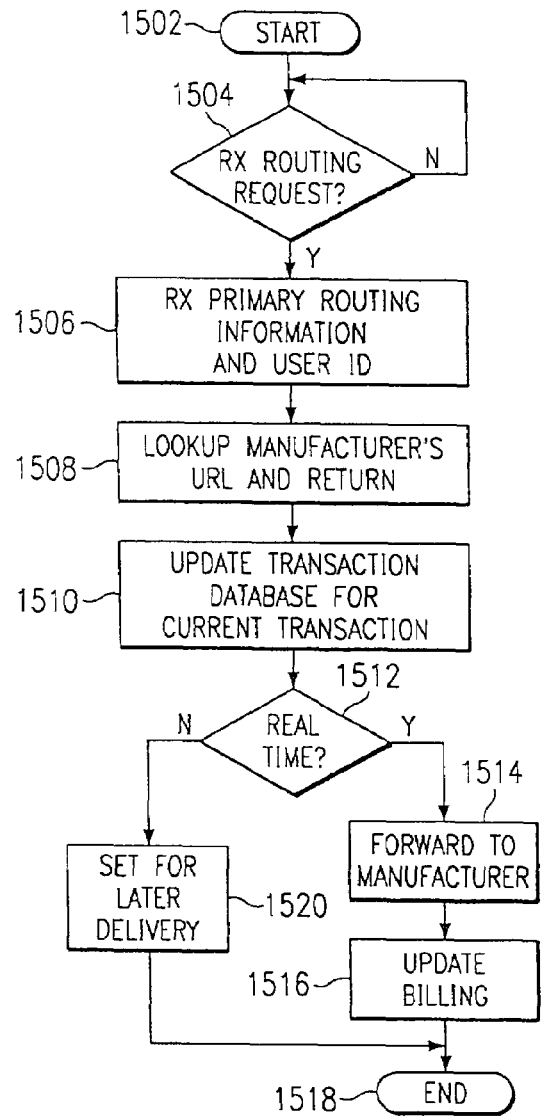
FIG. 15 illustrates a flowchart for processing the profile information when information is routed to a user.

Referring now to FIG. 15, there is illustrated a flowchart depicting the operation of the host when receiving a transaction. The program is initiated at a Start block 1502 and then proceeds to decision block 1504, wherein it is determined whether the system has received a routing request, i.e., the routing information 904 in the form of a tone, etc., embedded in the audio signal, as described hereinabove with respect to FIG. 9. The program will loop back around to the input of decision block 1504 until the routing request has been received. At this time, the program will flow along the "Y" path to a function block 1506 to receive the primary routing information and the user ID. Essentially, this primary routing information is extracted from the audio tone, in addition to the user ID. The program then flows to a function block 1508 to look up the manufacturer URL that corresponds to the received primary routing information and then return the necessary command information to the originating PC 112 in order to allow that PC 112 to connect to the destination associated with the primary routing information. Thereafter, the program will flow to a function block 1510 to update the transaction database 1310 for the current transaction. In general, the routing information 904 will be stored as a single field with the associated IDs. The profile database 1308, as described hereinabove, has associated therewith detailed profiles of each user on the system that has activated their software in association with their ID. Since the ID was sent in association with the routing information, what is stored in the transaction database 1310 is the routing code, in association with all of the IDs transmitted to the system in association with that particular routing code. Once this transaction database 1310 has been updated, as described hereinabove, the transactions can be transferred back to the subscriber at node 312 with the detailed profile information from the profile database 1308.

The profile information can be transmitted back to the subscriber or manufacturer at the node 312 in realtime or non-realtime. A decision block 1512 is provided for this, which determines if the delivery is realtime. If realtime, the program will flow along a "Y" path to a function block 1514 wherein the information will be immediately forwarded to the manufacturer or subscriber. The program will then flow to a function block 1516 wherein the billing for that particular manufacturer or subscriber will be updated in the billing database 1316. The program will then flow into an End block 1518. If it was non-realtime, the program moves along the "N" path to a function block 1520 wherein it is set for a later delivery and it is accrued in the transaction database 1310. In any event, the transaction database 1310 will accrue all information associated with a particular routing code.

With a realtime transaction, it is possible for a manufacturer to place an advertisement in a magazine or to place a product on a shelf at a particular time. The manufacturer can thereafter monitor the times when either the advertisements are or the products are purchased. Of course, they must be scanned into a computer which will provide some delay. However, the manufacturer can gain a very current view of how a product is moving. For example, if a cola manufacturer were to provide a promotional advertisement on, for example, television, indicating that a new cola was going to be placed on the shelf and that the first 1000 purchasers, for example, scanning their code into the network would receive some benefit, such as a chance to win a trip to some famous resort in Florida or some other incentive, the manufacturer would have a very good idea as to how well the advertisement was received. Further, the advertiser would know where the receptive markets were. If this advertiser, for example, had placed the television advertisement in ten cities and received overwhelming response from one city, but very poor response from another city, he would then have some inclination to believe that either the one poor-response city was not a good market or that the advertising medium he had chosen was very poor. Since the advertiser can obtain a relatively instant response and also content with that response as to the demographics of the responder, very important information can be obtained in a relatively short time.

It should be noted that the disclosed embodiment is not limited to a single source PC 302, but may encompass a large number of source computers connected over a global communication network. Additionally, the embodiment is not limited to a single ARS 308 or a single advertiser server 312, but may include a plurality of ARS and advertiser systems, indicated by the addition of ARS 314 and advertiser server A 316, respectively. It should also be noted that this embodiment is not limited only to global communication networks, but also may be used with LAN, WAN, and peer-to-peer configurations.

It should also be noted that the disclosed embodiment is not limited to a personal computer, but is also applicable to, for example, a Network Computer ("NetPC"), a scaled-down version of the PC, or any system which accommodates user interaction and interfaces to information resources.

One typical application of the above noted technique is for providing a triggering event during a program, such as a sport event. In a first example, this may be generated by an advertiser. One could imagine that, due to the cost of advertisements in a high profile sports program, there is a desire to utilize this time wisely. If, for example, an advertiser contracted for 15 seconds worth of advertising time, they could insert within their program a tone containing the routing information. This routing information can then be output to the user's PC 302 which will cause the user's PC 302 to, via the network, obtain information from a remote location typically controlled by the advertiser. This could be in the form of an advertisement of a length longer than that contracted for. Further, this could be an interactive type of advertisement. An important aspect to the type of interaction between the actual broadcast program with the embedded routing information and the manufacturer's site is the fact that there is provided information as to the user's PC 302 and a profile of the user themselves. Therefore, an advertiser can actually gain realtime information as to the number of individuals that are watching their particular advertisement and also information as to the background of those individuals, profile information, etc. This can be a very valuable asset to an advertiser.

In another example, the producer of the program, whether it be an on-air program, a program embedded in a video tape, CD-ROM, DVD, or a cassette, can allow the user to automatically access additional information that is not displayed on the screen. For example, in a sporting event, various statistics can be provided to the user from a remote location, merely by the viewer watching the program. When these statistics are provided, the advertiser can be provided with profile information and background information regarding the user. This can be important when, for example, the user may record a sports program. If the manufacturer sees that this program routing code is being output from some device at a time later than the actual broadcast itself, this allows the advertisers to actually see that their program is still being used and also what type of individual is using it. Alternatively, the broadcaster could determine the same and actually bill the advertiser an additional sum for a later broadcast. This is all due to the fact that the routing information automatically, through a PC and a network, will provide an indication to the advertiser the time at which the actual information was broadcast.

The different type of medium that can be utilized with the above embodiment are such things as advertisements, which are discussed hereinabove, contests, games, news programs, education, coupon promotional programs, demonstration media (demos), and photographs, all of which can be broadcast on a private site or a public site. This all will provide the ability to allow realtime interface with the network and the remote location for obtaining the routed information and also allow for realtime billing and accounting.

Referring now to FIG. 16, there is illustrated a general block diagram of a disclosed embodiment. A bar code scanning input device 1600 is provided by a input device distributor to customers and is associated with that distributor via a input device ID stored therein. The input device 1600 is either sold or freely distributed to customers for use with their personal computing systems. Since more and more products are being sold using bar codes, it can be appreciated that a user having the input device 1600 can scan bar codes of a multitude of products in order to obtain more information. Information about these products can be made immediately available to the user from the manufacturer for presentation by the user's computer 302. Beyond simply displaying information about the product in which the user is interested, the input device distributor may include additional advertising information for display to the user such as information about other promotions or products provided or sold by the input device distributor. Similarly, advertisers may provide catalogs of advertisements or information in newspapers or periodicals where the user simply scans the bar code associated with the advertisement using the input device 1600 to obtain further information. There is provided a paper source 1602 having contained thereon an advertisement 1604 and an associated bar code 1606. (Note that the disclosed concept is not limited to scanning of bar codes 1606 from paper sources 1602, but is also operable to scan a bar code 1606 on the product itself. Also, the input device 1600 can be any type of device that will scan any type of image having information encoded therein.)

After obtaining the input device 1600 from the input device distributor, the user connects the input device 1600 to their PC 302. During a scanning operation, input device 1600 reads bar code data 1606 and the input device ID into a "wedge" interface 1608 for conversion into keyboard data, which keyboard data is passed therefrom into the keyboard input port of PC 302. The importance of the input device ID will be discussed in more detail hereinbelow.

The wedge interface 1608 is simply an interface box containing circuitry that accommodates inputs from both the scanning input device 1600 and a computer keyboard 1610. This merely allows the information scanned by the input device 1600 to be input into the PC 302. In the disclosed embodiment, the wedge interface 1608 will convert any information. The data output from the input device 1600 is passed into the wedge interface 1608 for conversion into keyboard data which is readily recognizable by the PC 302. Therefore, the input device 1600 is not required to be connected to a separate port on the PC 302. This data is recognized as a sequence of keystrokes. However, the output of the input device 1600 can be input in any manner compatible with the PC 302. When not receiving scanner data, the wedge interface 1608 simply acts as a pass-through device for keyboard data from the keyboard 1610. In any case, the information is ultimately processed by a processor in the PC 302 and can be presented to the user on a display 1612. The wedge interface 1608 operable to provide a decoding function for the bar code 1606 and conversion thereof to keystroke input data.

In operation, the product code of a product is provided in the form of a bar code 1606. This bar code 1606 is the "link" to a product. The disclosed embodiment is operable to connect that product information contained in the bar code 1606 with a web page of the manufacturer of that product by utilizing the bar code 1606 as the product "identifier." The program operating on the PC 302 provides routing information to the ARS 308 after launching the browser on the PC 302 and connecting to the ARS 308 over the GCN 306, which ARS 308 then performs the necessary steps to cause the browser to connect to the manufacturer web site, while also providing for an accounting step, as will be described in more detail hereinbelow.

The bar code 1606 by itself is incompatible with any kind of network for the purposes of communication therewith. It is primarily provided for a retail-type setting. Therefore, the information contained in the bar code 1606, by itself, does not allow for anything other than identification of a product, assuming that one has a database 1614 containing information as to a correlation between the product and the bar code 1606.

The wedge interface 1608 is operable to decode the bar code 1606 to extract the encoded information therein, and append to that decoded bar code information relating to an ID for the input device 1600. This information is then forwarded to the ARS 308 by the resident program in the PC 302. This is facilitated by intermediate routing information stored in the program indicating to which node on the GCN 306 the scanned bar code information is to be sent, i.e., to the ARS 308. It is important to note that the information in the bar code 1606 must be converted from its optical image to numerical values which are then ultimately input to the keyboard input port of PC 302 and converted into data compatible with communication software residing on the PC 302 (in this case, HTML language for insertion into a browser program). When the scanned information is input to the PC 302, the resident program launches the browser program and then assembles a communication packet comprised of the URL of the ARS 308, the input device ID and the user ID. If another type of communications program were utilized, then it would have to be converted into language compatible with that program. Of course, a user could actually key in the information on the bar code 102 and then append the appropriate intermediate routing information thereafter. As will be described hereinbelow, the intermediate routing information appended thereto is the URL of the ARS 308 disposed on the GCN 306.

As part of the configuration for using the input device 1600, the PC 302 hosts input device software which is operable to interpret data transmitted from the input device 1600, and to create a message packet having the scanned product information and input device ID, routing information, and a user ID which identifies the user location of the input device 1600. The input device software loads at boot-up of the PC 302 and runs in the background. In response to receiving a scanned bar code 1606, the wedge interface 1608 outputs a keystroke code (e.g., ALT-F10) to bring the input device program into the foreground for interaction by the operating system. The input device program then inserts the necessary information into the browser program. The message packet is then transmitted to interface 304 across the global communication network 306 to the ARS 308. The ARS 308 interrogates the message packet and performs a lookup function using the ARS database 310. If a match is found between particular parameters of the message packet, a return message packet is sent back to the PC 302 for processing.

The input device program running on PC 302 functions to partition the browser window displayed to the user into several individual areas. This is for the purpose of preparing to present to the user selected information in each of the individual areas (also called "framing"). The selected information comprises the product information which the user requested by scanning the bar code 1606 using the input device 1600, information about the input device distributor which establishes the identity of the company associated with that particular input device 1600, and at least one or more other frames which may be advertisements related to other products that the input device distributor sells. Note that the advertisements displayed by the input device distributor may be related to the product of interest or totally unrelated. For example, if a user scans the bar code 1606 of a soda from Company A, the input device distributor may generate an advertisement of a new soft drink being marketed by Company A, that it sells. On the other hand, the input device distributor may also structure the display of information to the user such that a user requesting product information of a Product X may get the requested information of Product X along with advertisements for a competing item Product Y. Essentially, the input device distributor is free to generate any advertisement to the user in response to the user requesting product information.

The return message packet transmitted from the ARS 308 to the PC 302 is then transmitted back across the GCN 306 to the advertiser server 312. The advertiser server 312 restructures the message packet and appends the particular product information for transmission back to the PC 302. Upon receiving the particular advertiser information from advertiser server 312, the PC 302 then retransmits a message to the input device distributor site 1616 and E-commerce site 1618 to obtain the information that needs to be framed in the browser window displayed to the user.

Therefore, the input device 1600 is associated with the input device distributor by way of a input device ID such that scanning a product bar code 1606 in order to obtain information about that particular product generates one or more responses from one or more remote sites disposed on the GCN 306. Stored in the input device 1600 is the input device ID which establishes its relationship to the input device distributor. Proprietary input device software running on the PC 302 operates to decode scanned bar code information and the input device ID received from the input device 1600 and wedge interface 1608, and also provides a unique user ID for establishing the location of the user of the input device 1600. The input device software also assembles message packets and works in conjunction with the on-board communication software (e.g., a browser) to automatically route the message packets across the GCN 306 such that the one or more remote sites disposed on the GCN 306 return information to be framed for presentation to the user.

Referring now to FIG. 17, there is illustrated a conversion circuit of the wedge interface. A microcontroller 1700 provides conversion of the data from the input device 1600 and controls interfacing of the keyboard 1610 and input device 1600 with the PC 302. The microcontroller 1700 has contained therein a memory 1702 or it can have external memory. There are provided a plurality of input device interfaces 1704 to the input device 1600, a plurality of PC interfaces 1706 to the PC 302, and plurality of keyboard interfaces 1708 to the keyboard 1610. In general, the input device interfaces 1704 comprise a serial data line, a ground line, and a power line. Similarly, the keyboard interfaces 1708 comprise a serial data line, a ground line, a clock line, and a power line. The PC 302 provides a clock line, a power line, a serial data, and a ground line for input to the microcontroller 1700. The microcontroller 1700 is operable to receive signals from the keyboard 1610 and transfer the signals to the PC 302 as keyboard signals. Operation with the keyboard 1610 is essentially a "pass-through" procedure. Data output from the keyboard 1610 is already in keyboard format, and therefore requires no conversion by the wedge interface 1608. With respect to the input device 1600, the serial data is not compatible with a keyboard 1610 and, therefore, it must be converted into a keyboard format in order to allow input thereof to the keyboard input of the PC 302.

The microcontroller 1700 performs this function after decoding this bar code information, and conversion of this bar code information into an appropriate stream of data which is comprised of the bar code information and the appended URL. This appended URL will be pre-stored in the memory 1702 and is programmable at the time of manufacture. It is noted that the memory 1702 is illustrated as being contained within the microcontroller 1702 to provide a single chip solution. However, this could be external memory that is accessible by the microcontroller 1702. Therefore, the microcontroller 1700 provides an interface between the input device 1600 and the keyboard 1610 to the PC 302 which allows the input device 1600 to receive coded information and convert it to keyboard strokes or, alternatively, to merely pass-through the keystrokes from the keyboard 1610. Therefore, the user need not install any type of plug-in circuit board into the motherboard of the PC 302 in order to provide an interface to the input device 1600; rather, the user need only utilize the already available keyboard port in order to input the appropriate data into the system.

In this particular disclosed embodiment, the microcontroller 1700 comprises a PIC16C73 microcontroller by Microchip Technologies™. The PIC16C73 device is a low cost CMOS 8-bit microcontroller with an integrated analog-to-digital converter. The PIC16C73 device, as illustrated in the disclosed embodiment, has 192 bytes of RAM and 4 k×4 of EPROM memory. The microcontroller 1700 can accommodate asynchronous or synchronous inputs from input devices connected to it. In this disclosed embodiment, communication to the keyboard 1610 is synchronous while it is asynchronous when communicating with input device 1600.

It should be noted that, although in this particular embodiment bar code information of the bar code 1606 is input into the keyboard input port of the PC 302, disclosed methods may also be advantageously utilized with high speed port architectures such as Universal Serial Bus ("USB") and IEEE 1394.

Bar codes are structured to be read in either direction. Timing considerations need to be addressed because of the variety of individuals scanning the bar code introduce a wide variety of scan rates. Bar codes use bars of varying widths. The presence of a black bar generates a positive pulse, and the absence of a black bar generates no pulse. Each character of a conventional bar code has associated therewith seven pulses or bars. Depending on the width of the bars, the time between pulses varies. In this disclosed embodiment, the interface circuitry 1608 performs a "running" calculation of the scan time based upon the rising edge of the pulses commencing with the leader or header information. The minimum and maximum scans times are calculated continuously in software with the interface 1608 during the scanning process to ensure a successful scan by the user.

Referring now to FIG. 18, there is illustrated a sample message packet transmitted from the user's PC 302 to the ARS 308. The message packet 1800 comprises a number of bits of information including the bar code information 1802 obtained from the user scanning the bar code 1606 with the input device 1600; the input device ID 1804 which is embedded in a memory in the input device 1600 and identifies it with a particular input device distributor; and a user ID 1806 which is derived from the software running on the PC 302 and which identifies uniquely with the user location. Note that the message packet includes other necessary information for the proper transmission for point to point.

Figure 19:
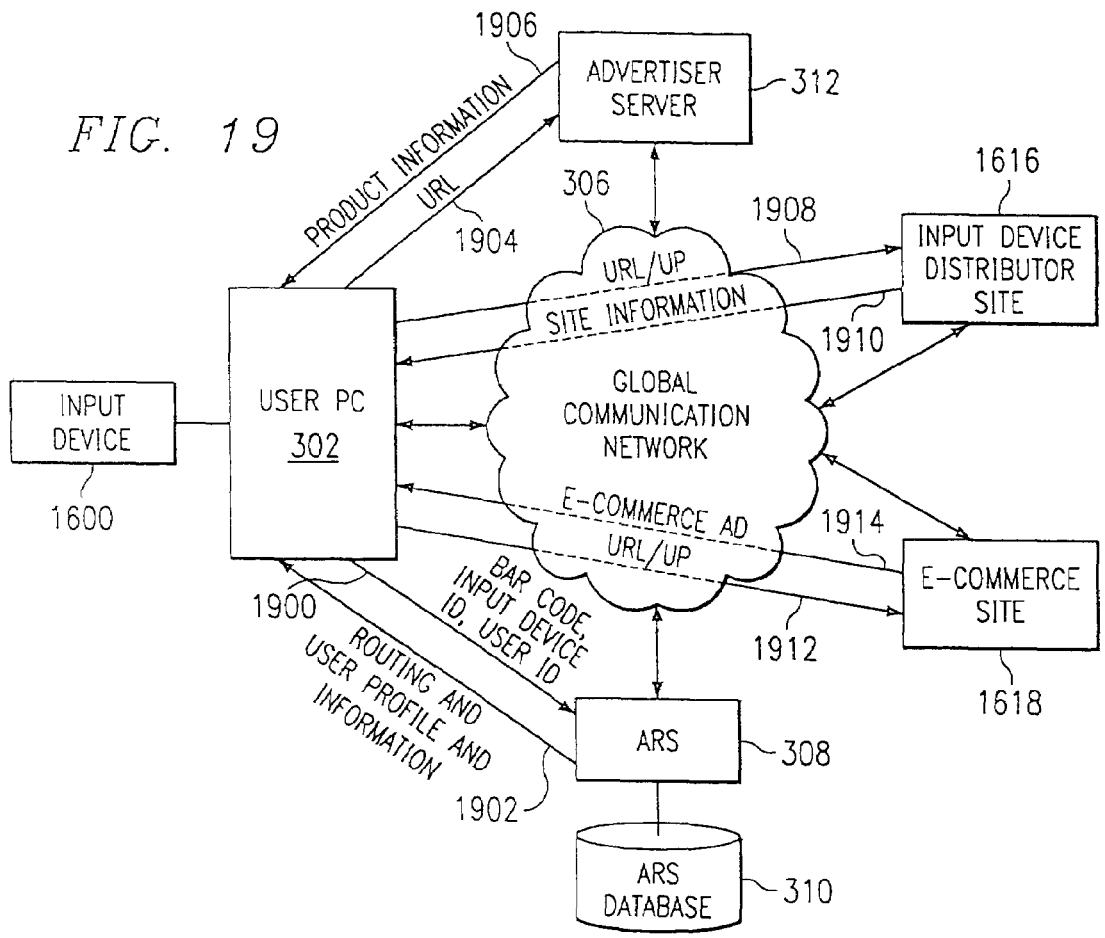
FIG. 19 illustrates a more detailed block diagram of the routing of the message packets between the various nodes.

Referring now to FIG. 19, there is illustrated a more detailed block diagram of the routing of the message packets in order to present the framed information to the user. As is mentioned hereinabove, when the user scans a bar code 1606 using the input device 1600, a input device program running on the user PC 302 is operable to interpret the information output by the input device 1600 and generate a message packet for transmission over the GCN 306. The input device program assembles the message packet such that it is directed to the ARS 308 disposed on the GCN 306. The message packet contains several pieces of information including the input device ID 1804 which links it to the input device distributor, the user ID 1806 which identifies the particular user using the input device 1600, and bar code information 1802 describing a particular product of interest to the user. This message from the PC 302 is transmitted over a path 1900 to the ARS 308 where the ARS database 310 is accessed to cross reference the ID information 1804 and bar code information 1802 to a particular advertiser and input device distributor. The ARS 308 returns a message packet over a path 1902 to the user PC 302 which contains routing information as to the location of various other sites disposed on the GCN 306, for example, the advertiser server 312 and input device distributor site 1616.

It can be appreciated that other information can also be provided by the ARS 308 which more closely targets the particular user of the input device 1600. For example, if it is known that a particular input device 1600 is sold in a certain geographic area, this information can be useful in targeting the particular user with certain advertising information relevant to that geographic area. In any case, the information returned from the ARS 308 over path 1902 provides enough information for the input device program running on the user PC 302 to identify a number of other sites disposed on the GCN 306. The user PC 302 then processes the return message packet and routes another message packet over a path 1904 to the advertiser server 312. The advertiser server 312 then returns product information of the particular product in which the user was interested back to the user PC 302 over a path 1906. Similarly, the user PC 302 routes information (e.g., the URL of the input device distributor site and the user profile) to the input device distributor site 1616 over a path 1908 in order to obtain information back over a path 1910 for framing any banners which identify the input device distributor. Additionally, the user PC 302 forwards a message packet to the E-commerce site 1618 over a path 1912 in order to return information regarding any particular advertisements the input device distributor wants to display to the user. The advertisements are returned to the PC 302 over a path 1914.

Figure 20:
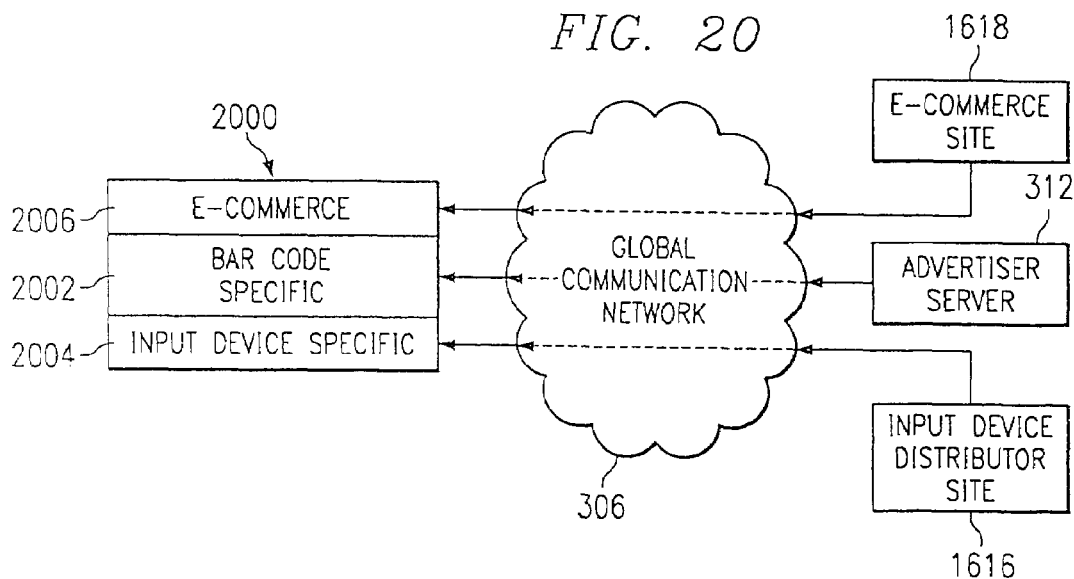
FIG. 20 illustrates a block diagram of a browser window, according to a disclosed embodiment.

Referring now to FIG. 20, there is illustrated a block diagram of a browser window according to the disclosed embodiment. The browser window 2000 is partitioned into a plurality of areas for framing specific information. A bar code area 2002 displays that product information in which the user was interested; an input device-specific area 2004 displays information about the input device distributor; and an E-commerce area 2006 displays advertising information that the input device distributor selects for display according to this particular user and input device 1600. As mentioned hereinabove, a program operable to process scanned bar code information with the unique input device 1600 develops the browser window by partitioning it into specific areas for the framing of information. Therefore, information returned from the E-commerce site 1608 is passed through the GCN 306 to the particular E-commerce frame 2006. Similarly, information about the particular product of interest is returned from the advertiser site 312 across the GCN 306 to the particular bar code specific area 2002. Information placed in the input device specific area 2004 is information about the input device distributor which is returned from the input device distributor site 1616 across GCN 306.

Figure 21:
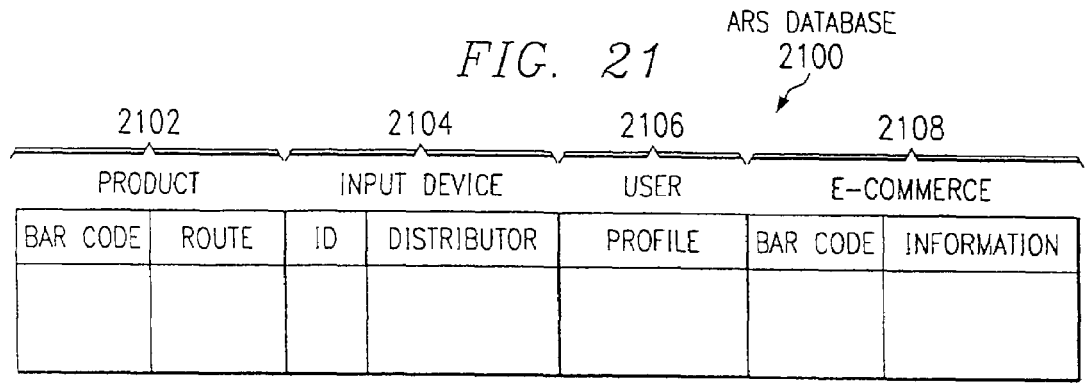
FIG. 21 illustrates a diagrammatic view of information contained in the ARS database.

Referring now to FIG. 21, there is illustrated a structure of information contained in the ARS database. The ARS database 310 contains a variety of information required to properly interrogate and assemble packets for obtaining information from the various sites disposed on the GCN 306. The ARS database 310 has a database structure 2100 which contains addresses for the web sites containing the product information requested by the user when scanning the bar code 1606 with the input device 1600. Under a PRODUCT heading 2102 are listed the particular bar codes and associated routing information for addressing the respective server location. For example, the ARS server 308 may contain any number of advertisers having unique URL addresses associated therewith. Therefore, the bar code 1606 of a particular product is associated with a unique URL address which routes any request for information of that product to that particular advertiser's site. Also part of the ARS database structure 2000 is a heading of INPUT DEVICE under which is the input device ID 1804 and the distributor associated with that input device ID 1804.

It can be appreciated that there may be a number of distributors using the disclosed architecture such that each distributor has an ID embedded in the input device 1600 which uniquely identifies that input device with the particular distributor. Therefore, the unique input device ID 1804 needs to be listed with the respective distributors of that input device 1600 in order to process the information that needs to be framed and displayed to that particular user. Another heading under the ARS database structure 2100 is a user heading 2106 which contains profile information associated with that particular user ID 1806. As mentioned hereinabove, the user ID 1806 is obtained via the input device software running on the PC 302 and upon installation or subsequent configuration may request that the user input certain profile information which may be used to target that particular user with products and services which identify with that user profile. The ARS database structure 2100 also contains an E-commerce heading 2108 which contains information related to the bar code 1606 and an advertisement that may be triggered by the request for that information. For example, any bar code 1606 associated with a paper source 1602 can be associated with the specific information in the ARS database 310. A user wishing to obtain information about a specific soft drink may, in fact, trigger an advertising response of a competitor product. Similarly, the user interested in information about that particular soft drink may also trigger information which is relevant to that particular product or a product which may normally be served in conjunction with that soft drink. Furthermore, if the user profile indicates that this individual has significant interest in finance or insurance, the request for information regarding this particular bar coded product may trigger advertisement from an E-commerce server 1618 related to information about finance and insurance. It should be noted that the information described as contained within the ARS database structure 2100 is not limited to what has been described, but may comprise any number of pieces of information used to present desired information to the computer display of the user.

Figure 22:
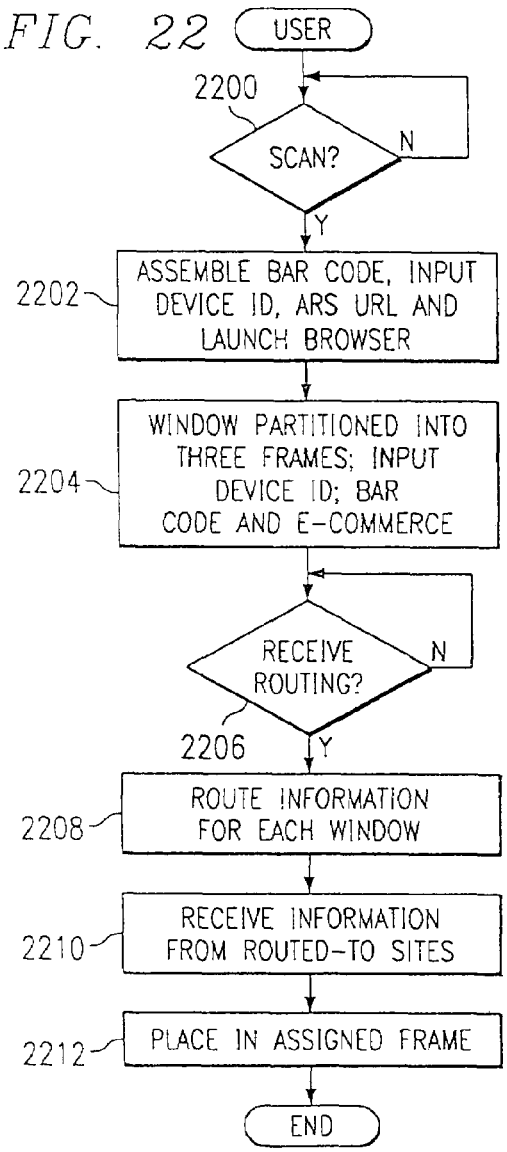
FIG. 22 illustrates a flowchart of the process of receiving information from the user's perspective.

Referring now to FIG. 22, there is illustrated a flowchart of the process of receiving information from the user's perspective, and according to the disclosed embodiment. The input device software running on the user's PC 302 runs in the background until activated by output from the input device 1600. Therefore, flow moves to a decision block 2200 where if a scanned input does not occur, flow moves out the "N" path and loops back to the input of decision block 2200. On the other hand, if scanned input information is received, flow moves out the "Y" path to a function block 2202 where the input device software assembles a message packet containing the bar code information, the input device ID 1804 and the ARS 308 URL address. Additionally, the browser is launched in which this information is placed for transmission to the ARS 308. Flow then moves to a function block 2204 where the browser is partitioned into any number of areas in which information is displayed when obtained from the input device distributor site 1616, the E-commerce site 1618, and the advertiser server 312. It should be known that although three frames are shown in the particular window 2000 of this embodiment, the number of frames displayed in the window 2000 is limited only by the available real estate of the window 2000 area itself.

After the input device software partitions the browser window into one or more frames in preparation of receipt of return information, flow moves to a decision block 2206 where the computer waits for information to be returned from the various sites disposed on the GCN 306. If information is not returned, flow moves out the "N" path and simply loops back to the input to continue monitoring for receipt of the information. If information has been received, flow moves out the "Y" path to a function block 2208 where routing information for each frame (or partitioned area of the window 2000) is inserted into one or more packets for transmission to the various sites. The various sites then return the requested information back to the PC 302, as indicated in function block 2210. Flow is then to a function block 2212 where the proprietary software working in conjunction with the hosted browser places the returned information into the respective frames of the window. The user, viewing the display at PC 302, then perceives a variety of information, one of which is the particular product information which he or she requested, in addition to input device distributor information, and possibly other advertisements based upon the user's profile.

Figure 23:
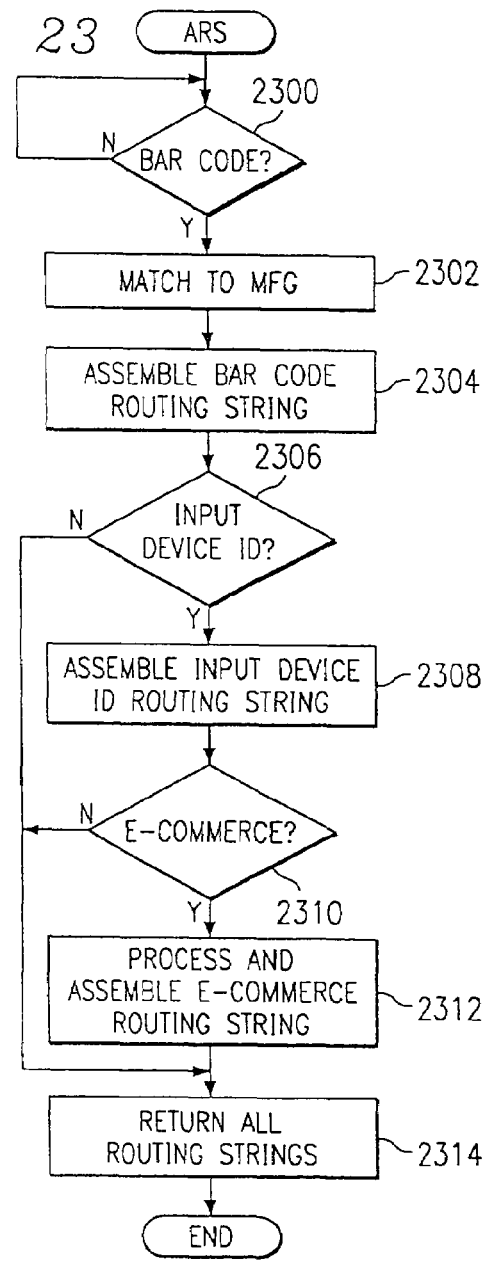
FIG. 23 illustrates a flowchart according to the ARS.

Referring now to FIG. 23, there is illustrated a flowchart of the process according to the ARS. The ARS 308 is operable to decode and process messages received from the GCN 306. Therefore, flow is to a decision block 2300 where, if bar code information is not received, flow is out the "N" path with loop-back to its input. If bar code information has been received, flow is to a function block 2302 where a matching process occurs to link the bar-coded product information to its respective manufacturer. The ARS database 310 also associates the URL address of the manufacturer's server. When a match is found, the ARS 308 begins to assemble a message packet of information for transmission back to the PC 302, as indicated in function block 2304. The message packet contains the product information and the URL address of the manufacturer's website. Flow then moves to a decision block 2306 where the input device ID 1804 is compared with the list of input device IDs issued by the particular input device distributor. If the input device ID 1804 is validated, flow moves out the "Y" path to a function block 2308 where the message packet is appended with the input device ID 1804 and distributor routing address. Flow then moves to a decision block 2310 where the ARS 308 determines if any E-commerce information is to be associated with a particular input device ID 1804. If so, flow is out the "Y" path to a function block 2312 where the message packet is appended with the E-commerce routing string. The E-commerce routing string provides addressing for the E-commerce server 1618. Flow then moves to a function block 2314 where all message packets are returned back to the PC 302 for processing.

Referring back to decision block 2306, if the input device ID 1804 is determined to be invalid, flow moves out the "N" path and jumps forward to the input of decision block 2314, since the lack of a input device ID 1804 interrupts the link to any advertising provided by the E-commerce server 1618. At this point, the only information provided is the link to the advertiser server 312 for return of product information. Referring now to decision block 2310, if no E-commerce information is available, flow moves out the "N" path and jumps forward to the input of function block 2314 where the message packet back to the PC 302 contains only the URL of the advertiser server 312, the bar code information, the distributor server 1616 address and input device ID 1804 information.

Referring now to FIG. 24, there is illustrated a flowchart of the process performed at the E-commerce site. The E-commerce server 1618 receives the message packet from the user PC 302, as indicated in function block 2400, and decodes the packet to perform a match with the bar coded information. Moving on to a decision block 2402, if the match is unsuccessful, flow is out the "N" path to a function block 2404 where the match is rejected. A message may be returned to indicate that a problem occurred and the user may need to re-scan the product bar code 1606. If a successful match occurs, flow moves out the "Y" path to a function block 2406 where the input device ID 1804 is matched with the bar code product information. The bar coded information may be distributed to customers over a large geographic area. However, the input device 1606 may be coded for certain geographic areas. For example, a input device 1600 having an XXX ID may be restricted for sale in the Southwestern United States while a input device 1600 having a YYY ID may be sold only in the Northeast. In this way, geographic areas may be targeted with advertising more appealing to that particular area. Advertising returned to the user PC 302 may be focused further by obtaining a user profile when the software or input device 1600 are installed. In this way, advertising may be focused based upon the user profile. Therefore, flow moves to a function block 2408 to lookup the E-commerce action based upon the input device ID 1804 and the bar code information. Flow moves to a function block 2410 to assemble all the information into a packet for return to the user PC 302. The product information and/or user profile information may be returned. Flow is then to a function block 2412 where the message packet is transmitted.

Additional embodiments of the current invention may be provided having enhanced suitability for particular applications. One such application is conducting a contest using a network.

Figure 25:
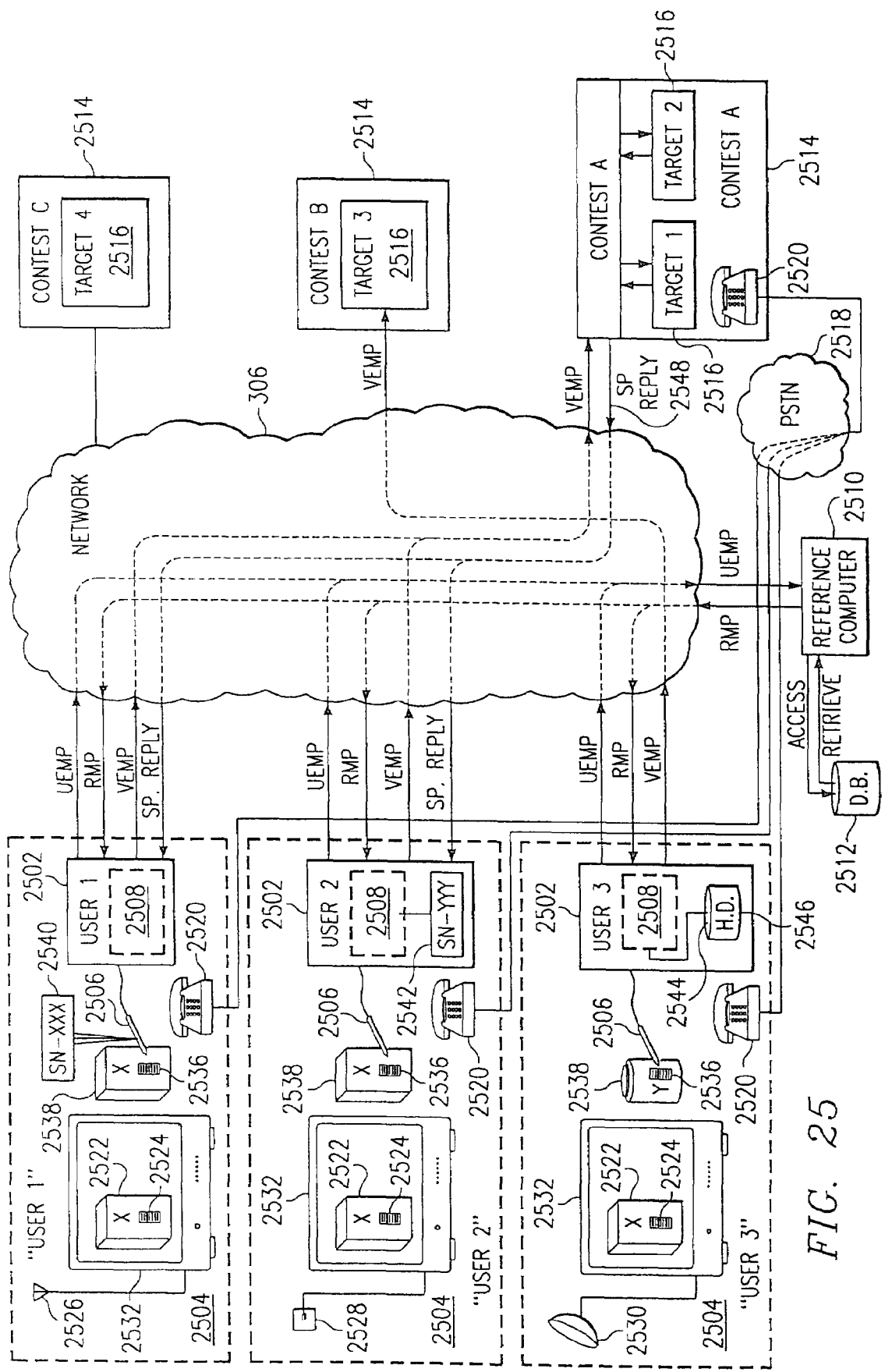
FIG. 25 illustrates a diagrammatic view of an embodiment for conducting a contest using a network.

Referring now to FIG. 25, there is illustrated a diagrammatic view of another disclosed embodiment relating to a system for conducting a contest using a network. A plurality of user computers 2502 are remotely disposed at user locations 2504 on the network 306. In this embodiment, the network 306 is a global communication network, for example, the Internet. It will be apparent, however, that the network could be any packet switched public data network ("PSPDN"), a public or private local area network ("LAN"), or another type of network capable of supporting communication between computers. The user computers 2502 will typically be PC type personal computers, however any type of computer capable of network communication can be used. Each of the user computers may be operably connected to a scanning device 2506, using a suitable interface if necessary. The scanning device 2506 is adapted for scanning indicia and sending a signal corresponding to the indicia to the user computer 2502. Such indicia may be encoded in machine readable format, for example, a bar code or a digital watermark. Alternately, the indicia may be presented in a human readable format, for example text or symbols, which can also be resolved by the scanning device 2506.

Each of the user computers 2502 may further include a software application 2508 runs on the computer and is capable of creating a special electronic data package called an unvalidated entry message packet (hereafter "UEMP") in response to scanning an indicia with the scanning device 2506. The purpose of the UEMP is describer further below.

A reference computer 2510 is disposed on the network 306. The reference computer 2510 is operably connected to a reference database 2512. In the preferred embodiment, the reference computer 2510 and the reference database 2512 are of the types used for the ARS 308 and ARS database 310, respectively. Alternately, the reference computer 2510 and the reference database 2512 may be integral parts of the ARS 308 and the ARS database 310, respectively. As such, methods and systems previously disclosed herein for controlling and/or modifying the ARS 308 and the ARS database 310 may be similarly applied to controlling and/or modifying the reference computer 2510 and the reference database 2512.

At least one contest computer 2514 is disposed on the network 306 at a target location 2516. It will be appreciated that the target locations 2516 are network locations, not necessarily physical locations. Thus, a single contest computer 2514 may host multiple target locations 2516, for example, the contest computer 2514 labeled "Contest A" may include two target locations 2516 labeled "Target 1" and "Target 2", respectively. The target locations 2516 may be, for example, Internet web pages containing HTML commands.

The user locations 2504 and the location of the contest computer 2516 may be further disposed on a secondary network 2518 providing an additional means of communication therebetween. In the embodiment illustrated, the secondary network 2518 is a public switched telephone network ("PSTN") connected to telephones 2520. Alternately, the secondary network could be a municipal cable network, cell phone network, or any other type of network offering communications between the user sites 2504 and the location of the contest computer 2514. While it is contemplated that the computer hosting the target location will typically be separate from the reference computer 2510, it will be appreciated that a system in which the reference computer 2510 also serves to host the target location 2516 is within the scope of the current invention.

The illustrated system can be used for conducting various types of contests using a network. One contemplated contest is structured generally as follows: The contest sponsor identifies a selected article of commerce, e.g., a particular brand of soft drink, to users at their locations on the network. One or more prizes is offered to users that can demonstrate, by way of a contest entry, that they currently have the selected product at their location. Typically, a range of prize will be offered, a grand prize for the first winner and lesser prizes for a specific number of subsequent winners. A system in accordance with one embodiment of the invention allows users to enter the contest simply by scanning the identifying indicia on an article using a scanning device connected to their computer. The user computer transmits their entry over the network to a reference site for validation, receives routing information from the reference site, and then routes the validated entry to a contest site to determine if the user is a winner of the contest. The contest sponsor obtains favorable publicity from the contest and also has an opportunity to gather valuable information regarding the users who enter the contest. A more detailed description of the current invention will be provided in the context of this contest.

Referring still to FIG. 25, the contest sponsor identifies a selected article of commerce 2522 to users (not shown) at their locations 2504 on the network 306. The term "Article of Commerce" includes tangible things that are sold or moved through commerce, such as consumer products, packaging, printed publications including books, newspapers, or magazines and other printed objects including stickers, flyers, cards, tags, labels, checks, coupons and other negotiable instruments. The selected article 2522 bears an indicia 2524 thereupon which identifies the article. Typically, the indicia 2524 on the selected article 2522 is encoded in a machine readable format, for example, a bar code or a digital watermark. An indicia 2524 in human readable format may also be used, provided the human readable format can be resolved by a scanning device 2506 to identify the article. In some cases, the indicia 2524 may be of a proprietary nature, such as a proprietary bar code or a proprietary digital watermark, placed on the article 2522 solely to identify the article in the contest. In other cases, however, the indicia 2524 will encode an identification code corresponding to the selected article of commerce 2522 in accordance with an extrinsic standard. By extrinsic standard, it is meant that the assignment of the identification code is made by a recognized group or association for the purpose of identifying articles of commerce. Examples of identification codes corresponding to articles of commerce in accordance with an extrinsic standard are the Universal Product Code ("UPC"), which is encoded on consumer products using a symbology specified by the Uniform Code Council, Inc., the International Standard Book Number ("ISBN") which is encoded on books using a symbology specified by the International Standard Book Numbering System, the International Standard Serial Number ("ISSN") which is encoded on magazines and other serial publications using a symbology specified by the International Standard Serial Numbering System, and the EAN code which is assigned to products for sale outside of the U.S. and Canada using a symbology specified by the International Article Numbering Association. It is certain that new types of identification codes and new symbologies as well as new organizations for assigning and administering these codes will emerge in the future, and the present invention contemplates the use of both existing and future extrinsic identification codes and formats. Further, other machine readable formats may also be used for this purpose, including magnetic stripes or optical character recognition ("OCR"), and the present invention could be practiced with identification codes encoded in these formats as well.

The contest sponsor identifies the selected article of commerce 2522 bearing the identifying indicia 2524 to users at the user locations 2504 on the network 306. It is contemplated that this identification will typically be made simultaneously to all users, for example, as part of television and/or radio transmissions receivable at the user locations 2504 at a predetermined time. Alternately, the identification may be made by accessing a predetermined network location which is accessible from the user locations, for example, an Internet web site, which identifies the selected article at a predetermined time. It is further contemplated that the actual identification of the selected article 2522 will be preceded by promotional announcements, perhaps days or weeks earlier, promoting the contest and giving hints or clues as to what the selected article may be in order to induce users to purchase such articles and have them available at their location in time for the contest.

In the embodiment illustrated in FIG. 25, the selected article of commerce 2522 is identified on a television transmission received at the user locations 2504. The user at user location designated "User 1" receives the television transmission via conventional broadcast over an antenna 2526, the user at the location designated "User 2" receives the television transmission via a cable network 2528, while the user at the location designated "User 3" receives the television transmission via satellite transmission using dish 2530. The transmissions are displayed on conventional television 2532 at the user locations 2504. Of course, other methods of identifying the selected article, including high definition television (HDTV), radio transmission and network communication, may be used instead of, or in addition to, the conventional television transmission. Once the selected articles of commerce 2522 has been identified to the users, those users wishing to participate in the contest must transmit an unvalidated entry message packet (UEMP) from their user computer across the network to the reference computer 2510. The UEMP 2602 is typically assembled and transmitted by the software application 2508 on the user computer 2502. The application 2508 may be running in the foreground or background at the time of the contest, or the application may be launched automatically in response to scanning an indicia with the scanning device 2506. While it is preferred that the UEMP 2602 be assembled by the software program 2508, it will be appreciated that a contest system wherein the UEMP 2602 is assembled directly by the user is also within the scope of the current invention.

Referring now also to FIG. 26, there is illustrated an example of a UEMP employed in this embodiment. The UEMP 2602 is a packet of data which is transmitted across the network. The UEMP 2602 comprises an article code 2604 which is derived from an identifying indicia 2536 on an article of commerce 2538 which the user actually has at the user location 2504. Note that the article of commerce 2538 which is actually at the user location 2504 may or may not match the selected article of commerce 2522 which was identified by the contest sponsor. Depending upon the exact rules of the particular contest being conducted, an exact match may be required to be a winner of the contest, however, in any event a match is not required simply to enter the contest.

As previously indicated, the article code 2604 of the UEMP 2602 is derived from the identifying indicia 2536 on the article of commerce 2538. In some embodiments, the identifying indicia 2536 may be human readable and the article code 2604 may be extracted by a user for manual entry into the computer 2502 for incorporation into the UEMP 2602. In most embodiments, however, the indicia 2538 will be encoded in a machine readable format, e.g., a bar code, digital watermark, magnetic stripe, etc., as previously disclosed for the indicia 2524 on the selected article of commerce 2522. Preferably, the identifying indicia 2536 will encode an identification code corresponding to the article 2538 according to an extrinsic standard, e.g., UPC, ISBN, ISSN, EAN, etc. as previously described. Such machine readable indicia allow the software application 2508 running on the user computer 2502 to automatically create a UEMP 2602 in response to the scanning of the indicia 2536 using the scanning device 2506. Where an identification code is encoded in the identifying indicia 2536, the resulting article code 2604 included in the UEMP 2602 may be the entire identification code or it may be a predetermined portion of the identification code. For example, if the identification code encoded in the identifying indicia 2536 contains a first portion which identifies the manufacturer of the article and a second portion which identifies the specific article (which is the case with the UPC type identification code), then the article code 2604 may include only the predetermined portion of the identification code which is associated with the manufacturer. An article code of this type would allow the contest sponsors to identify a class of goods, e.g., all goods manufactured by "Brand X", such that the user could scan any product manufactured by "Brand X" in order to win the contest.

The scanning device 2506 at the user location 2504 is preferably an optical reader or optical scanner, for example, a bar code reader or reader of digital watermarks. It will be apparent, however, that other types of scanning devices, including magnetic stripe and induction coupled scanners may also be used in the current invention.

In addition to the article code 2604, the UEMP 2602 may include a user code 2606 identifying the user and/or user location and/or additional data 2608 needed for network routing or as specified by the particular contest. While not necessarily required to conduct the contest, the user code 2606 can provide, or be used to obtain, valuable information regarding the user who enters the contest. Obtaining this user information may, in fact, be the contest sponsor's principle reason for conducting the contest. The additional data 2608 may include the entire identification code encoded in the identifying indicia 2536 on the scanned article of commerce 2538 (even though the article code 2604 includes only a portion of the identifying code) or some other data having validation or informational value.

Due to the importance of the user code to most commercial uses of the contest, most embodiments of the current invention include features which automatically insert the user code 2606 to the UEMP 2602 when it is created. For example, as illustrated in FIG. 25 for the user location "USER 1", the user code 2606 may be derived from a serial number 2540 for the scanning device 2506, the serial number 2540 being accessible, electronically or otherwise, by the software application 2508. In another example, as illustrated in FIG. 25 for the user location "USER 2", the user code 2606 may be derived from a serial number 2542 associated with the software application 2508 on the user computer 2502. In yet another example, as illustrated in FIG. 25 for the user location "USER 3", the user code 2606 may be derived from a cookie file 2544 on the user computer 2502. It will be appreciated that a cookie file is a network mechanism that allows computers at external locations to place information on the user's computer for later use. The cookie mechanism is well known as a feature of the HTTP protocol used in the Internet and World Wide Web. In this environment, a cookie allows the server side of the connection to both store and retrieve information on the client side. Typically, such cookie files are stored on a hard disk drive 2546 on the user computer 2502.

It is contemplated that registration of the user and/or user location will typically be required before a user is allowed to participate in the contest. During the registration, the user must provide user information, for example the user's physical location, telephone number, post office address, e-mail address or demographic data regarding persons at the user location, to a registration site. At the same time, the serial number of a scanning device 2506 or software application 2508 on the user's computer 2502 are provided to establish a user code 2606 for the user location. Registration is preferably accomplished over the network 306 (i.e., "online"), however, other methods can be used, such as mail registration. If online registration is used, a user code 2606 and possibly other information may be placed on the user's computer 2502 in the form of a cookie file 2544 or other information resident on the user's computer.

Once the selected article of commerce 2522 has been identified at the user location 2504, the desire to win the contest prize induces the user to find an article of commerce 2538 and enter the contest. As previously discussed, the user typically enters the contest by scanning the identifying indicia 2536 on the article 2538 with scanning device 2506. In response to the scanning, the software program 2508 on the user computer 2502 then automatically assembles a UEMP 2602 including an article code 2604, and also typically a user code 2606 and additional data 2608. Alternately, the UEMP 2602 can be assembled directly by the user. The UEMP 2602 is then routed across the network 306 to the reference computer 2510. Routing information to the reference computer 2510 is generally supplied automatically by the software application 2508. Alternately, this routing information may be supplied by the contest sponsors. Reference computer 2510 is operably connected to a reference computer database 2512.

Referring now to FIG. 27, there is illustrated an example of a structure of information in the reference computer database 2512. The computer database 2512 includes a plurality of article codes 2604 and a plurality of routing information 2704 for target locations 2516 on the network 306. Each of the routing information 2704 in the computer database 2512 is associated with at least one article code 2604. When the UEMP 2602 is received at the reference computer 2510, the computer extracts the article code 2604, accesses the computer database 2512, and retrieves therefrom the routing information 2704 associated with the article code received. For example, in the database illustrated in FIG. 27, if the article code 2604 received in the UEMP 2602 is "3800043400", then the routing information retrieved will be "www.domain.com\contesta\target1", i.e., routing information to the target location 2516 named "Target 1" on the contest computer 2514 named "Contest A". Similarly, if an article code "7800001234" is received in the UEMP, then routing information "205.xxx.xxx.123" may be retrieved, i.e. routing information to the target site named "Target 3". It will be understood that the reference computer database 2512 will comprise at least one table containing the article codes 2604 and routing information 2704, however this information may be contained in multiple tables linked through a single database routine. In addition, the tables may be distributed over a plurality of computers rather than being physically located on a single computer or at a single location. Further, it will be appreciated that the routing information 2704 included in the reference computer database 2512 may be any type of routing information which facilitates the transmission of data packets from one network location to another network location. For example, the routing information 2704 may be in the form of a universal resource locator ("URL") if the network 306 is the Internet. Alternately, the routing information 2704 may be in the form of a network address such as a IP (Internet Protocol) address. After retrieving the routing information 2704 from the computer database 2512, the reference computer creates a reply message packet ("RMP") for transmission back to the originating computer 2502.

Referring now to FIG. 28, there is illustrated an example of an RMP employed in this embodiment. The RMP 2802 is a packet of electronic data which is transmitted across the network 306 from the reference computer 2510 to the user computer 2502 from which the UEMP 2602 was received. The RMP 2802 comprises the routing information 2704 which was retrieved from the computer database 2512 as corresponding to the article code 2604 of the UEMP 2602. This routing information 2704 is the minimum data required to validate the user's entry. While not required in all contests, the RMP 2802 may also include supplemental validation data 2804 and/or additional data 2806. The supplemental validation data 2804 can be any information (in addition to the routing information 2704) designated by the contest sponsor as necessary to constitute a valid entry. The additional data 2806 may be any further information desired by the contest sponsor but not required to constitute a valid entry.

In a typical contest, an important motive of the contest sponsor in conducting the contest is to obtain information on the viewing or buying habits of the user. In such cases, the supplemental validation data 2804 and/or the additional data 2806 in the RMP 2802 may comprise user information retrieved from a user information database based on correspondence with a user code 2606 in the UEMP 2602. Such user information may include a telephone number for the user location, a post office address for the user location, an e-mail address for the user location and/or demographic data regarding persons at the user location. Preferably, such user information is collected prior to the contest, for example as part of a registration procedure, and stored in the user information database. This user information database may be a portion of the same database 2512 used by the reference computer 2510, or it may be a separate computer database operably linked to the reference computer.

As another example, if the contest rules require entries to be submitted within a certain period of time following identification of the selected article of commerce 2522, then the supplemental validation data 2804 in the RMP 2802 may comprise time-stamp information indicating the time at which the UEMP 2602 was received at the reference location 2510. As yet another example, if it is desired to "echo back" information received in the UEMP 2602 to the user, then the supplemental validation data 2804, and/or the additional data 2806 may include the article code 2604, user code 2606, or additional data 2606 as the entire article identification code) which were received in the UEMP 2602.

Referring now to FIG. 29, there is illustrated an example of a structure of information contained in the user information database. The user information database contains a plurality of user codes 2606 and a plurality of user information 2904. In the example illustrated, the user information 2904 includes a user telephone number 2906 and a user demographic 2908, i.e. the user age. Each of the user codes 2606 in the database is associated with at least one user information 2904, for example, the user code "015683" is associated with user information as follows: User Phone="555-111-1234" and User Age="35". When such user information 2904 is required in the RMP 2802, the step of assembling the user information 2904 comprises extracting the user code 2606 from the UEMP 2602, accessing the user information computer database and retrieving the user information 2904 associated with the user code 2606.

The user information 2904 in the user information database may also include a validity status indicator 2905, i.e., an indication of whether the user code 2606 has been registered and is therefore eligible to participate in the contest. As illustrated in FIG. 29, the user code "015683" has a Validity Status="YES", indicating the corresponding user is eligible to participate in the contest, while the user code "015684" has a Validity Status="NO", indicating that the corresponding user is not eligible to participate in the contest. Such validity status information may be included in the supplemental validity data 2804 of the RMP 2802.

The RMP 2802 is transmitted from the reference computer 2510 across the network 306 back to the original user computer 2502 at the user location 2504. In cases where the RMP 2802 includes sensitive information, or where the contest sponsors wish to reduce the possibility of cheating or fraud, at least a portion of the RMP 2802 may be encrypted using data encryption techniques known in the art. Upon receipt of the RMP 2802, the user computer 2502, typically using the software application 2508, extracts from the RMP the routing information 2704 and (if present) supplemental validation data 2804 and additional data 2806, decoding encrypted data if necessary. Supplemental validation data 2804 included in RMP 2802 may be evaluated by the software application 2508 at this time, or it may simply be passed along to the target location without processing at the user site.

Assuming the software application 2508 is satisfied with the RMP 2802, i.e., the routing information 2704 and any supplemental validation data 2804 is found to be present, the user computer 2502 next assembles a validated entry message packet ("VEMP") and transmits it across the network 306 to the target location 2516 using the routing information 2704 received in the RMP 2802. Note that the VEMP does not necessarily constitute an acceptable entry to the contest since the evaluation of supplemental validation data or other steps may be required before an entry is accepted.

Referring now to FIG. 30, there is illustrated an example of a VEMP employed in this embodiment. The VEMP 3002 includes user information 3004 for delivery to the target location 2516. The user information 3004 may be any information characterizing the user entering the contest, including the user code 2606, user information 2904 retrieved from the user information database, or user information retrieved from a cookie file 2544 on the user's computer. The user information 3004 is the minimum data which must be included for a VEMP 3002 to constitute an acceptable entry to the contest. The VEMP 3002 may further include supplemental validation data 3006 which does not constitute user information. This supplemental validation data 3006 may be the same supplemental validation data 2804 included in the RMP 2802 and/or it may be new data added by the user computer 2502. For example, the supplemental validation data 3006 in the VEMP 3002 may include the complete identification code encoded in the indicia 2536 of the article of commerce 2538 scanned by the user. Such information could be used to provide information regarding the product scanned or merely to authenticate the article code 2604. In another example, the supplemental validation data 3006 may include time stamp information indicating the time at which the UEMP 2602 was received at the reference location 2510 (i.e., information included in the RMP 2802) and/or time stamp information regarding the time at which the RMP 2802 was received at the user computer 2502 (i.e., new information added by the user computer 2502). Further, additional data 3008 is desired by the contest sponsor, but not required for validation of the VEMP 3002, may also be included in VEMP 3002.

When the VEMP 3002 is received at the target address 2516, the user information 3004 and (if present) validation data 3006 and additional data 3008 are extracted by the target computer 2614. After receipt of the VEMP 3002 and extraction of the appropriate data, the contest computer 2514 then determines whether the VEMP 3002 constitutes an accepted entry. Such determination includes determining if minimum user data 3004 is included in the VEMP 3002. It may also include evaluation of supplemental validation data 3006 depending upon the rules of a particular contest. For example, if the contest rules may specify that all entries must be received at a predetermined network location (e.g., the reference computer) within a predetermined time interval, then determining whether the VEMP 3002 constitutes an accepted entry will comprise evaluating the supplemental validation data 3006 for time stamp information relating to the time the UEMP was received at the reference computer. In another example, the contest rules may specify that only a certain number of entries will be accepted. In such a case, determining whether a VEMP 3002 constitutes an accepted entry may comprise assigning sequential numbers to each VEMP 3002 as it is received at the target location 2516 and then comparing the assigned number of each VEMP 3002 to the predetermined range of numbers. In yet another variation, a plurality of predetermined ranges may be provided with each predetermined range constituting a different class of accepted entries. For example, only the first entry might be accepted into the class eligible for the grand prize, the next 3 entries accepted into a class eligible for first prize, the next 10 entries accepted into a class eligible for second prize, etc. In such a case, determining whether a VEMP 3002 constitutes an accepted entry may comprise assigning sequential numbers to each VEMP 3002 as it is received at the target location 2516 and then comparing the assigned number of each VEMP 3002 to the predetermined range of numbers for each class, then assigning the entries to classes based on the assigned numbers.

After determining that a VEMP 3002 constitutes an accepted entry, it can be determined if the user submitting the accepted entry is a winner of the contest. This step can be accomplished in a variety of ways, depending upon the rules of the particular contest. For example, in one contest, the winner of the contest is simply the user submitting the first accepted entry. In another contest, the winner is determined as follows: first, a user submitting an accepted entry is identified as a latent winner, i.e., a possible winner. Next, special routing information is transmitted to the user location 2504 of the latent winner. The special routing information is information which facilitates special communications between the latent winner and the contest sponsor—it is only transmitted to latent winners rather than to all users on the network. The special routing information may be, for example, a predetermined telephone number which allows the latent winner to contact the contest sponsor. Alternately, this special routing information may be a network address, for example an address to an Internet web site. The special routing information is delivered to the latent winner in any convenient way. For example, as a special reply message 2548 illustrated in FIG. 25 being sent to the user location "User 1". Finally, the latent winner is declared a winner of the contest if he or she responds within a predetermined time interval to a predetermined location using the special routing information. E.g., the latent winner receives a special phone number over the network 306 and then must call the contest location over the telephone network 2518 telephones 2520 within a limited time to be declared the winner.

Now that the basic mechanics of the contest system have been described, an example contest will be described for the three users illustrated in FIG. 25, i.e., "User 1", "User 2" and "User 3". It is assumed for the sake of this example that the contest rules are for one prize to the first user who scans an article exactly matching the selected article and then calls a special phone number to claim the prize. The selected article of commerce 2522 is identified to the users by a television broadcast receivable at the user locations 2504. In this example, the selected article of commerce 2522 is a consumer product by "Brand X" bearing an identifying indicia 2524. The indicia on the selected article in this example encodes a product code "3800043400." Each of User 1, User 2 and User 3 decides to participate in the contest and attempts to quickly locate an article of commerce 2538 at their location matching the selected article. In this example, User 3 finds an article 2538 bearing an indicia 2536 which is scanned using the scanning device 2506 connected to User 3's computer 2502. Unfortunately for User 3, however, the article 2538 scanned by User 3 does not match the selected article of commerce and in fact is the product of a different manufacturer "Brand Y". Nonetheless, upon scanning the indicia 2536 with the scanning device 2506, the software application 2508 on User 3's computer 2502 assembles a UEMP 2602 including an article code 2604 derived from the indicia on the Brand Y product and a user code 2606 obtained from the hard drive 2546 on the User 3 computer 2502. The UEMP 2602 is then transmitted across the network 306 from the User 3 computer to the reference computer 2510. Once received at the reference computer 2510, the UEMP for User 3 is decoded to extract the article code which in this case is assumed to be "7800001234". Next, the reference database 2512 (FIG. 27) is accessed to retrieve the routing information 2704 corresponding to the article code just received. In this case, the routing information would be "205.xxx.xxx.123" corresponding the target site "Target 3". The reference computer 2510 now creates a RMP 2802 including the routing info 2704 just retrieved. In addition, the user computer 2510 in this case includes supplemental validation data 2804 in the RMP 2802. The supplemental validation data 2804 in this case comprises user information 2904 which is desired by the contest sponsor and therefore has been retrieved from the user information database (FIG. 29) using the user code 2606. In this case, it is assumed the user code for the User 3 computer is "015683", therefore validation data in the form of user information 2905, 2906 and 2908 are appended to the RMP. The RMP 2802 is then routed from the reference computer 2510 across the network 306 and back to the User 3 computer 2502. At the User 3 computer, the routing information 2704 obtained at the reference computer database 2512 is used to route a VEMP 3002 from the User 3 computer to the target location "Target 3". However, in this case, since User 3 did not scan an article of commerce matching the selected article of commerce 2522, the Target 3 location is not active and the entry submitted by User 3 is not accepted. Thus User 3 does not win the contest.

Continuing with the example contest, subsequent to User 3's unsuccessful entry, User 2 scans an article of commerce 2538 is the Brand X product matching the selected article of commerce 2522 which was identified. When User 2 scans the article 2538 the scanning device 2506, this produces a UEMP 2602 similar to the process just described for User 3. In this case, however, the article code will be the correct code for the selected product "3800043400". The UEMP 2602 from User 2 is directed to the reference computer 2510 where the routing information corresponding to the article code is retrieved from the computer database 2512. This routing information 2704 in this example is "www.domain.com\contesta\target1" corresponding to the location for target site "Target 1". The routing information 2704 is packaged in a RMP 2802 which is routed back to the User 2 computer 2502 as previously described. In addition, supplemental validation data 2804 is appended to the RMP 2802. This supplemental validation data is user information 2904 corresponding to the user code for User 2, i.e., "015684", which was obtained from serial number 2542 in the software 2508 running on User 2's computer. Upon receipt of the RMP 2802 with the routing information 2804 and supplemental validation data 2804, the User 2 computer creates a VEMP 3002 which is transmitted across the network 306 to the target location 2516 "Target 1". The contest computer 2514 hosting the target location 2516 processes the VEMP 3002 received from User 2 and determines that the VEMP constitutes an accepted entry since it is the first entry received resulting from the scanning of the correct article of commerce. The contest computer 2514 must now determine if User 2 is a winner of the contest. Thus the contest computer 2514 "Contest A" identifies User 2 as a latent winner and transmits a special routing information in the form of a telephone number for accessing the telephone 2520 at the Contest A location. This special routing information is transmitted by a special reply message packet 2548 from the computer "Contest A" across the network 306 and back to the User 2 computer. In this example, however, User 2 fails to use the special routing information to contact the contest sponsor within the predetermined time. Therefore User 2 does not win the contest.

Continuing with the example contest, shortly after User 2's unsuccessful attempt to win the contest, User 1 scans an article 2538 which also matches the selected article of commerce 2522 which was identified. User 1 scans the article of commerce 2538 using the scanning device 2506 in a fashion similar to that of User 2 and User 3. The subsequent sequence of UEMP and RMP messages which is transmitted over the network in response to this scanning by User 1 is substantially the same as that described for User 2 since the article code "3800043400" will be identical. Ultimately, a VEMP 3002 is transmitted by User 1 and received at the Target 1 location 2516 on the Contest A computer 2514. The VEMP 3002 from User 1 is determined to be an accepted entry because it is received during the predetermined time period before a winner has been declared. The special routing information is therefore sent from the Target 1 location across the network 306 to the User 1 computer 2502 using a special reply message packet 2548. In this case, the user at the User 1 location receives the special routing information and acts quickly to call the provided number for the telephone 2520 at the Contest A site. After successfully contacting the contest sponsors at the Contest A site, User 1 is declared a winner of the contest.

It will be readily appreciated that the previous example describes only one of many possible contests which can be conducted over a network using the current invention.

Figure 31:
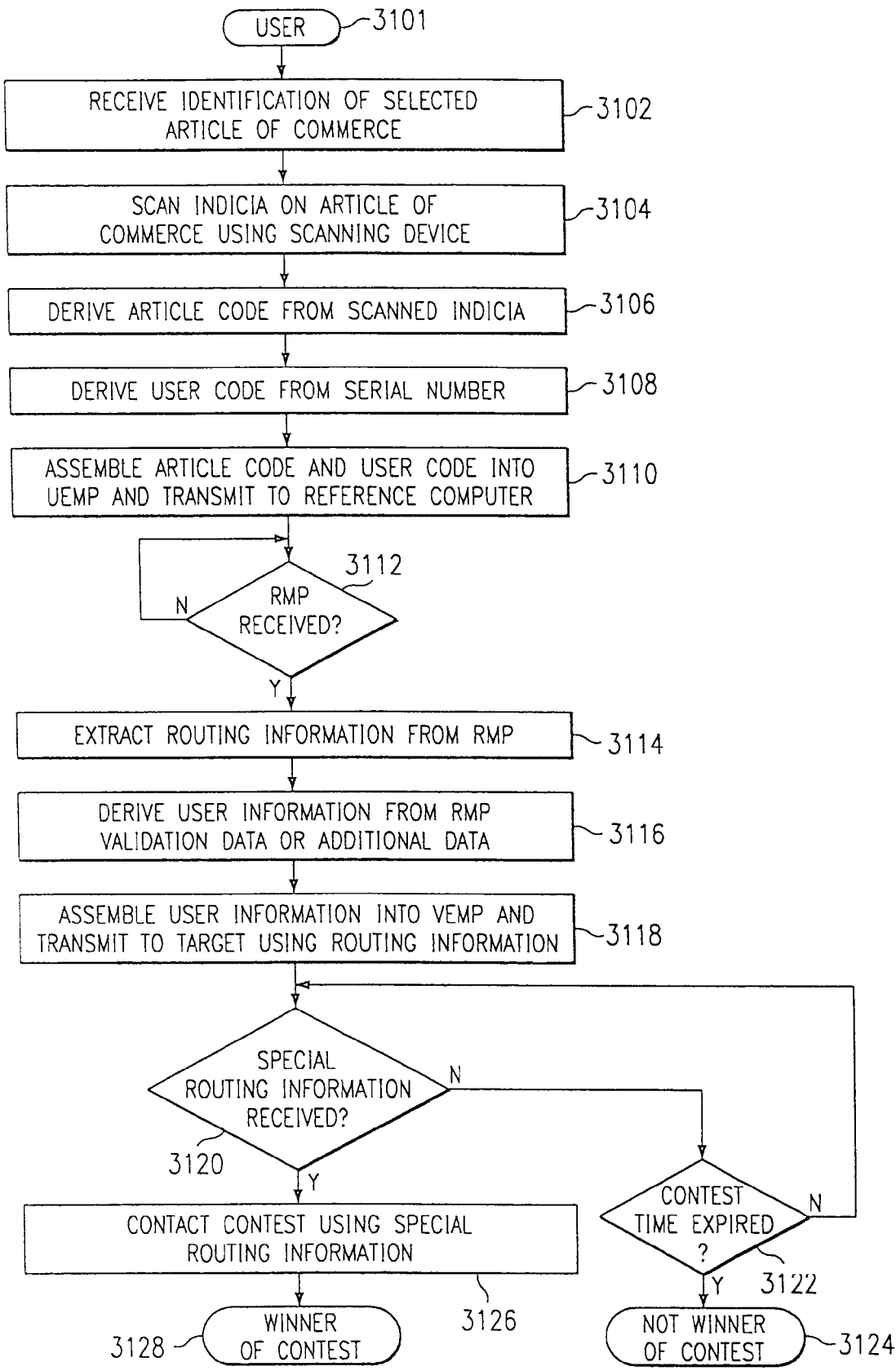
FIG. 31 illustrates a flowchart of the process performed at the user location.

Referring now to FIG. 31, there is illustrated a flowchart of the process performed at the user location. The program is initiated in a block 3101 and then proceeds to a function block 3102, wherein information identifying the selected articles of commerce is received at the user location. As previously discussed, this identification will generally be made by a television, radio or other type of transmission to a plurality of users on the network. Flow then proceeds to function block 3104 wherein the user scans an identifying indicia on an article of commerce using a scanning device connected to the user computer. Flow then proceeds to function block 3106 wherein an article code is derived from the scanned indicia. Flow then continues to function block 3108 wherein a user code is derived from a serial number of the scanning device software application or other source. It will be appreciated that this is an optional step since a user code is not required in all contests. Flow then proceeds to function block 3110 wherein the article code and user code (if required) are assembled into a UEMP and transmitted from the user computer to the reference computer across the network. It will be appreciated that the steps shown in function blocks 3102 and 3104 will typically be performed by the user, i.e. manually, whereas the actions in function blocks 3106 through 3110 are typically performed automatically by a software application running on the user computer.

Following the transmission of the UEMP to the reference computer as shown in function block 3110, flow continues to decision block 3112 wherein it is determined whether a RMP has been received. If no RMP has been received, the flow follows the "no" branch and loops back to the input of block 3112, i.e., waiting. When an RMP is received, flow follows the "YES" branch to function block 3114 wherein routing information is extracted from the RMP. Flow then proceeds to function block 3116 wherein user information is derived from the supplemental validation data or additional data of the RMP. It will be appreciated that, as previously described, user information could be derived from other sources, e.g., a cookie file on the user's computer, in addition to the supplemental validation data or additional data of the RMP. Flow then proceeds to function block 3118 in user information is assembled into a VEMP and transmitted to a target site using the routing information extracting from the RMP. It will be appreciated that the activities in blocks 3114 through 3118 are typically automatically accomplished by the software application running on the user computer without requiring the manual intervention of the user.

Once the VEMP has been transmitted, flow proceeds to decision block 3120 wherein it is determined whether the special routing information has been received. If no special routing information has been received from the target site, flow follows the "no" path to decision block 3122 wherein it is determined whether the contest time has expired. If the contest time has not expired, flow follows the "no" path and loops back to the input to block 3120, i.e., to wait for special routing information. If, however, the contest time has expired, flow then proceeds from block 3122 down the "YES" branch to result block 3124 wherein it is indicated that the user is not a winner of the contest (i.e., at least not for the entry just processed). On the other hand, if special routing information is received from the target location before the contest time expires, then flow proceeds from block 3120 down the "YES" branch to block 3126, wherein the user must contact the contest using the special routing information. Flow then proceeds to result block 3128 wherein it is determined that the user is a winner of the contest (assuming that the user successfully contacted the contest using the special routing information).

Referring now to FIG. 32, there is illustrated a flowchart of the process performed at the reference computer location. The process is initiated in block 3202 and proceeds to function block 3204 wherein the UEMP is received at the reference computer 2510 from user location 2504. Flow then proceeds to function block 3206 wherein the article code 2604 and the user code 2606 (if present) are extracted from the UEMP 2602. Flow then proceeds to function block 3208 in the reference computer 2510 accesses the reference computer database 2512 with the article code 2604 and retrieves the corresponding routing information 2704 associated with that article code. If user code information was included in the UEMP 2602, flow proceeds from function block 3208 to function block 3210 wherein the reference computer 2510 again accesses the reference computer database 2512 with the user code 2606 and retrieves user information and/or validation 2804. Flow then proceeds from block 3210 (or from block 3208 if no user code information was included in UEMP 2602) to function block 3212 wherein the routing information 2704 and user/validation information 2804 (if present) are assembled into a RMP 2802 and transmitted back to the user location 2504. Flow then proceeds to result block 3214 which indicates this is the end of the procedure from the standpoint of the reference computer.

Figure 33:
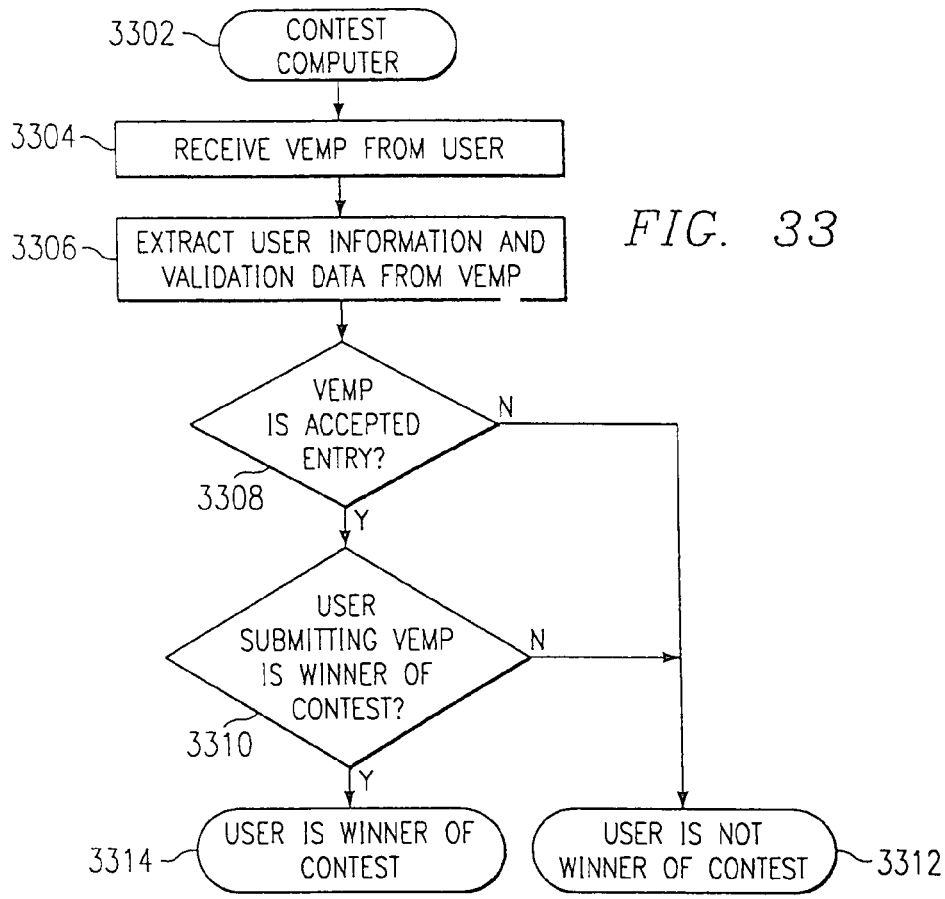
FIG. 33 illustrates a flowchart of the process performed at the contest computer.

Referring now to FIG. 33, there is illustrated a flowchart of the process performed at the contest computer. The process is initiated in block 3302 and proceeds to function block 3304 wherein the VEMP is received from the user. Flow then proceeds to function block 3306 wherein user information 3004 and validation data 3006 (if present) is extracted from VEMP 3002. Flow then proceeds to decision block 3308 wherein it is determined if the VEMP is an accepted entry. If the VEMP is not an accepted entry, flow follows the "NO" branch to result block 3312 wherein it is determined that the user is not a winner of the contest. If, on the other hand, it is determined that the VEMP is an accepted entry, then flow follows the "YES" branch to decision block 3310 wherein it is determined if the user submitting the VEMP is a winner of the contest. If it is determined that the user submitting the VEMP is not the winner of the contest, flow from block 3310 follows the "NO" branch to result block 3312 wherein the user is not a winner of the contest, whereas if it is determined that the user submitting the VEMP is the winner of the contest, then flow follows the "YES" branch to result block 3314 wherein the user is a winner of the contest.

Figure 34:
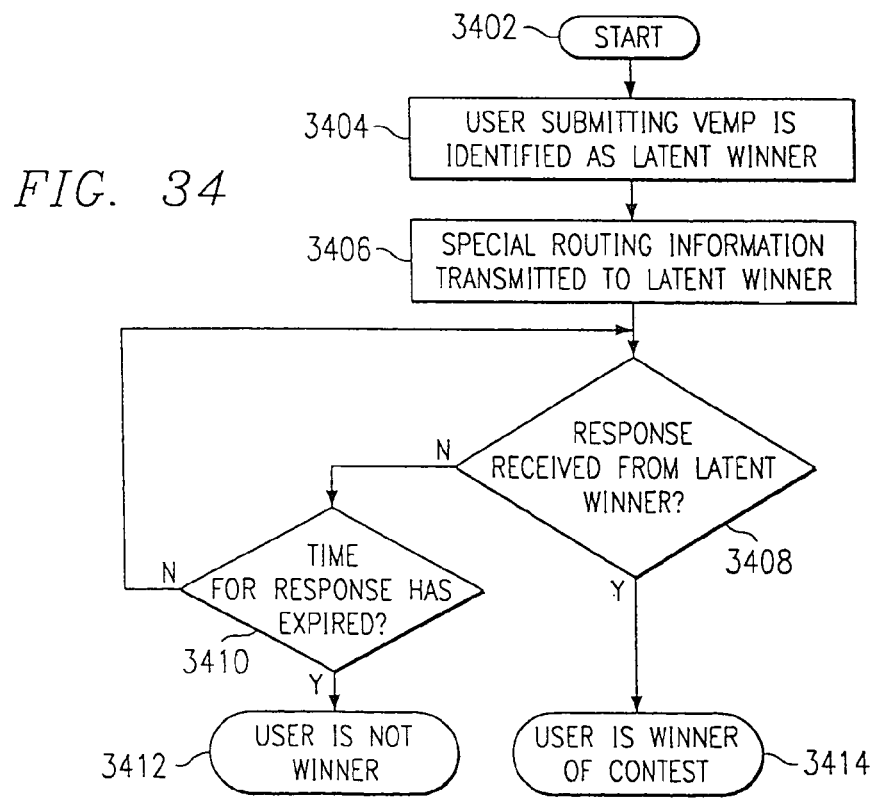
FIG. 34 illustrates a flowchart of one embodiment of the process for determining whether the user submitting an accepted entry is a winner of the contest.

Referring now to FIG. 34, there is illustrated a flowchart for one embodiment for the process of determining whether the user submitting an accepted entry is a winner of the contest. Thus, the process illustrated in FIG. 34 provides additional details of the process occurring in the function block 3310 of FIG. 33. The process is initiated in block 3402 and proceeds to function block 3404 wherein the user submitting a VEMP (which has previously been identified as an accepted entry, e.g. as shown in block 3308 of FIG. 33) is identified as a latent winner. Flow then proceeds to function block 3406 wherein special routing information is transmitted to the latent winner at the user location 2504. Flow then proceeds to decision block 3408 wherein it is determined whether a response has been received from the latent winner. If not response has been received, flow proceeds from block 3408 the "NO" path to decision block 3410 wherein it is determined whether the time for response has expired. If the time for response has not expired, flow proceeds from block 3410 along the "NO" branch back to the input of block 3408 (wait state) whereas if the time for response has expired, then flow proceeds from block 3410 to result block 3412 wherein it is declared that the user is not a winner of the contest. On the other hand, if a response is received from the latent winner before the time for response has expired, flow then proceeds from block 3408 to result block 3414 down the "YES" branch wherein it is determined that the user is a winner of the contest.

In accordance with a further aspect of the current invention, an alternative system for conducting a contest using a network is provided. Referring now to FIG. 35, there is illustrated one embodiment of the system for conducting a contest. The system 3500 includes a first computer 3502 equipped with a video screen 3504 and a screen pointing device 3506, for example a mouse or track ball. The first computer 3502 is disposed at a user site 3508 and operably connected to a network 3510. The network 3510 may be a global communication network (GCN) 306 as previously described herein, for example the Internet. Alternatively, the network 3510 may be a LAN, WAN, or other type of computer network known in the art. A second computer 3512 is disposed at a remote site 3514 and operably connected to the network 3510.

Figure 36:
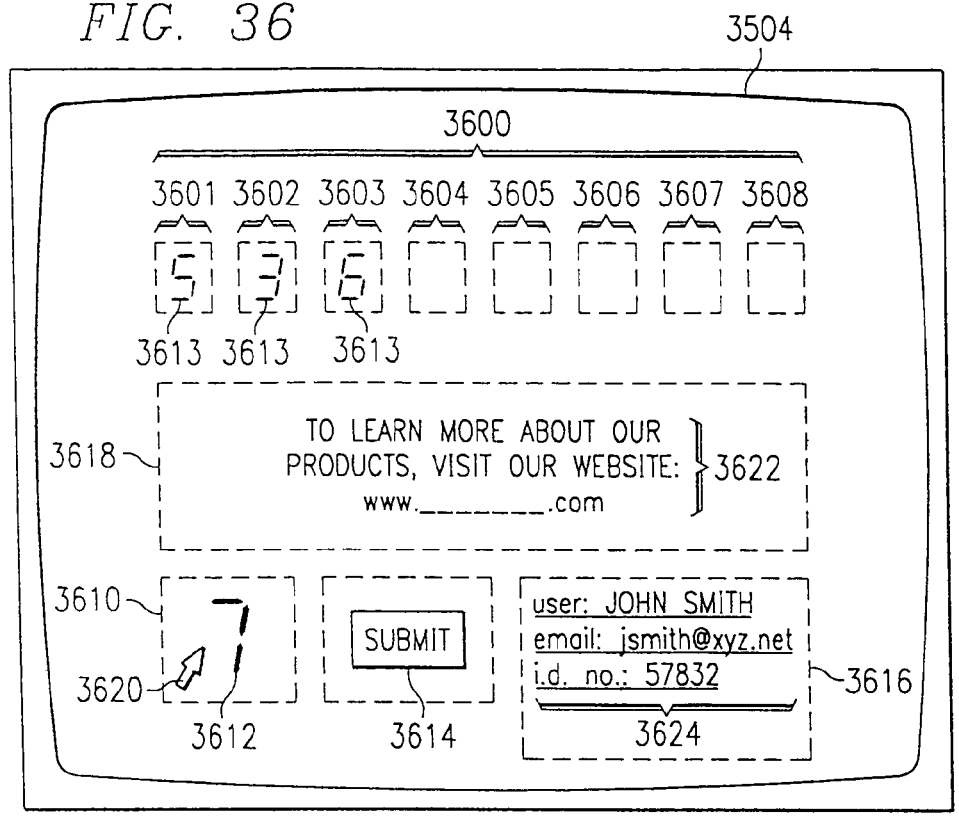
FIG. 36 illustrates an enlarged view of the screen in FIG. 35.

Referring now to FIG. 36, there is illustrated an enlarged view of the video screen 3504 of the first (i.e. user's) computer 3502. Displayed on the screen 3504 of the first computer is a plurality of pick spaces, denoted collectively with reference numeral 3600. In the embodiment shown, eight pick spaces are provided, denoted individually by reference numerals 3601-3608. Also displayed on screen 3504 is a rolling counter 3610, which displays successive characters from a plurality of available characters, each character being displayed on the screen for a preselected duration. It will be apparent that the plurality of available characters used by the rolling counter 3610 may include digits, letters, and/or symbols as desired by the contest sponsor. In one embodiment, for example, the rolling counter may display digits from 0 through 9, while in another embodiment, it may display letters from A through Z. In the embodiment illustrated in FIG. 36, the current character (denoted by reference numeral 3612) displayed on the rolling counter 3610 is the digit "7". In some embodiments, each successive character displayed in the rolling counter 3610 is randomly selected from among the plurality of available characters. In the context of this application, the term "randomly selected" includes selections made using either a true random number generator or a so called pseudo-random number algorithm. In another embodiment, each successive character displayed in the rolling counter 3610 is selected in accordance with a predetermined order of display. For example, if the plurality of available characters consisted of the digits 0 through 5, one possible order of display would be "0, 1, 2, 3, 4, 5, 0, 1, 2, 3, 4, 5 . . . " and another predetermined order of display for the same plurality of available characters would be "5, 3, 2, 1, 0, 4, 5, 3, 2, 1, 0, 4 . . . ". The video screen 3504 of the first computer 3502 may also display a virtual submit button 3614, a user information entry area 3616, and an advertising display area 3618.

The contest process actually begins with the transferring of contest software to the user's computer 3502. This contest software is executed on the user's computer 3502 causing the screen 3504 to display the visual features previously described and causing the computer to perform particular actions as described below. The contest software may be transferred to the user computer 3502 in a variety of ways. In one embodiment, the user may be induced, by advertisements or other means, to access a remote site on the network, for example, an Internet web page. A computer at the remote site would then transmit the necessary contest software across the network to the user computer 3502. It will be appreciated that the software source computer may be the computer 3512 at the remote site 3514 previously described, or alternatively it may be a separate remote computer 3516 disposed at another site 3518 network 3510. In another embodiment, the remote computer 3516 may be connected to a different network (not shown) which is also accessible by the user computer 3502. In another embodiment, the transferring of the contest software to the user computer 3502 includes distributing the contest software on optical disk media, for example CD-ROM disks, CD-R/W disks, or DVD-format disks. In another embodiment, the transferring of the contest software includes distributing the software on magnetic media, for example magnetic floppy disks, magnetic removable hard disks, and magnetic tape cartridges.

Activating the contest software on the user computer 3502 will result in the computer screen 3504 displaying the plurality of pick spaces 3600, the rolling counter 3610 and, optionally, additional screen elements such as the virtual submit button 3614, the user information entry area 3616 and/or the advertising display area 3618. As the game begins, the rolling counter 3610 will display a succession of game characters 3612, each being displayed for a fixed duration before being replaced by the next successive character. Each time the user performs a predefined selection action, the then-displayed character 3612 of the rolling counter 3610 is assigned to a successive one of the plurality of pick spaces 3600. Thereafter, the assigned character is displayed in the corresponding pick space. In other words, each time the user performs the selection action, a character 3612 currently displayed in the rolling counter 3610 "fills" the next available pick space 3601-3608, where it is thereafter displayed. In the embodiment illustrated in FIG. 36, the user has completed the selection action three times, causing the characters "5", "3", and "6" to fill (i.e., be assigned to) the first three pick spaces 3601, 3602 and 3603, respectively. Completing the selection action now will assign the currently displayed character 3612, i.e., the digit "7", to the next unfilled pick space, i.e., pick space 3604. The assigning of characters from the rolling counter 3610 to each successive pick space continues until all of the plurality of pick spaces 3600 have been filled.

In a preferred embodiment, the selection action necessary to cause assignment of the rolling counter value 3612 to a pick space is "pointing and clicking" on the rolling counter 3610, i.e., moving a screen cursor 3620 controlled by the pointing device 3506 onto the image of the character in the rolling counter ("pointing") and activating a button on the pointing device ("clicking"). In another embodiment, the selection action may be entering a specific keyboard keystroke or combination of keystrokes into the computer 3502.

In a preferred embodiment, the preselected duration for display of the current character 3612 in the rolling counter 3610 is sufficiently long to allow the user to accurately determine which character will be assigned to each of the plurality of pick spaces 3600. In other words, the rolling counter 3610 displays each character long enough that the user can make a conscious decision whether to click on that character or wait for a successive character. This allows the user who is so inclined to fill the pick spaces 3600 as desired, for example with a "lucky" number, by spelling words (if alphanumeric characters are available) etc. In another embodiment, the preselected duration for display of each character 3612 in the rolling counter 3610 is insufficiently long to allow the user to accurately determine which character will be assigned to each pick space. In this case, the characters 3612 in the rolling counter 3610 will "flash" by too fast for the user to consciously perceive them, resulting in filling the pick spaces in a random or pseudo-random fashion.

During the course of the contest, for example, while the user is watching the rolling counter to select numbers for filling the pick spaces 3601-3608, the screen 3504 of some embodiments will display advertising or educational messages 3622 in the advertising display area 3618. In one embodiment, these advertising messages, (denoted by "ADV" in FIG. 35) are transmitted in "real time" across the network 3510 from a remote computer 3512, 3516. In another embodiment, the advertisements may be included as part of the contest software which was originally downloaded across the network or which was distributed by means of optical or magnetic media.

During the course of the contest, the user may also input user identity information 3624 into the user information entry area 3616. The user identity information 3624 may include the user's name, a network address of the user, for example an e-mail address, an identification number obtained from a previous registration activity or other information representative of the user's identity. In another embodiment, user identity information will be automatically retrieved from a database 3520 at a remote site across the network. The database may be the ARS database 310 previously described or a separate database containing user information. User data retrieved in this fashion can be displayed in the user information area 3616 so the user can review its accuracy and correct any incorrect information. In most embodiments, user identity information will be required before the user can submit his contest entry.

Referring now to FIG. 37, there is illustrated a sample entry data packet ("EDP") according to one embodiment. The EDP 3700 is assembled by the user computer 3502 when each pick space in the plurality of pick spaces 3600 displays an assigned character 3613. The entry data packet 3700 includes data 3702 indicative of the assigned character in each of the plurality of pick spaces 3600. For purposes of illustration, it is assumed the following characters were assigned to the pick spaces 3601-3608, respectively: 5, 3, 6, 7, 2, 2, 2, 8. In the embodiment illustrated in FIG. 37, the data indicative of the assigned characters 3702 includes a plurality of data elements 3706, each of which corresponds to the assigned character 3613 in one of the pick spaces 3601-3608. The EDP 3700 may further include information 3704 indicative of the user's identity. In the EDP illustrated in FIG. 37, the information representative of the user's identity 3704 includes the user's e-mail address obtained from the user identification information 3624 previously displaced in the user information entry area 3616. In such embodiments, if the required user identification information has not been entered when it is time to assemble the entry data packet 3700, the contest software will prompt the user to enter the required information before allowing the process to proceed.

In some embodiments, the step of assembling the entry data packet further includes encrypting the data. This may include encrypting the data 3702 indicative of the assigned characters in each of the plurality of pick spaces and/or encrypting the data 3704 representative of the user's identity. Referring now to FIG. 38, there is illustrated an EDP 3800 which has been encrypted in accordance with one embodiment. In the encrypted EDP 3800, the information 3802 indicative of the assigned characters in each of the plurality of pick spaces has been changed from "5,3,6,7,2,2,2,8" (the example used in FIG. 37) to "XXXXXXXX". It will be appreciated that the "X" values for data 3804 are merely representative of an encrypted value, and the actual characters appearing in the encrypted EDP 3800 will depend upon the encryption scheme used. Similarly, the data 3804 representative of the user's identity has been converted from "jsmith@xyz.net" in the unencrypted EDP 3700 to the encrypted data "YYYYYYYYYYYYYY".

After assembling the EDP 3700 (and encrypting the data, if so desired), the entry data packet is transmitted from the user computer 3502 across the network 3510 to the second computer 3512 at remote site 3514. In some embodiments, the transmission of the EDP will occur automatically after all the pick spaces have been filled and the required user identity information has been obtained. In a preferred embodiment, the transmitting of the entry data packet occurs only after the user has completed a predetermined submission sequence. As previously discussed, in one embodiment, the predetermined submission sequence includes inputting information 3624 related to the user's identity. In another embodiment, the predetermined submission sequence includes "pointing and clicking" on a virtual SUBMIT button 3614 displayed on the screen 3504, i.e., moving a screen cursor 3620 controlled by the pointing device 3506 onto the image of the virtual SUBMIT button 3614 ("pointing") and activating a button on the pointing device 3506 ("clicking").

The entry data packet transmitted by the first computer 3502 across the network 3510 is received by the second computer 3512 at the remote location 3514. In embodiments where the entry data packet has been encrypted by the first computer 3502, receiving the entry data packet further includes decrypting the received packed to extract the data indicative of the assigned characters in each of the plurality of pick spaces and, if applicable, decrypting the data indicative of the user's identity. The second computer 3512 next determines if the assigned characters 3613 in each of the plurality of pick spaces 3600 as indicated by the received entry data packet match a preselected winning combination of characters. If so, it is concluded that the received entry data packet is a winning entry, otherwise, it is concluded that the received data packet is not a winning entry. In the preferred embodiment, the determination of whether a received data packet constitutes a winning entry is performed in real time, i.e., immediately upon receipt of the entry. However, in other embodiments, a plurality of entry data packets may be received and accumulated to allow batch processing of multiple entries at a single time.

Once a winning entry data packet has been received, it will of course be necessary to notify the user who submitted the winning entry of the contest outcome. In some embodiments, only the winner will be notified, while in other embodiments, all users will be notified of the contest outcome. In one embodiment, where the entry data packet includes data indicative of the user's identity, this identity information can be used to send a message (denoted "RSP" in FIG. 35) across the network 3510 from the remote site 3514 to the user site 3508 to notify the user of the contest outcome.

Figure 39A:
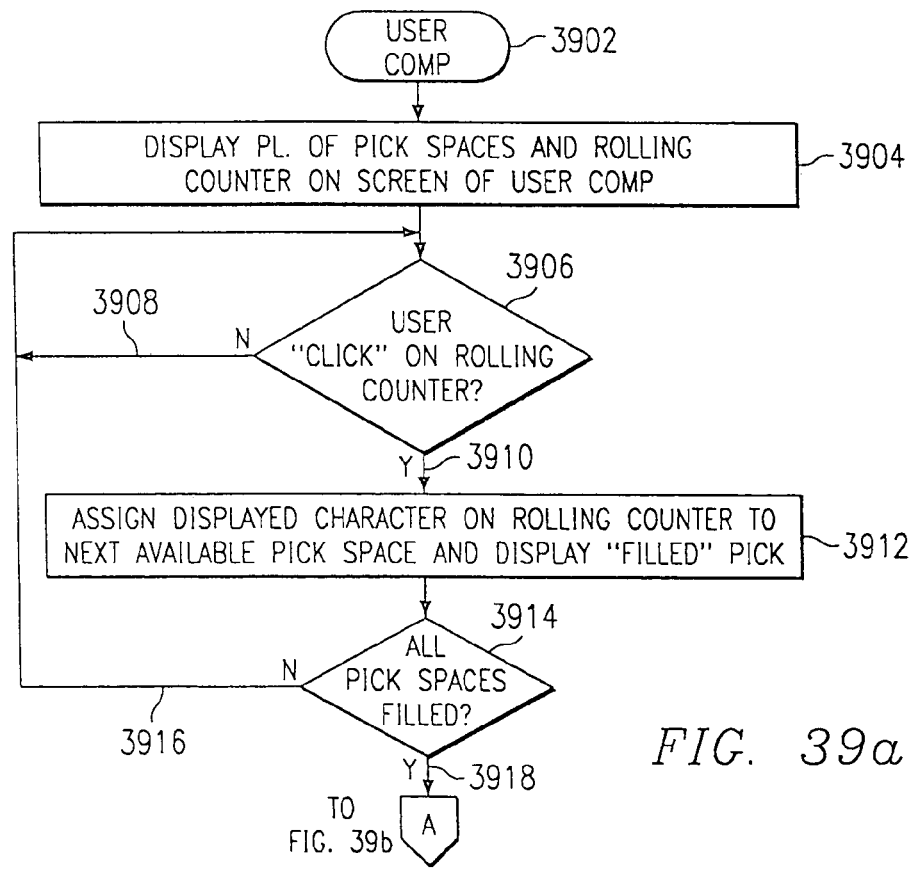
FIGS. 39a-39b illustrate a flowchart of the process from the perspective of the computer at the user site.
Figures 39B, 40:
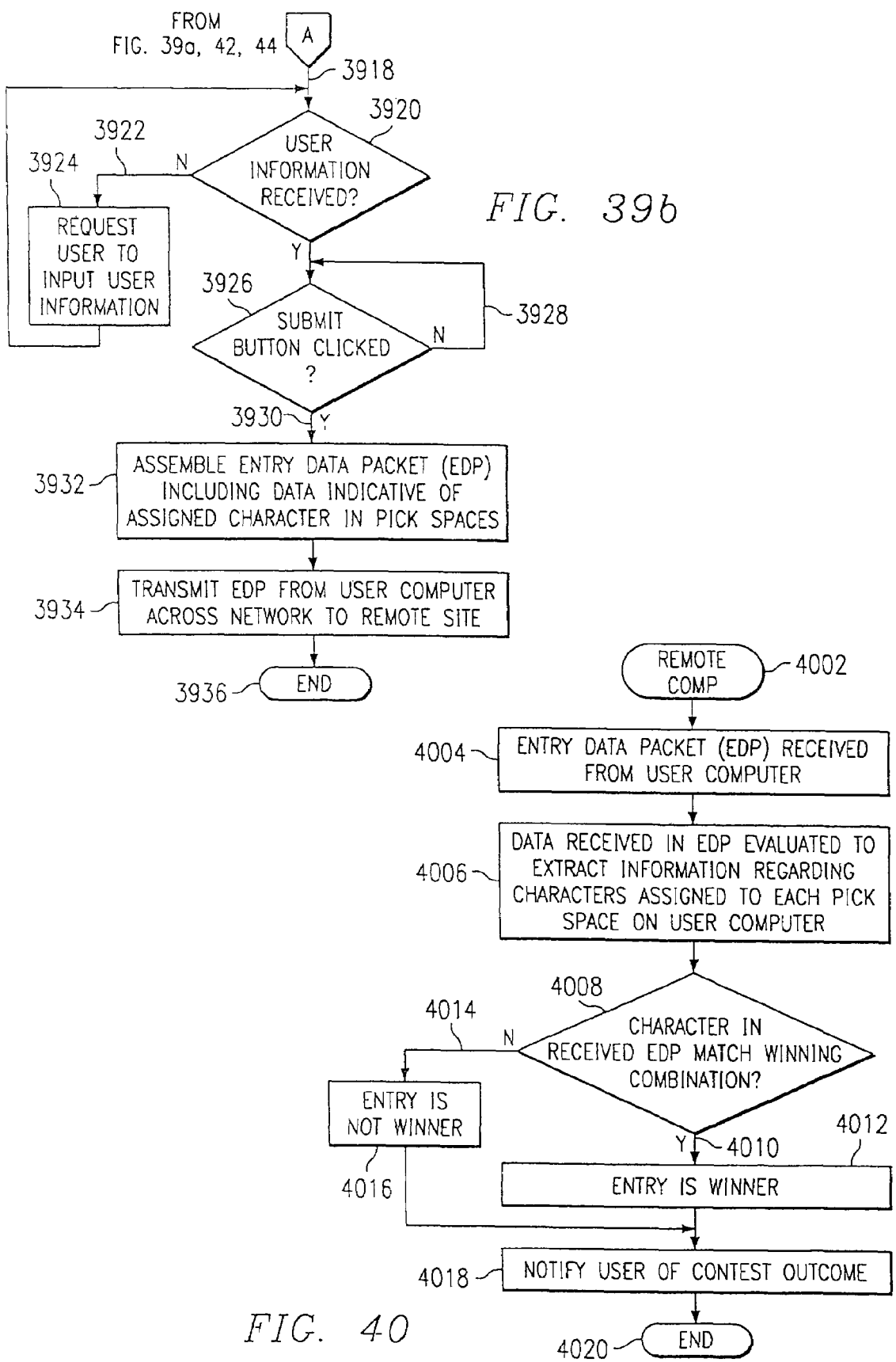
FIG. 40 illustrates a flowchart of the process from the perspective of the computer at the remote location.

Referring now to FIGS. 39a and 39b, there is illustrated a flowchart of the process performed at the user computer location. The process is initiated in block 3902 and proceeds to function block 3904 wherein a plurality of pick spaces 3600 and a rolling counter 3610 are displayed on the screen 3504 of the user computer 3502. In some embodiments, the function block 3904 will also include the display of a virtual SUBMIT button 3614, a user information entry area 3616 and/or an advertising display area 3618 as previously described. The process continues from function block 3904 to decision block 3906, wherein it is determined whether or not the user has "clicked" on the rolling counter (i.e., has the user performed the predefined selection action). If the user has not completed the selection action, the process follows the "NO" branch denoted by arrow 3908 which routes the process back to the input of function block 3906, i.e., forming a "wait" loop. When the user clicks on the rolling counter (or performs the appropriate selection action), the process proceeds from decision block 3906 along the "YES" branch denoted by reference numeral 3910 to function block 3912, wherein the then displayed character of the rolling counter 3610 is assigned to the next available pick space of the plurality of pick spaces 3600. Thereafter, the assigned character will be displayed in the corresponding pick space to show it has been "filled".

Each time a character is assigned from the rolling counter 3510 to a pick space, the process will proceed from function block 3912 to decision block 3914, wherein it is determined whether all the pick spaces in the plurality of pick spaces 3600 have been filled (i.e. a character assigned). If all the pick spaces in the plurality of pick spaces 3600 have not been filled with a character, then the process follows the "NO" path denoted by reference numeral 3916 which routes the process back to the input of decision block 3906. this results in the process "waiting" for the user to finish filling all the pick spaces. If, on the other hand, all the pick spaces have been filled, the process proceeds from decision block 3914 along the "YES" branch denoted by reference numeral 3918 to decision block 3920, wherein it is determined whether the necessary user information has been received. If the required user information has not been received, the process proceeds along the "NO" branch denoted by reference numeral 3922 to function block 3924, wherein the user is requested to input the required user information. The process then proceeds from function block 3924 back to the input of decision block 3920, i.e., resulting in the program waiting for the user to enter the necessary user information. It will be apparent that process steps represented by blocks 3920 and 3924 are optional in some embodiments where user information is not included in the entry data packet or where this information is obtained from another source such as a computer cookie or a remote database 3520. If the required user information has been received, the process proceeds along the "YES" branch to decision block 3926, wherein it is determined whether the virtual SUBMIT button 3614 has been clicked. If the SUBMIT button has not been clicked, the process proceeds along the "NO" branch denoted by reference numeral 3928 back to the input of decision block 3926, resulting in the process waiting for the SUBMIT button to be clicked. If the SUBMIT button has been clicked, then the process proceeds along the "YES" branch denoted by reference numeral 3930 to function block 3932, wherein an entry data packet (EDP) is assembled. The EDP includes data indicative of the assigned characters in the plurality of pick spaces 3600. In some embodiments, the EDP may further include data indicative of the user identity. Further, in some embodiments, the function block 3932 will include encryption of the data in the EDP.

After assembly and encryption (if applicable) of the EDP, the process proceeds to function block 3934 wherein the EDP is transmitted from the user computer 3502 across the network 3510 to a second computer 3512 at a remote site 3514. This completes the basic process from the perspective of the user computer as indicated by the END block 3936. It will, of course, be appreciated that modifications of this process are within the scope of the current invention. For example, the relative order between the steps shown in blocks 3920, 3926 and 3932 may be rearranged without departing from the scope of the current invention. It will further be appreciated that an additional function block (not shown) could be inserted between block 3902 and 3904 to represent the receiving and loading of the contest software onto the user computer.

Referring now to FIG. 40, there is illustrated a flowchart of the embodiment from the perspective of the remote computer. This process is initiated in block 4002 and proceeds to function block 4004 wherein the entry data packet (EDP) is received from the user computer 3502. The process proceeds to function block 4006 wherein the data received in the EDP is evaluated to extract information regarding the characters assigned to each pick space of the plurality of pick spaces 3600 on the user computer 3502. It will be appreciated that in embodiments where the EDP is encrypted, the step shown in block 4006 will include the decryption of such data. Further, in embodiments wherein the EDP includes information regarding the identity of the user, this information will also be extracted for further processing.

The process then proceeds from function block 4006 to decision block 4008 wherein it is determined whether the characters received in the EDP (i.e., the characters assigned to each pick space on the user computer) match a preselected winning combination of characters. If the characters in the pick spaces on the user computer 3502 match the characters of the winning combination, the process proceeds along the "YES" branch denoted by reference numeral 4010 to function block 4012, wherein the received entry is found to be a winner of the contest. On the other hand, if the pick space characters on the user computer 3502 do not match the winning combination, the process follows the "NO" path denoted by reference numeral 4014 and proceeds to function block 4016 wherein the entry is found not to be a winner of the contest. In the embodiment illustrated, the process proceeds from both function block 4012 and function block 4016 to function block 4018, wherein the user is notified of the contest outcome. This notification may take place by means of a response message (denoted by "RSP" in FIG. 35) sent from the second computer 3512 across the network 3510 back to the user computer 3502. Alternatively, the response may be made by other communication means including telephone and mail. Once the user has been notified of the contest outcome, this represents the end of the process from the perspective of the remote computer as indicated by END block 4020.

Figure 41:
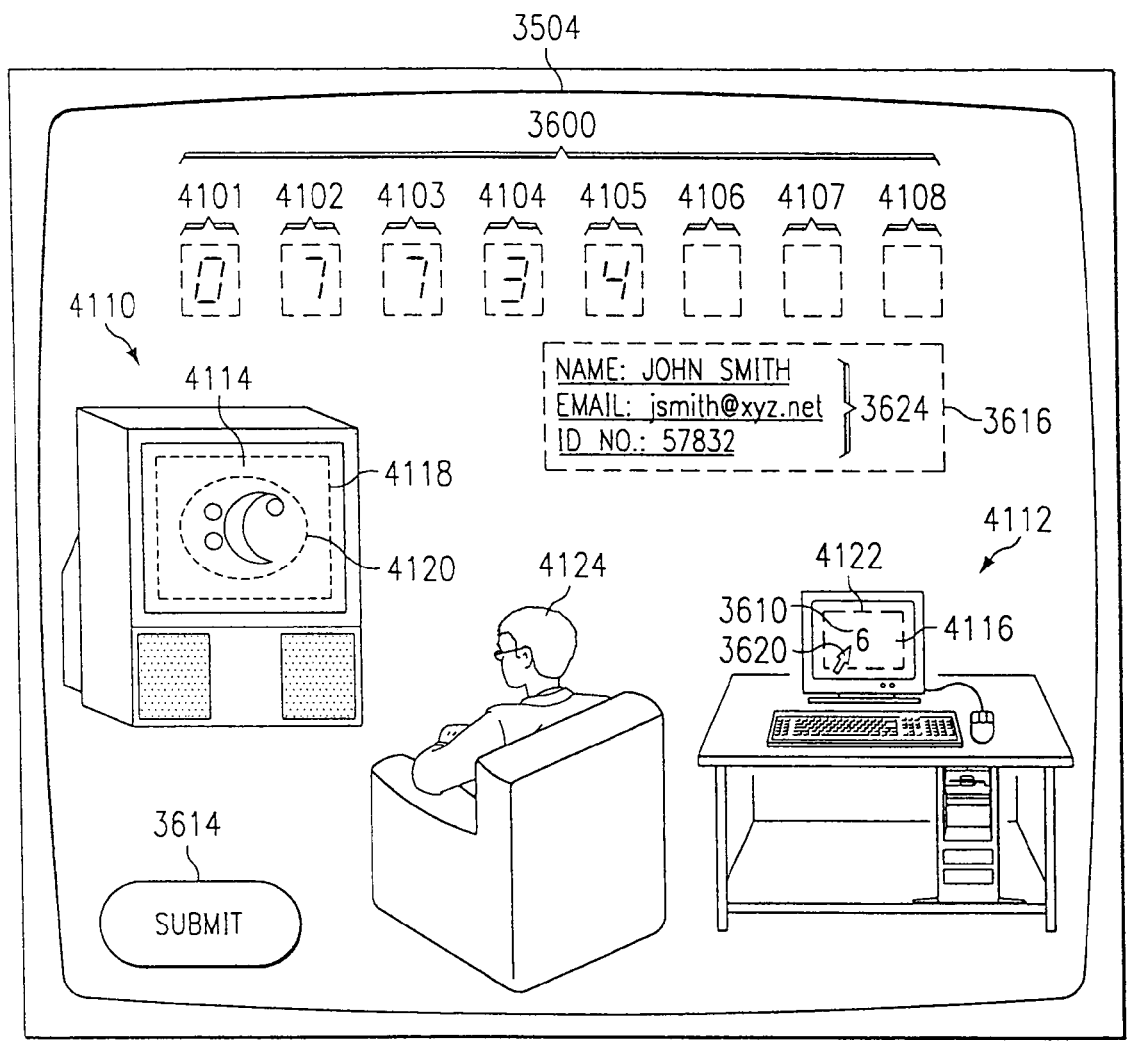
FIG. 41 illustrates the user computer screen in accordance with another aspect of the current invention.

In accordance with a further aspect of the current invention, another system for conducting a contest using a network is provided. The system has a physical configuration substantially identical to that previously described and illustrated in FIG. 35, thus it will not be further described except to the extent there are significant differences therewith. Different contest software is used, however, resulting in a different overall contest system and process for conducting the contest. Referring now to FIG. 41, there is illustrated an enlarged view of the video screen 3504 on the user's computer 3502 in accordance with one embodiment. Displayed on the screen 3504 is a plurality of pick spaces 3600 as previously described. In the embodiment shown, eight pick spaces are provided, denoted individually by reference numerals 4101-4108. Also displayed on the screen 3504 is a virtual television set 4110 and a virtual computer 4112. For purposes of this application, the term "virtual" is used to denote objects which exist only as electronic representations depicted on a video screen, in contrast to the term "practical", which is used to denote objects which exist in the physical world. Thus, the video screen 3504 of the user's computer 3502 will be referred to as a practical screen, whereas the electronic representation of a screen on a virtual television would be referred to as a "virtual screen" (the virtual screen is, of course, displayed on a practical screen).

The virtual television set 4110 depicted on practical screen 3504 includes a first virtual screen 4114, and the virtual computer 4112 includes a second virtual screen 4116. The apparent area of the first virtual screen 4114 constitutes a first display area (denoted by reference numeral 4118) of the practical screen 3504 which is used for showing successive images selected from a first plurality of images. In one embodiment, these images may be a series of still images forming a "slide show" presentation, while in another embodiment the images may be a continuous series forming a full-motion video image. A preselected one of the first plurality of images is designated a lesson image. In the embodiment illustrated in FIG. 41, the symbol ":C" has been selected as the lesson image (denoted by reference numeral 4120) which is currently displayed on the virtual screen 4114. The apparent area of the second virtual screen 4116 constitutes a second display area (denoted by reference numeral 4122) of the practical screen 3504. Shown in the second display area 4122 (as if displayed on the virtual screen 4116 of the virtual computer 4112) is a rolling counter 3610. As previously described, the rolling counter 3610 depicts successive characters of a plurality of available characters, with each character being displayed in the rolling counter for a preselected duration.

The contest of this embodiment is well-suited for educating users that signals received on a (practical) television set may be used to link a nearby (practical) computer to a remote site over a network. A number of such systems are described in the current application. To further this understanding, in some embodiments, the screen 3504 may depict, in addition to the virtual television set 4110 and the virtual computer 4112, a virtual user 4124 who is (virtually) disposed on screen as if "watching" the virtual television set and virtual computer. In another embodiment, the appearance of the virtual user 4124 can be selected from a plurality of appearances. These appearances may allow the user to configure the virtual user 4124 to suit his or her personal preference. The practical screen 3504 may also display a virtual SUBMIT button 3614 and/or a user information entry area 3616 as previously described.

In some embodiments, the contest process actually begins with the transferring of contest software to the user computer 3502. The contest software may be transferred to the user computer using any of the methods previously described herein. Activating the contest software on the user computer 3502 will result in a practical screen 3504 displaying the plurality of pick spaces 3600, the virtual television 4110, the virtual computer 4112 and, if applicable, the virtual user 4124, the virtual submit button 3614 and/or the user information entry area 3616.

As the contest begins, content will be shown in the first display area 4118 as if it was appearing on the screen of the virtual television 4110. This content may be of an entertainment, educational and/or advertising nature. In one embodiment, the content displayed in the first display area 4118 is transmitted across the network 3510 from a remote computer, e.g., computer 3512 or computer 3516, which is operably connected to the network. In another embodiment, the displayed content may be "prerecorded" in the contest software. At the same time, the rolling counter 3610 shown in the second display area 4122 will begin displaying a succession of game characters 3612, each being displayed for a fixed duration. The rolling counter in this embodiment may be programmed to function as in any of the previously described embodiments. For example, in one embodiment, each successive character displayed in the rolling counter 3610 is randomly selected from among the plurality of available characters. In another embodiment, each successive character is displayed in accordance with a predetermined order of display. Similarly, the preselected duration for the display of each character in the rolling counter 3610 may be selected so as to determine whether or not the user may accurately determine which character will be assigned to each pick space.

As in the previous contest described herein, the object of the current contest is to fill each of the plurality of pick spaces 3600 with a character. When all picks have been filled, the entry will be submitted to a remote site to determine if it matches a winning combination. However, in this contest, the picks are not assigned by merely "pointing and clicking" on the rolling counter. Rather, the user must wait until the lesson image 4120 is displayed on virtual screen 4114 of the virtual television 4110. Only then will the user's "point and click" on the rolling counter 3610 result in the then-current character of the rolling counter being assigned to the next available pick space. Stated another way, the simultaneous satisfaction of a three-part condition is necessary to fill each pick space, i.e., simultaneous display of the target image 4120, positioning of the cursor 3620 on the rolling counter 3610, and triggering of the pointing device 3506. This exercise will educate and condition the user to appreciate the relationship between signals received on a television set and the linking of a nearby computer to a remote site.

Once all of the pick spaces in the plurality of pick spaces have been filled, an entry data packet 3700 including data 3702 indicative of the assigned character in each of the plurality of pick spaces 3600 will be assembled and transmitted from the user computer 3502 across the network to a remote site, e.g. 3514. The structures and processes for this assembling and transmitting are substantially identical to those previously described herein and will therefore not be repeated. Similarly, requirements for the inclusion of data indicative of the user's identity in the entry data packet, encryption of the entry data packet and the use of a virtual submit button 3614 or other predetermined submission sequences are substantially identical as previously described and therefore will not be repeated. Further still, the processing of the entry data packet at a remote computer, e.g., computer 3512, is likewise substantially identical to that previously described, i.e., the entry data packet will be received at the remote site, decrypted if required, and evaluated to determine if the assigned character in each of the plurality of pick spaces indicated by the received data packet match a preselected winning combination of characters.

Figure 42:
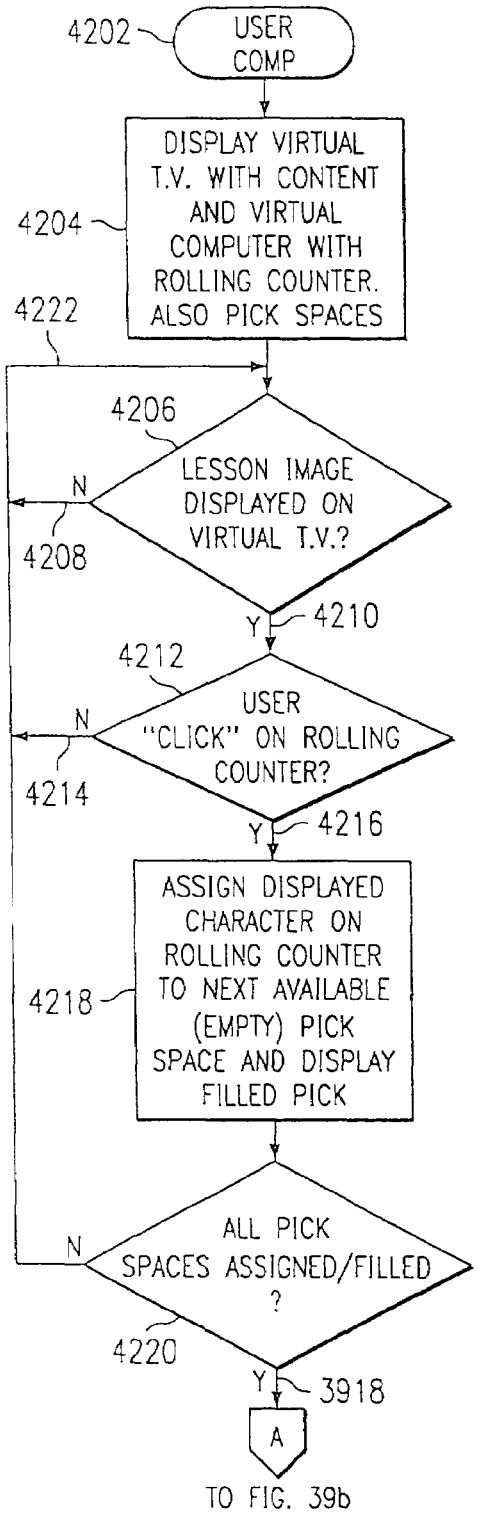
FIG. 42 illustrates a partial flowchart of the alternative process from the perspective of the user computer.

Referring now to FIG. 42, there is illustrated a partial flowchart of the embodiment from the perspective of the user computer. It will be appreciated that only the initial portion of this process is different from that previously described and illustrated in FIGS. 39a-39b and 40, thus only the initial portion of the process is depicted. The process is initiated in block 4202 and proceeds to function block 4204, wherein a plurality of pick spaces 3600, a virtual television 4110 and a virtual computer 4112 are displayed on the practical screen 3504 of the user computer 3502. In some embodiments, the function block 4204 will also include the display of a virtual user 4124, a virtual submit button 3614 and/or a user information area 3616 as previously described. The process continues from function block 4204 to decision block 4206, wherein it is determined whether or not the preselected lesson image 4120 is being displayed in the first display area 4118, i.e. on the "screen" of the virtual television 4110. If the lesson image is not being displayed, the process proceeds along the "NO" branch, denoted by reference numeral 4209 back to the input of decision block 4206, forming a "wait" loop. If, however, the lesson image 4120 is being displayed in the first display area 4118, the process proceeds from decision block 4206 along the "YES" branch, denoted by reference numeral 4210 to decision block 4212, wherein it is determined whether or not the user has "clicked" on the rolling counter shown in the second display area 4122, i.e. on the "screen" of the virtual computer 4112. If the user has not clicked on the rolling counter, the process follows the "NO" branch denoted by arrow 4214, which routes the process back to the input of function block 4206, i.e., again entering a "wait" loop. When the user clicks on the rolling counter 3610 (assuming the lesson image is still displayed) the process proceeds from the decision block 4212 along the "YES" branch denoted by reference numeral 4216 to function block 4218.

In block 4218, the then-displayed character of the rolling counter 3610 is assigned to the next available pick space of the plurality of pick spaces 3600. For example, in the embodiment illustrated in FIG. 41, the lesson image 4120, i.e., the symbol ":C", is displayed in the first display area 4118 and the rolling counter 3610 has a currently displayed character which is the digit "6". In the illustrated example, the first five pick spaces, denoted by reference numerals 4104-4105 have been filled with the characters "0", "7", "7", "3", "4", respectively. Since the screen cursor 3620 is positioned on the rolling counter 3610, if the user triggers the pointing device 3506 now, then the digit "6" will be assigned to the next available pick space, i.e., pick space 4106. The user will then have to fill the remaining two pick spaces, i.e., 4107 and 4108, before the entry data packet 3700 will be submitted to the remote site for processing.

Continuing with a description of the process, flow leaving function block 4218 proceeds to decision block 4220, wherein it is determined whether all the pick spaces in the plurality of pick spaces 3600 have been filled. If all the pick spaces have not been filled with a character, then the process follows the "NO" path denoted by reference numeral 4222, which routes the process back to the input of decision block 4206 (i.e., the "wait" loop). If, on the other hand, all the pick spaces have been filled, the process proceeds from the decision block 4220 along the "YES" branch 3918, at which point the process of this embodiment becomes substantially identical to the process as previously described and illustrated in FIG. 39b. The process from the perspective of the remote computer is substantially identical to that previously described and illustrated in FIG. 40, and therefore will not be repeated.

Figure 43:
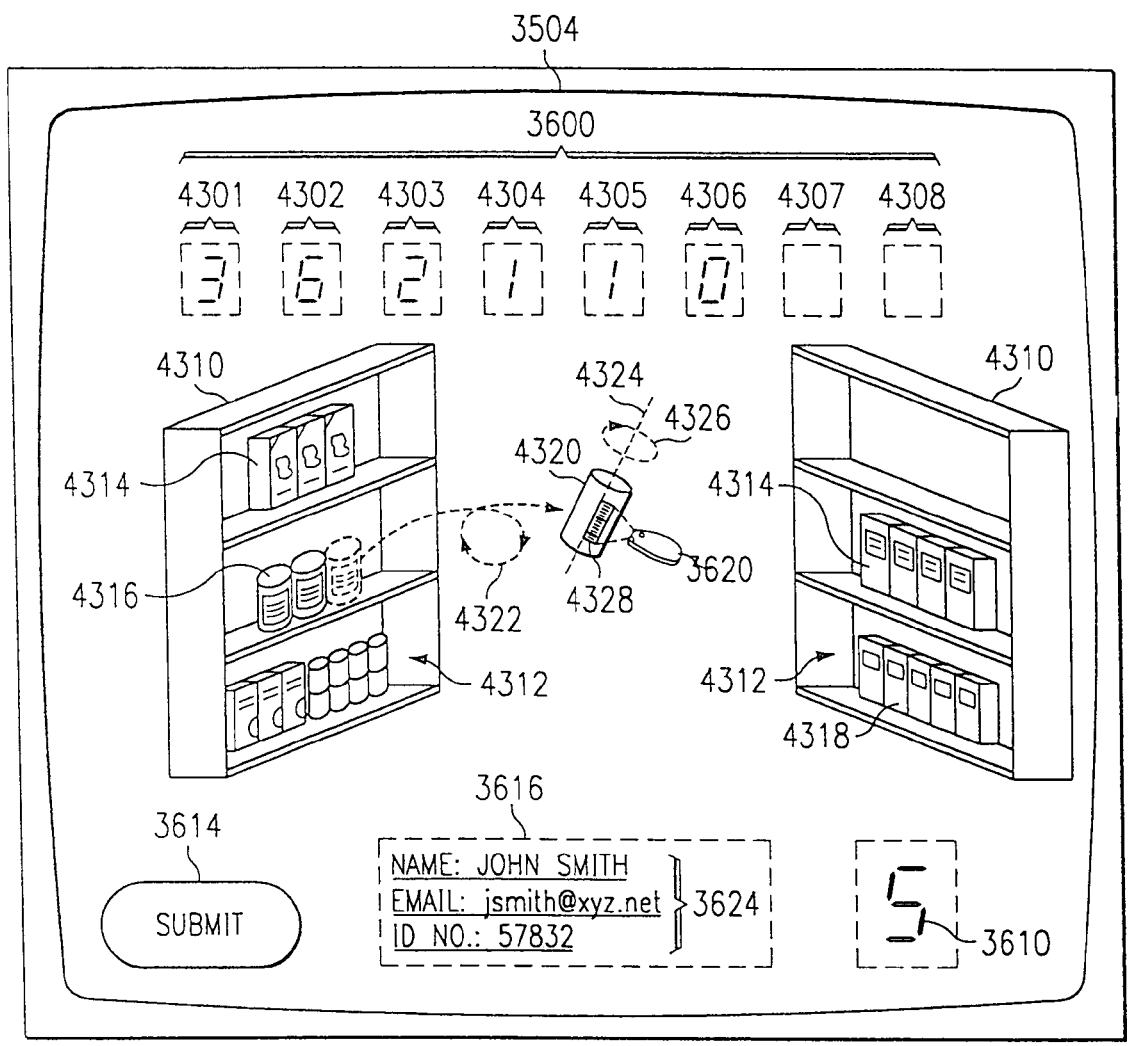
FIG. 43 illustrates the user computer screen in accordance with yet another aspect of the current invention.

In accordance with a further aspect of the current invention, yet another system for connecting a contest using a network is provided. This system also has a physical configuration substantially identical to that previously described and illustrated in FIG. 35, and thus it will not be further described except to the extent there are significant differences therewith. Referring now to FIG. 43, there is illustrated an enlarged view of the video screen 3504 on the user's computer 3502 in accordance with one embodiment. Displayed on the screen 3504 is a plurality of pick spaces 3600 as previously described. In the embodiment shown, eight pick spaces are provided, denoted individually by reference numerals 4301-4308. Also displayed on the screen 3504 is a virtual display fixture 4310 and a plurality of virtual articles of commerce 4312. The virtual display fixture 4310 simulates the appearance of a tangible fixture used in stores or other commercial businesses to display merchandise for sale, for example, shelves or racks. The virtual display fixture may also simulate the appearance of a shopping cart. In some embodiments, multiple fixtures 4310 may be displayed. The virtual articles of commerce 4312 simulate the appearance of tangible things that are sold or moved through commerce, such as consumer products, packaging, printed publications including books, newspapers, or magazines and other printed objects including stickers, flags, cards, tags, labels, checks, coupons and other negotiable instruments. In the embodiment illustrated in FIG. 43, the virtual display fixtures 4310 simulate the appearance of grocery store shelves or display units. The virtual articles of commerce 4312 illustrated in FIG. 43 simulate the appearance of consumer items which might be found in the grocery store, e.g., boxes 4314, cans 4316 and magazines 4318. The screen 3504 may also display a rolling counter 3610, a virtual submit button 3614 and/or a user information entry area 3616, all of which function as previously described.

In some embodiments, the contest process actually begins with the transferring of contest software to the user computer 3502. The contest software may be transferred to the user computer 3502 using any of the methods previously described herein. Activating the contest software on the user computer 3502 will result in the screen 3504 displaying the plurality of pick spaces 3600, the virtual display fixture 4310 and the virtual articles of commerce 4312. If applicable, a rolling counter 3610, virtual submit button 3614 and/or the user information entry area 3616 will also be displayed.

Initially, the plurality of virtual articles of commerce 4312 will be arrayed in or on the virtual display fixtures 4310. As the contest proceeds, at least one of the plurality of virtual articles of commerce 4312 will begin moving across the screen from its initial position on the virtual display fixture 4310. In FIG. 43, an example article 4320 is shown moving from its initial position (shown in dotted lines) on the middle shelf of the left-most storage feature 4310 along a screen path 4322. In this embodiment, the article moves across the screen at varying speeds in the horizontal and vertical screen directions, as shown by the curved path 4322. In addition, in this embodiment, the example article 4320 also appears to rotate about one or more axis 4324 as indicated by a curved arrow 4326.

Each of the moving virtual articles 4312 has a virtual target region 4328 defined thereon. Each of the virtual target regions 4308 is at least periodically visible on the associated moving virtual article. In other words, since the virtual target region 4328 is applied to a virtual article of commerce 4320 which may be rotating, tumbling or otherwise changing its virtual orientation, there may be periods in which the virtual target area 4328 moves to a side of the article which is "hidden" from view.

The contest of this embodiment is well suited for educating users that the bar codes on articles of commerce may be used to link the user's computer to a remote site over a network. A number of such systems are described in the current application. To further this understanding, in some embodiments, the virtual target region 4328 on the virtual articles of commerce 4312 are configured to resemble a bar code used on an article of commerce. To further enhance the educational experience, the screen cursor 3620 may be configured by the contest software to resemble the appearance of an optical reader. For example, the screen cursor 3620 illustrated in FIG. 43 is configured to resemble the plan view of an optical reader shaped like a stylized cat.

As in previous contests described herein, an object of the current contest is to fill each of the plurality of pick spaces 3600 with a character. When all the picks have been filled, the entry will then be submitted to a remote site to determine if it matches a winning combination. However, in this contest the picks are not assigned by merely "pointing and clicking" on the rolling counter 3610. Rather, the user must wait until one of the virtual articles of commerce 4312 begins to move across the screen. The user must further wait until the virtual target region (e.g., the bar code image) is visible on the moving article 4312. In some cases, the erratic motion or tumbling of the virtual article 4312 may result in the virtual target region 4328 being infrequently, or possibly never, visible, in which case the user must continue to wait until the next article begins moving. Once the user sees the target region 4328 on a moving article of commerce 4312, the user must attempt to position the screen cursor 3620 on the target area (i.e., "point") and simultaneously trigger the mouse or other pointing device (i.e., "click"). Only then will the user's "point and click" result in a character being assigned to the next available pick space. Stated another way, the simultaneous satisfaction of a three-part condition is necessary to fill each pick space, i.e., simultaneous visibility of the virtual target area 4328 on a moving article of commerce 4312, positioning of the cursor 3620 on the visible target region, and triggering of the pointing device 3506. This exercise simulates the scanning of a bar code on an article of commerce to educate and condition the user to appreciate that such scanning can result in the linking of a computer to a remote site.

Once all of the pick spaces in the plurality of pick spaces have been filled, an entry data packet 3700 including data 3702 indicative of the assigned character in each of the plurality of pick spaces 3600 will be assembled and transmitted from the user computer 3502 across the network 3510 to a remote site, e.g., 3514. The structures and processes for this assembling and transmitting are substantially identical to those previously described herein and therefore will not be repeated. Similarly, the requirements for the inclusion of data indicative of the user's identity in the entry data packet 3700, encryption of the entry data packet and the use of a virtual submit button 3614 or other predetermined submission sequences are substantially identical to those previously described and therefore will not be repeated. Further still, the processing of the entry data packet at the remote computer, e.g., computer 3512, is likewise substantially identical to that previously described, i.e., the entry data packet will be received at the remote site, decrypted if required, and evaluated to determine if the assigned character in each of the plurality of pick spaces indicated in the received data packet (i.e., the user's picks) match a pre-selected winning combination of characters.

Figure 44:
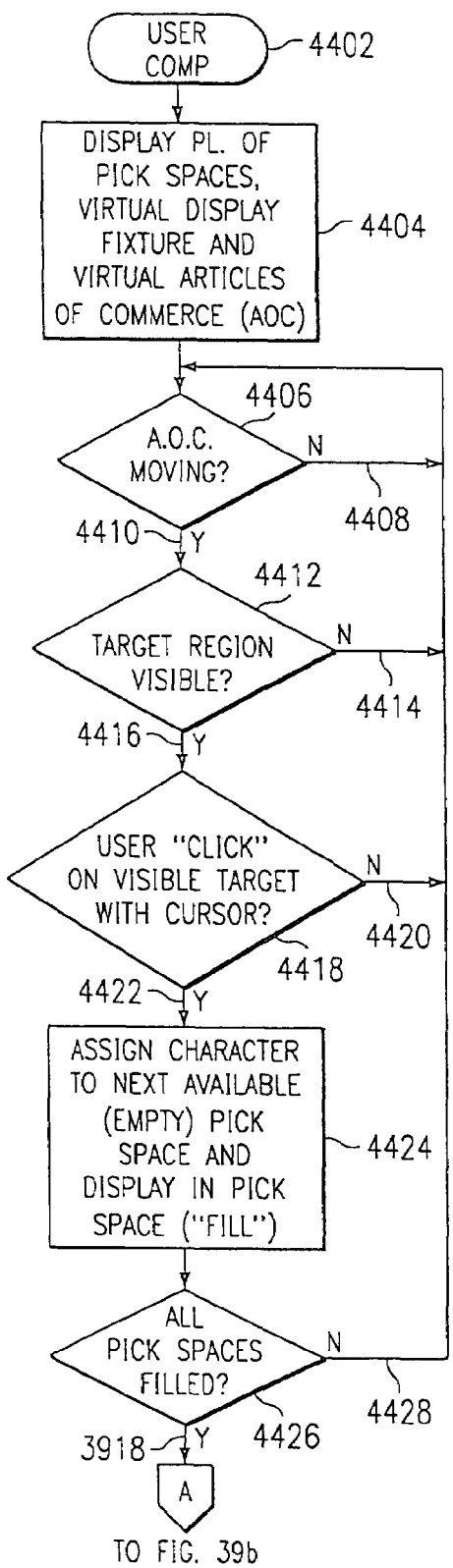
FIG. 44 illustrates a partial flowchart of the alternative process from the perspective of the user computer.

Referring now to FIG. 44, there is illustrated a partial flowchart of the embodiment from the perspective of the user computer. It will be appreciated that only the initial portion of this process is different from that previously described and illustrated in FIGS. 39a-39b and 40, thus only the initial portion of the process is described in detail. The process is initiated in block 4402 and proceeds to function block 4404, wherein a plurality of pick spaces 3600, a virtual display fixture 4310 and plurality of virtual articles of commerce 4312 are displayed on the screen 3504 of the user computer 3502. In some embodiments, the function block 4404 will also include the display of a rolling counter 3610, a virtual submit button 3614 and/or a user information area 3616 as previously described. The process continues from the function block 4404 to a decision block 4406, wherein it is determined whether or not an article of commerce 4312 has left the virtual display fixture 4310 and is now moving across the screen. If an article 4312 is not moving, the process proceeds along "NO" branch denoted by reference numeral 4408 and back to the input to decision block 4406, forming a "WAIT" loop. If, however, the article of commerce 4312 is moving, the process proceeds from the decision block 4406 along the "YES" branch denoted by reference numeral 4410 to a decision block 4412. In decision block 4412, it is determined whether or not the virtual target region (e.g., simulated bar code) 4328 is visible. If the bar code is not visible, the process continues along the "NO" branch denoted by reference number 4414 and is routed back to the input of decision block 4406 (the "WAIT" loop). If, on the other hand, the target region 4328 is visible, then the process proceeds along the "YES" branch denoted by reference numeral 4416 to a decision block 4418. In block 4418 it is determined whether or not the user has "pointed" the screen cursor 3620 at the target region 4328 and "clicked" the mouse or screen pointing device 3506. If the user has not clicked on the visible target region of a moving article of commerce, the process follows the "NO" branch denoted by reference numeral 4420 back to the input of decision block 4406 (the "WAIT" loop). When the user successfully clicks on the target region of a moving article of commerce, the process proceeds from the decision block 4418 along the "YES" path denoted by reference numeral 4422 to function block 4424.

In block 4424, a character is assigned to the next available pick space of the plurality of pick spaces 3600. In a preferred embodiment having a rolling counter 3610, the character assigned will be the then-displayed character of the rolling counter at the time of the successful click. For example, in the embodiment illustrated in FIG. 43, the example article 4320 is moving across the screen along path 4322 and the rolling counter 3610 has a currently displayed character which is the digit "5". In the illustrated example, the first six pick spaces, denoted by reference numerals 4301-4306 have been filled with the characters "3," "6," "2," "1," "1," and "0", respectively. Since the screen cursor 3620 is positioned on the simulated bar code 4328 constituting the target region on the example article, if the user triggers the pointing device 3506 now, then the digit "5" will be assigned to the next available pick space, i.e., pick space 4307. The user will then have to fill the remaining pick space, i.e., pick space 4308, before the entry data packet 3700 will be submitted to the remote site for processing.

Continuing with the description of the process, flow leaving function block 4424 proceeds to decision block 4426, wherein it is determined whether all the pick spaces in the plurality of pick spaces 3600 have been filled. If all the pick spaces have not been filled with a character, then the process follows the "NO" branch denoted by reference numeral 4428, which routes the process back to the input of decision block 4406 (i.e., the "WAIT" loop). If, on the other hand, all the pick spaces have been filled, the process proceeds from decision block 4426 along the "YES" branch 3918, at which point the remainder of this embodiment becomes substantially identical to the process as previously described and illustrated in FIG. 39b. The process from the perspective of the remote computer is also substantially identical to that previously described and illustrated in FIG. 40, and therefore will not be repeated.

Although the preferred embodiment has been described in detail, it should be understood that various changes, substitutions and alterations can be made therein without departing from the spirit and scope of the invention as defined by the appended claims.

What is claimed is:

1. A method for conducting a contest using a network, the method comprising the steps of:
    displaying, to a user a plurality of pick spaces and a rolling counter, the rolling counter constituting of a plurality of available characters, each character being displayed for a preselected duration;
    assigning, each time the user performs a predefined selection action, the then-displayed character of the rolling counter to a one of the plurality of pick spaces and thereafter displaying the assigned character in the corresponding pick space;
    assembling, when each pick space displays an assigned character, an entry data packet including data indicative of the assigned character in each of the plurality of pick spaces;
    transmitting the entry data packet from the user computer across the network to a remote site;
    receiving the entry data packet at the remote site; and
    determining if the assigned characters in each of the plurality of pick spaces represented by the received entry data packet match a preselected winning combination of characters, and if so, concluding the received entry data packet to be a winning entry, otherwise, concluding the received entry data packet is not a winning entry.

2. A method in accordance with claim 1, wherein each character displayed in the rolling counter is randomly selected from among the plurality of available characters.

3. A method in accordance with claim 1, wherein each character displayed in the rolling counter is displayed in accordance with a predetermined order of display.

4. A method in accordance with claim 1, wherein the preselected duration for display of each character in the rolling counter is sufficiently long to allow the user to accurately determine which character will be assigned to each pick space.

5. A method in accordance with claim 1, wherein the preselected duration for display of each character in the rolling counter is insufficiently long to allow the user to accurately determine which character will be assigned to each pick space.

6. A method in accordance with claim 1, further comprising retrieving information indicative of the user's identity from a database at a remote site.

7. A method in accordance with claim 1, further comprising the step of displaying an advertising message on the screen of the user computer during the course of the contest.

8. A method in accordance with claim 1, wherein the predetermined selection action comprises:
    moving a screen cursor controlled by a computer pointing device onto the image of the character of the rolling counter; and
    activating a button on the computer pointing device.

9. A method in accordance with claim 1, wherein the step of transmitting the entry data packet occurs after the user completes a predetermined submission sequence.

10. A method in accordance with claim 9, wherein the predetermined submission sequence includes inputting information indicative of the user's identity.

11. A method in accordance with claim 10, wherein the predetermined submission sequence further includes:
    moving a screen cursor controlled by a computer pointing device onto the screen image of a submit button; and
    activating a button on the computer pointing device.

12. A method in accordance with claim 9, wherein the predetermined submission includes:
    moving a screen cursor controlled by a computer pointing device onto the screen image of a submit button; and
    activating a button on the computer pointing device.

13. A method in accordance with claim 1, wherein the step of assembling the entry data packet further comprises encrypting the data.

14. A method in accordance with claim 13, wherein the step of receiving the entry data packet further comprises decrypting the received packet to extract the data.

15. A method in accordance with claim 1, wherein the entry data packet further comprises data representative of the user's identity.

16. A method in accordance with claim 15, wherein the data representative of the user's identity includes a network address of the user.

17. A method in accordance with claim 16, wherein the network address is an e-mail address.

18. A method in accordance with claim 1, further comprising the step of transferring contest software to the user's computer prior to the step of displaying.

19. A method in accordance with claim 18, wherein the step of transferring includes inducing the user to access a remote site on the network.

20. A method in accordance with claim 19, wherein the remote site is an Internet web page.

* * * * *